US008277587B2

(12) United States Patent
Kimura et al.

(10) Patent No.: US 8,277,587 B2
(45) Date of Patent: *Oct. 2, 2012

(54) CONTINUOUS METHOD AND SYSTEM FOR MANUFACTURING LIQUID-CRYSTAL DISPLAY ELEMENTS

(75) Inventors: Kouji Kimura, Osaka (JP); Takayoshi Yamano, Osaka (JP); Takuya Nakazono, Osaka (JP); Kazuo Kitada, Osaka (JP); Tomokazu Yura, Osaka (JP); Fumihito Shimanoe, Osaka (JP); Satoru Koshio, Osaka (JP)

(73) Assignee: Nitto Denko Corporation, Osaka (JP)

( * ) Notice: Subject to any disclaimer, the term of this patent is extended or adjusted under 35 U.S.C. 154(b) by 187 days.

This patent is subject to a terminal disclaimer.

(21) Appl. No.: 12/790,282

(22) Filed: May 28, 2010

(65) Prior Publication Data
US 2010/0288420 A1    Nov. 18, 2010

Related U.S. Application Data

(63) Continuation of application No. PCT/JP2009/001440, filed on Mar. 30, 2009.

(30) Foreign Application Priority Data

Apr. 15, 2008   (WO) ................. PCT/JP2008/000987

(51) Int. Cl.
*B32B 41/00*   (2006.01)
(52) U.S. Cl. .......... 156/64; 156/252; 156/253; 156/269; 156/270; 156/353; 156/360; 156/361; 156/378; 156/379
(58) Field of Classification Search .................... 156/64, 156/252, 253, 269, 270, 353, 360, 361, 378, 156/379
See application file for complete search history.

(56) References Cited

U.S. PATENT DOCUMENTS

| 7,976,657 B2 * | 7/2011 | Kimura et al. ................. 156/64 |
| 2004/0095526 A1 | 5/2004 | Yamabuchi et al. |
| 2004/0169809 A1 | 9/2004 | Yamabuchi et al. |

(Continued)

FOREIGN PATENT DOCUMENTS

CN           1470890        1/2004

(Continued)

OTHER PUBLICATIONS

Chinese Office Action for 200980101624.X dated Nov. 24, 2011.

(Continued)

*Primary Examiner* — Richard Crispino
*Assistant Examiner* — Joshel Rivera
(74) *Attorney, Agent, or Firm* — Lowe Hauptman Ham & Berner, LLP

(57) ABSTRACT

A continuous manufacturing method and system for liquid-crystal display elements which enhances accuracy, increases speed and improves in yield in the continuous production of liquid crystal elements. The continuous method and system performs steps of, defining a plurality of defective and normal-polarizing-sheet slitting positions on a continuous web of optical film, based on positions of defects existing in the optical film, and applying only normal polarizing sheets to a liquid-crystal panel. The polarizing sheet includes the defective and normal-polarizing-sheet slitting positions recorded as encoded information which is used to determine whether the polarizing sheet defined between slit lines sequentially formed in the continuous web, is a normal polarizing sheet, peeling the normal polarizing sheet from the carrier film and applying the normal polarizing sheet to the liquid-crystal panel.

18 Claims, 28 Drawing Sheets

U.S. PATENT DOCUMENTS

| | | |
|---|---|---|
| 2005/0016670 A1 | 1/2005 | Kanbara et al. |
| 2005/0199337 A1 | 9/2005 | Nishikubo et al. |
| 2007/0013858 A1 | 1/2007 | Yamabuchi et al. |
| 2009/0159175 A1 | 6/2009 | Nakahira et al. |
| 2009/0199950 A1 | 8/2009 | Kitada et al. |
| 2010/0165333 A1 | 7/2010 | Ohashi et al. |

FOREIGN PATENT DOCUMENTS

| | | |
|---|---|---|
| DE | 102007043408 | 3/2009 |
| EP | 2093041 | 8/2009 |
| EP | 2237249 | 10/2010 |
| JP | 55-120005 | 9/1980 |
| JP | 57-052017 | 3/1982 |
| JP | 57-52018 | 3/1982 |
| JP | 57-052019 | 3/1982 |
| JP | 62-014810 | 4/1987 |
| JP | 07-157186 | 6/1995 |
| JP | 11-095028 | 4/1999 |
| JP | 2002-023151 | 1/2002 |
| JP | 2003-161935 | 6/2003 |
| JP | 2003-202298 | 7/2003 |
| JP | 2003-344302 | 12/2003 |
| JP | 2004-144913 | 5/2004 |
| JP | 2004-333647 | 11/2004 |
| JP | 2004-338408 | 12/2004 |
| JP | 2004-345354 | 12/2004 |
| JP | 2004-361741 | 12/2004 |
| JP | 2005-037416 | 2/2005 |
| JP | 2005-037417 | 2/2005 |
| JP | 2005-043384 | 2/2005 |
| JP | 3616866 | 2/2005 |
| JP | 2005-062165 | 3/2005 |
| JP | 2005-114624 | 4/2005 |
| JP | 2005-298208 | 10/2005 |
| JP | 2005-305999 | 11/2005 |
| JP | 2005-306604 | 11/2005 |
| JP | 2005-309371 | 11/2005 |
| JP | 2005-347618 | 12/2005 |
| JP | 2006-058411 | 3/2006 |
| JP | 2007-64989 | 3/2007 |
| JP | 2007-064989 | 3/2007 |
| JP | 2007-114449 | 5/2007 |
| JP | 2007-140046 | 6/2007 |
| JP | 3974400 | 9/2007 |
| JP | 2008-176280 | 7/2008 |
| JP | 2009-061498 | 3/2009 |
| JP | 2009-175653 | 8/2009 |
| KR | 20030042760 | 6/2003 |
| WO | 2008/047712 | 4/2008 |
| WO | 2009/025210 | 2/2009 |

OTHER PUBLICATIONS

International Search Report mailed May 19, 2009 for PCT/JP2009/001440.
International Search Report mailed Jan. 15, 2008 for PCT/KR2007/069967.
European Search Report for EP09731702, Feb. 14, 2011.
Taiwanese Office Action for 099129090, Dec. 13, 2010.
Korean Notice of Allowance for 10-2010-0052164, Dec. 30, 2010.
European Search Report for 10186374, Mar. 17, 2011.

* cited by examiner

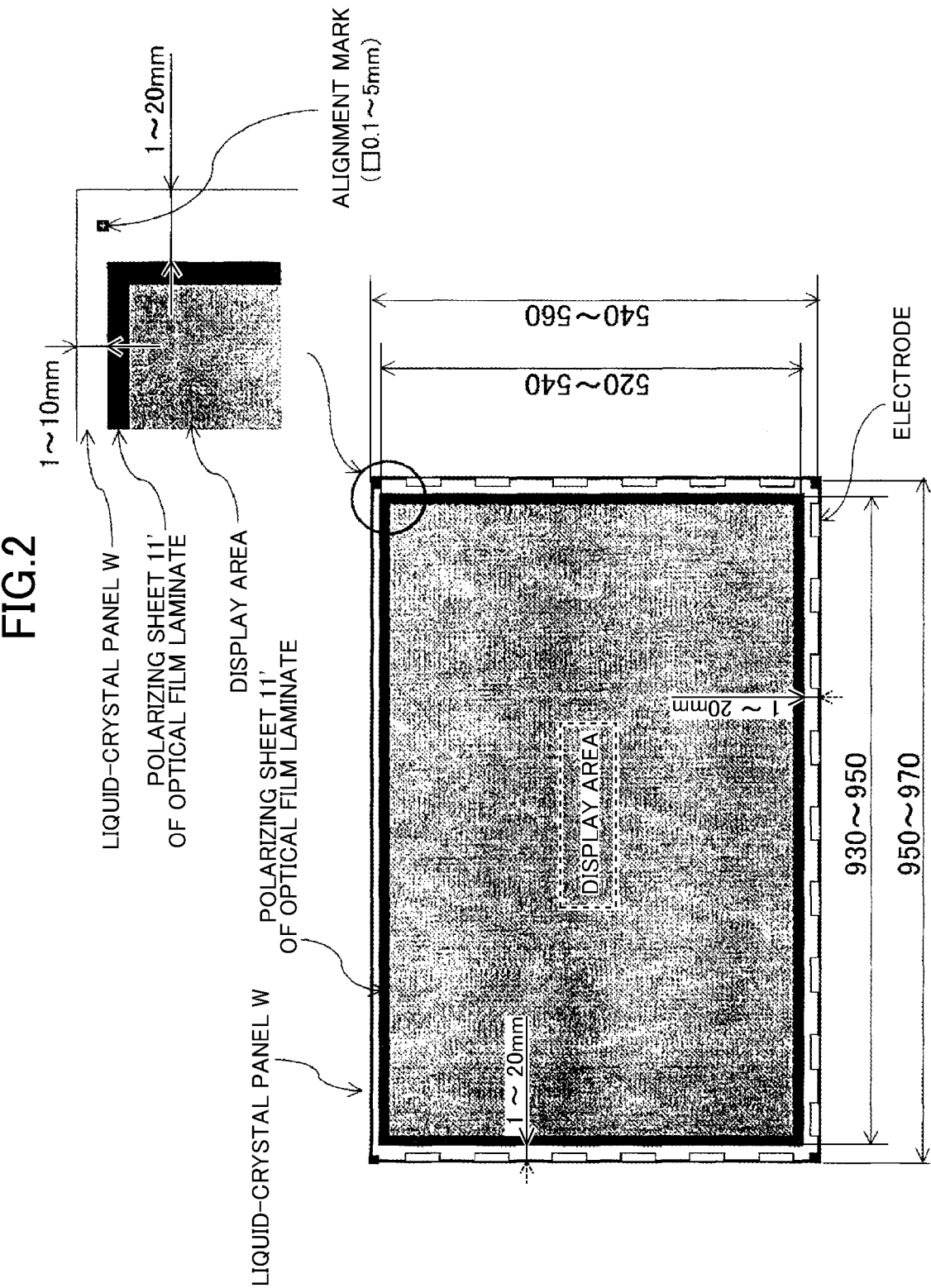

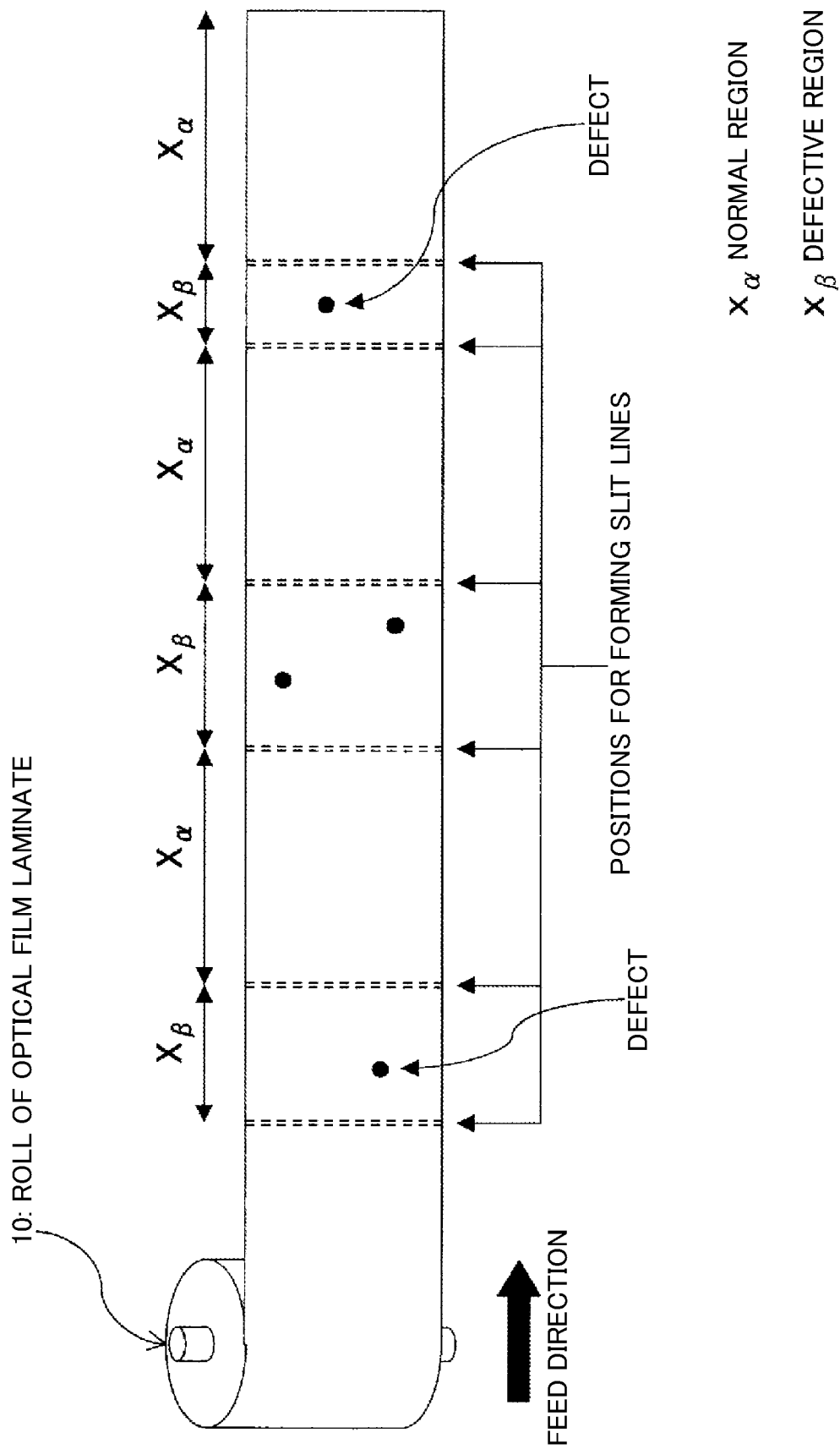

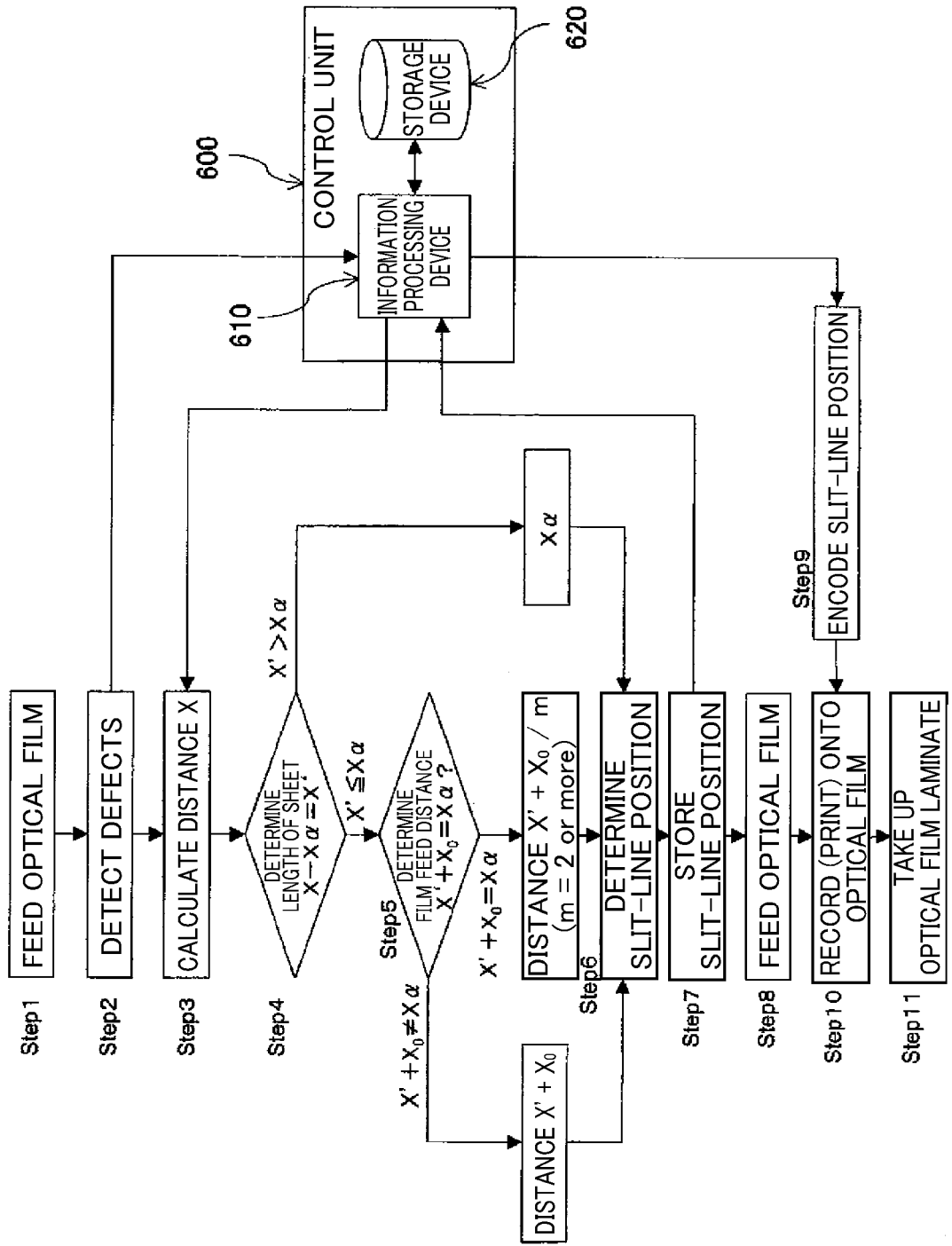

FIG.22

| No. | TYPE | CAPACITY | TYPE OF INFORMATION | DATA CONTENT | INTERVALS OF PRINTING TO WEB |
|---|---|---|---|---|---|
| 1 | ONE-DIMENSIONAL CODE<br><br>EXAMPLE  | 20 CHARACTERS | ALPHANUMERIC CHARACTER | SEE JP 3974400B | 1 to 2 m |
| 2 | TWO-DIMENSIONAL CODE (MATRIX CODE)<br><br>EXAMPLE  | 2000 CHARACTERS | ALPHANUMERIC CHARACTER<br>JAPANESE KANA CHARACTER<br>CHINESE CHARACTER | · LOT No.<br>· ROLL LENGTH<br>· TYPE OF DEFECT<br>· DEFECT POSITION<br>· SIZE OF DEFECT<br>· CONTRAST DIFFERENCE<br>· CUT POSITION (SLIT LINE POSITION) | 1 to 100 m |
| 3 | IC TAG<br><br>EXAMPLE  | CHARACTERS SEVERAL THOUSANDS OR MORE | ALPHANUMERIC CHARACTER<br>JAPANESE KANA CHARACTER<br>CHINESE CHARACTER | · LOT No.<br>· ROLL LENGTH<br>· TYPE OF DEFECT<br>· DEFECT POSITION<br>· SIZE OF DEFECT<br>· CONTRAST DIFFERENCE<br>· CUT POSITION (SLIT LINE POSITION) | ONE POSITION AT LEADING EDGE |

FIG.23
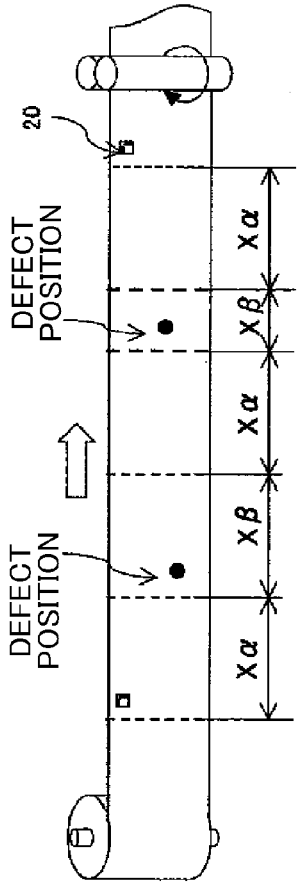

FIG.24

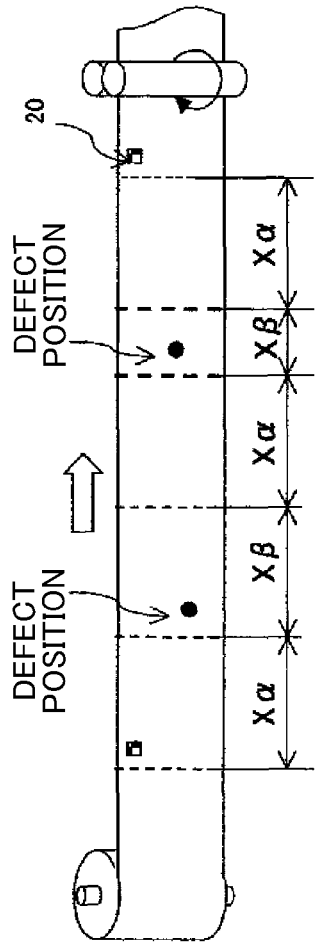

$X\alpha$ = PRODUCT SIZE
$X\beta$ = DEFECTIVE SHEET ($X' + X_0$)
($X' \leq X\alpha$)
※ IN CASE OF $X\beta$ ($X' + X_0$) = $X\alpha$
$X\beta = X' + X_0'$ ($X_0 < X_0'$) > $X\alpha$
(IN CASE OF TABLE, $X_0' = X_0 + 5mm$)

30343035 } SLIT-POSITION INFORMATION

20

EXAMPLE OF DEFECT POSITION INFORMATION →

EXAMPLE OF INFORMATION IN STORAGE DEVICE →

EXAMPLE OF ENCODING
(SLIT-LINE FORMATION POSITION)
(EXAMPLE OF CONVERSION UNDER JIS 8-CODE STRING) →

EXAMPLE OF RECORDING ONTO SURFACE-PROTECTION FILM OR CARRIER FILM
(TWO-DIMENSIONAL (MATRIX) CODE)

FIG.25

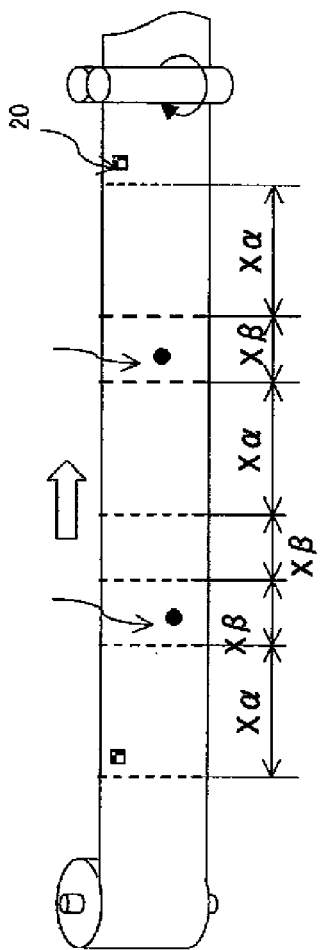

$X\alpha$ = PRODUCT SIZE $X\beta$ = DEFECTIVE SHEET ($X' \leq X\alpha$)

※IN CASE OF $X\beta$ ($X'+X_0$) = $X\alpha$ $X\beta = (X'+X_0)/m < X\alpha$ (IN CASE OF TABLE, IF m = 2, $X\beta = 400/2 = 200$)

| LOT No. | SLIT POSITION (IDENTIFICATION INFORMATION) | DETERMINATION |
|---|---|---|
| #A0001 | 400 | $X\alpha$ |
| | 220 | $X\beta$ |
| | 400 | $X\alpha$ |
| | 200 | $X\beta$ |
| | 200 | $X\beta$ |
| | 400 | $X\alpha$ |

2341303030031
30343030
30323230
30343030
30323030
30323030
30343030

30323030 } SLIT-POSITION INFORMATION

20

→ EXAMPLE OF DEFECT POSITION INFORMATION

→ EXAMPLE OF INFORMATION IN STORAGE DEVICE

→ EXAMPLE OF ENCODING (SLIT-LINE FORMATION POSITION)
(EXAMPLE OF CONVERSION UNDER JIS 8-CODE STRING)

→ EXAMPLE OF RECORDING ONTO SURFACE-PROTECTION FILM OR CARRIER FILM (TWO-DIMENSIONAL (MATRIX) CODE)

FIG.28

| INSPECTION UNIT | TYPE OF DEFECT | | | | |
| --- | --- | --- | --- | --- | --- |
| | INTERNAL FOREIGN SUBSTANCES | INTERNAL PORES | BRIGHT SPOTS | SURFACE IRREGULARITIES | FLAW/UNDULATION |
| REFLECTION | △ | △ | × | ○ | ○ |
| TRANSMISSION | ○ | ○ | △ | △ | × |
| CROSS-NICOL TRANSMISSION | ○ | ○ | ○ | × | ○ |

CONTINUOUS METHOD AND SYSTEM FOR MANUFACTURING LIQUID-CRYSTAL DISPLAY ELEMENTS

CROSS REFERENCE TO RELATED APPLICATIONS

The present application is based on, and claims priority from, International Application Number PCT/JP2008/000987 and a continuation of International Application Number PCT/JP2009/001440, respectively filed on Apr. 15, 2008 and Mar. 30, 2009, the disclosure of which is hereby incorporated by reference herein in its entirety.

TECHNICAL FIELD

This disclosure relates to the process for a continuous method and system for lamination of polarizing films on to substrates used to fabricate LCD (Liquid-Crystal Display) displays.

BACKGROUND

For a liquid-crystal display element to function, the direction of orientation of liquid-crystal molecules and the direction of polarization of the polarizer must be set in a particular relation to each other. In liquid-crystal display element technologies, LCDs using a TN (Twisted Nematic) type liquid-crystal were the first to be put into practical use. Recently, LCDs using a VA (Vertical Alignment) type liquid-crystal, an IPS (Inplane Switching) type liquid-crystal etc. were put into practical use. Although a technical explanation is omitted, in an LCD using such TN-type liquid-crystal panel, liquid-crystal molecules are provided between two upper and lower orientation films having respective rubbing directions on the inner surfaces of the substrates of the liquid-crystal panel. This means that the liquid-crystal molecules are twisted by 90 degrees along the optical axis so that, when a voltage is applied, the liquid-crystal molecules are aligned in a direction perpendicular to the orientation films. However, in the case where the LCD is designed to allow images of the same quality to be seen from right and left sides of a display screen as those view from directly in front of the display screen, the direction of rubbing on the orientation film at the viewing-side must be 45 degrees (the rubbing direction of the other orientation film being 135 degrees). It is therefore necessary that the polarizing sheets made from the polarizing composite films as shown in FIGS. 1A and 1B, be laminated respectively on the front and back sides of the liquid-crystal panel with polarizers respectively oriented in directions inclined respectively by 45 degree with respect to a lengthwise or widthwise direction of the display screen so as to conform to the rubbing directions.

Therefore, in a polarizing sheet for use in producing a liquid-crystal element of a TN-type liquid-crystal panel, it is required that the optical film is punched-out or cut into a rectangular-shaped sheet having a long side or a short side determined in accordance with the size of the TN liquid-crystal panel, and inclined by 45 degrees with respect to the orientation direction of the polarizer produced by stretching in the lengthwise or widthwise direction. This is described in Japanese Laid-Open Patent Publication No. JP 2003-161935A or Japanese Patent No. 3616866B. The width of the sheet to be processed into the rectangular shape, that is, the short side of the sheet, is smaller than the width of the continuous web.

The punching or cutting the optical film sheet into the rectangular-shaped sheet from the continuous web of an optical film may be collectively referred to as "individualized sheets" or "a method and system for manufacturing individualized sheets" for liquid-crystal display elements. The optical film sheet thus punched-out or cut is produced by punching or cutting not only the surface protection film contained in the optical film but also the carrier film protecting the exposed surface of the adhesive layer in the polarizing composite film together. The integrally punched-out or cut carrier film sheet may be referred to as "separator", rather than "carrier film sheet". Thus, the manufacturing process of the liquid-crystal display elements includes the first step of peeling the separator from each of optical film sheet to have the adhesive layer of the polarizing sheet exposed. Subsequently, the optical film sheet each having the adhesive layer exposed are conveyed one-by-one by for example under a vacuum suction irrespective of whether the surface protective film sheets are laminated or not, and laminated to respective ones of a plurality of liquid-crystal panels. According to the abovementioned manufacturing process of the liquid-crystal display elements, it has been required that the integrally punched-out or cut sheet from the continuous web of optical film is in the form of an individualized sheet having four trimmed sides and a certain level of stiffness of less deflection or bend and which can be conveyed and laminated easily. During the initial period in the history of the manufacturing process of the liquid-crystal display elements, this optical film sheet or the polarizing sheet contained in the optical film sheet was generally known as a "polarizing plate" which is still used as a common name.

In the manufacturing process of TN-type liquid-crystal display elements, an optical film fed out from a roll of the optical film laminate is integrally and sequentially punched-out or cut in a direction transverse to the feed direction. However, in this case, it is impossible to obtain a finished liquid crystal display element simply by sequentially laminating the sheets formed to respective ones of a plurality of liquid-crystal panels. This is because the sheets each formed with a long or short side extending in a direction 45 degrees cannot be laminated sequentially to respective ones of the liquid-crystal panels W with the same posture. Therefore, to provide a finished liquid-crystal display element by transporting a polarizing sheet to a position for lamination with a liquid-crystal panel, and then laminating the polarizing sheet to the liquid-crystal panel, an optical film having a width greater than a long side of a liquid-crystal panel is fed out in a lengthwise direction, and punched-out at an angled direction of 45 degrees with respect to the lengthwise direction for each of the optical film, using for example a die, into a plurality of individual sheets, and appropriately fed to the laminating process of the liquid-crystal panel as shown in Japanese Laid-Open Patent Publication No. JP 2003-161935A or Japanese Patent 3616866 B. Alternatively, an optical film having a substantial longitudinal length may be provided by preparing a continuous web of optical film having a substantially large width and punching or cutting the web at an angle of 45 degrees with respect to the longitudinal direction to provide a film sheet which can be used as an optical film having a substantial length, or may be provided by connecting together a plurality of such obliquely cut sheets of the optical film, as shown in Japanese Patent Publication No. 62-14810 B, and the optical film as produced in such process of forming sheets from an optical film having the width of the liquid-crystal panel is then continuously fed and cut in the widthwise direction with respect to its feeding direction to provide a plurality of sheet strips each having a required length and each including a plurality of polarizing sheet, the plurality of polarizing sheets in the sheet strip being then laminated to respective ones of a plurality of liquid-crystal panels sequentially conveyed to provide completed liquid-crystal display elements. At any rate, the above techniques are not beyond the system for manufacturing individualized sheets.

Japanese Patent Publication No. 62-14810 B was published before the VA-type liquid-crystal and the IPS-type liquid-crystal are brought into practical use and discloses an apparatus to produce a liquid-crystal panel by sequentially laminating a plurality of sheets formed into a required length onto respective ones of a plurality of liquid-crystal panels while continuously feeding an optical film containing a polarizing composite film. Japanese Patent Publication No. 62-14810 B discloses a technique of continuously feeding an optical film which comprises a polarizing composite film (called "elongated polarizing plate") and a separator for protecting an adhesive layer on the polarizing composite film, "cutting only a polarizing plate 4 and an adhesive layer while leaving a separator uncut (hereinafter referred to as "half-cut")", removing defective polarizing sheets formed in the course of the feeding, sequentially laminating the peeled sheets to the liquid-crystal panels (called "liquid-crystal cells") for constituting small-size display screens of an electronic calculators or the like, while peeling the separator from the polarizing sheets. The apparatus is a labeler unit which produces an LCD using a TN-type liquid-crystal. Thus, the optical film to be used must be an elongated sheet produced from an optical film cut it in a direction 45 degrees oblique to the longitudinal direction of the optical film with a width corresponding to the liquid-crystal panel. Therefore, this apparatus cannot be applied directly to a manufacturing apparatus adapted to perform steps of continuously forming a plurality of polarizing sheets from an optical film having a laminated structure and laminating respective sheets to respective ones of the liquid-crystal panel using VA-type liquid-crystal and the IPS-type liquid-crystal to make a liquid-crystal display element because of the width of optical film required.

Automation of manufacturing process of liquid-crystal display elements using individualized sheets is generally described below. For example, in Japanese Laid-Open Patent Publication No. 2002-23151A. Flexible individualized sheets tend to be bowed or warped by being bent or distorted at its edge portions, and such tendencies have caused a serious technical impediment to accuracy and speed in registration and lamination with liquid-crystal panels. Thus, it will be understood that the individualized sheet is required to have a certain level of thickness and stiffness to facilitate transport under suction and lamination to the liquid-crystal panel. For example, Japanese Laid-Open Patent Publication No. 2004-144913A, Japanese Laid-Open Patent Publication No. 2005-298208A or Japanese Laid-Open Patent Publication No. 2006-58411A disclose measures for addressing such technical problems.

On the other hand, the VA-type and IPS-type liquid-crystal panels are not designed to have a twisted structure of liquid-crystal molecules. Thus, in producing liquid-crystal display elements using these types of liquid-crystal panels, it is no longer required to have the polarization axis of the polarizing sheet oriented 45 degrees. In the case of liquid-crystal display elements using these types of liquid-crystal panels, the liquid-crystal display element is formed by applying the polarizing sheets to the opposite sides of the liquid-crystal display panel oriented with their polarization axes crossed at 90 degrees each other. In the case of the VA-type and IPS-type liquid-crystal panels, with respect to the viewing angle characteristics, maximum contrast can be obtained along the direction of the polarizing axis of the polarizing sheet, so that it is preferable that the sheets have optical axes oriented in parallel with the longitudinal or transverse direction of the liquid-crystal panel from the technical view point of symmetry of the viewing angle characteristics and visibility. Thus, these sheets to be applied to the liquid-crystal panel have a feature that the optical film including a polarizing composite film which has been subjected to longitudinal or transverse stretching can be continuously fed out from a roll and cut along transverse lines with respect to the feed direction of the optical film to sequentially produce rectangular sheets including the polarizing sheets having same width as the optical film width.

Because of the improved viewing angle characteristics, VA-type or IPS-type liquid-crystal are more widely adopted than the TN-type. In view of such trend in environments of technical developments, proposals have been made such as the one described in Japanese Laid-Open Patent Publication No. 2004-361741A which is a technique for enhancing manufacturing efficiency based on use of the VA-type or IPS-type liquid-crystal panels and comprises steps of continuously feeding an optical film, cutting the optical film in conformity to the size of a liquid-crystal panel and sequentially laminating a plurality of cut rectangular sheets comprising the polarizing sheets which have been produced by the cutting step to respective ones of a plurality of the liquid-crystal panels.

However, the mainstream of manufacture of liquid-crystal display elements is still based on manufacturing technology utilizing individualized sheets, due to the following technical problems. In manufacturing liquid-crystal display elements, a critical technical challenge is to detect any defect which may otherwise be retained in the display elements to be formed, and to prevent any defective product from being produced. This makes it possible to significantly improve manufacturing yield. Most of the product defects primarily arise from defects in the polarizing composite film contained in the optical film. However, it is not practical to provide an optical film after completely removing all defects contained in individual films before they are laminated together to form the optical film. The reason is that, observation of the polarizer, protective film laminated on the polarizer and an adhesive layer formed on the polarizing composite film indicates that there are various kinds of defects, including defects inherent in the PVA film of the polarizer itself, defects arose in connection with the lamination of the protective film to the polarizer or defects generated in the adhesive layer of the formed polarizing composite film, distributed in 20 to 200 positions over a unit length of the polarizing composite film of 1000 m. This means that under existing circumstances, it is extremely difficult to produce a defect-free optical film. It is not permitted to use an optical film sheet having visible flaws or defects as a sheet for television even if such a flaw or defect is small. Therefore, if lengths of the polarizing composite film with defects are used to form a display and a display requires 1 m of film, 20 to 200 defective liquid-crystal display elements out of 1,000 products will be produced.

A proposed preliminary inspection apparatus for a polarizing composite film, is disclosed, for example, in Japanese Patent No. 3974400B, Japanese Laid-Open Patent Publication Nos. 2005-62165A and 2007-64989A.

Japanese Laid-Open Patent Publication 2007-140046A discloses a method wherein the method comprises peeling a carrier film (called "releasable film") from an optical film (called "polarizing plate stock") fed out continuously from a roll of an optical film laminate to expose a polarizing composite film (called "polarizing plate") having an adhesive layer; detecting a defect or defects present in the polarizing composite film; punching or cutting only normal regions of a polarizing composite film into a rectangular shape, while leaving the defective region or regions of the polarizing composite film untouched. Japanese Patent Application No. 2007-266200 discloses an invention relating to a method and system for laminating a polarizing film sheet to a liquid-crystal panel. The method and an apparatus disclosed in Japanese Patent Application No. 2007-266200, however, require that steps cause not only substantial complexity in the entire system for laminating but also an increase in the number of steps and difficulty in control for each step, and therefore, cause corresponding reduction in the manufacturing speed.

The present disclosure has been made based on the above related disclosures and through intensive researches and considerations for significantly enhancing product accuracy and manufacturing speed, and drastically improving production yield, in the manufacture of liquid-crystal display elements.

SUMMARY

The present disclosure is based on findings that solutions of the aforementioned technical problems can be achieved in a continuous manufacture of liquid-crystal display elements by a process wherein a continuous web of an optical film is provided, the optical film having a width corresponding to the width of the liquid crystal panel having predefined dimensions and at least comprising a polarizer film having an adhesive layer thereon and a carrier film releasably attached to the adhesive layer, the continuous web of optical film having a plurality of defective-polarizing-sheet slitting positions and normal-polarizing-sheet slitting positions defined thereon in the form of lines extending in the widthwise direction of the continuous web of optical film, based on positions of one or more defects present in the continuous web of optical film and detected through a preliminary inspection of a polarizing composite film, the defective-polarizing-sheet slitting positions being for defining regions containing one or more defects and the normal-polarizing-sheet slitting positions being for defining regions having no defect, the defective-polarizing-sheet slitting positions and the normal-polarizing-sheet slitting positions being recorded on the web as encoded information, wherein individualized polarizing film sheets are formed from the continuous web of optical film to have dimensions corresponding to those of the liquid crystal panels and applied to the liquid crystal panels to form liquid crystal display elements, wherein the continuous web of optical film is continuously fed to a lamination station while measuring a feed distance of the continuous web and calculating the feed-length measurement data based on the feed distance, and reading the encoded information recorded on the continuous web, wherein a plurality of slit-lines are formed in the continuous web by slitting the continuous web from the surface opposite to the carrier film to a depth reaching the surface of the carrier film adjacent to the adhesive layer, along the slitting positions, based on the encoded information and the feed-length measurement data, when the slitting position defined in the continuous web thereon comes to a slitting station, the encoded information being used for determining whether the polarizing sheets being formed between an adjacent pair of the slit-lines sequentially formed in the continuous web, is a defective polarizing sheet having defects or a normal polarizing sheet having no defect, wherein the polarizing sheet determined to be the normal polarizing sheet, among the polarizing sheets formed between an adjacent pair of the slit-lines sequentially formed in the continuous web of optical film, is then peeled from the carrier film, and transported to the lamination station, wherein a liquid-crystal panel is transported to the lamination station in synchronization with the transportation of the normal polarizing sheet to the lamination station and the normal polarizing sheet is applied to the liquid-crystal panel.

The disclosure provides a continuous manufacturing method and system for liquid-crystal display elements. The system and method uses a continuous web of optical film comprising a polarizer film having an adhesive layer thereon a carrier film and information encoded thereon, the encoded information indicating positions for slitting the continuous web of optical film based on positions of defects present in the continuous web of optical film.

The system and method continuously feeds the continuous web of optical film to a lamination station, measures a feed distance of the continuous web, calculates the feed-length measurement data based on the feed distance, reads the encoded information recorded on the continuous web.

The system and method forms a plurality of slit-lines in the continuous web by slitting the continuous web from the surface opposite to the carrier film to a depth reaching the surface of the carrier film adjacent to the adhesive layer, along the slitting positions. The position of the slitting positions based on the encoded information and the feed-length measurement data. The system and method uses the encoded information for determining whether the polarizing sheets being formed between an adjacent pair of the slit-lines sequentially formed in the continuous web is a defective polarizing sheet having one or more defects or a normal polarizing sheet having no defect, peels the polarizing sheet determined to be the normal polarizing sheet, among the polarizing sheets formed between an adjacent pair of the slit-lines sequentially formed in the continuous web of optical film, from the carrier film. The system and method transports the peeled polarizing sheets to the lamination station; sequentially transports liquid-crystal panels to the lamination station in synchronization with the transportation of the normal polarizing sheets to the lamination station; and applies the polarizing sheets to respective ones of the liquid-crystal panel in a sequential manner.

BRIEF DESCRIPTION OF THE DRAWINGS

The present disclosure is illustrated by way of example, and not by limitation, in the figures of the accompanying drawings in which elements having the same reference numeral designations represent like elements throughout and wherein:

FIG. 2 illustrates a typical example of a liquid-crystal display element for a widescreen television having a diagonal screen size of 42 inches.

FIG. 3 is a schematic diagram showing defective regions including defects existing in an optical film for use in a liquid-crystal display element, and normal regions having no defect according to at least one embodiment.

FIG. 21 is a flowchart showing yet another technique of calculating a position for forming a slit line in a continuous web of an optical film being fed.

FIG. 22 is a table showing an example of encoding and recording of positional information to an optical film, in the continuous manufacturing system for liquid-crystal display element, according to at least one embodiment.

FIG. 23 is a diagram showing an example of encoding of a position for forming a slit line in an optical film, in a technique of identification information or defect-including information $X\gamma$ in FIG. 19, in the continuous manufacturing system for liquid-crystal display element, according to at least one embodiment.

FIG. 24 is a diagram showing an example of encoding of a slit-position information indicative of the position for forming a slit line in an optical film, in a technique of modifying a distance to a next-slit-line formation position to $(X'+X0)$, wherein $X0'>X0$, in FIG. 20, in the continuous manufacturing system for liquid-crystal display element, according to at least one embodiment.

FIG. 25 is a diagram showing an example of encoding of a slit-position information indicative of the position for forming a slit line in an optical film, in a technique of modifying a distance to a next-slit-line formation position to $[(X'+X0)/m]$, wherein $m=2$ or more, in FIG. 21, in the continuous manufacturing system for liquid-crystal display element, according to at least one embodiment.

FIG. 28 is a table showing a defect inspection device, a type of defect and a defect detection method.

EXPLANATION OF NUMERICAL CHARACTERS

Figure 1A:
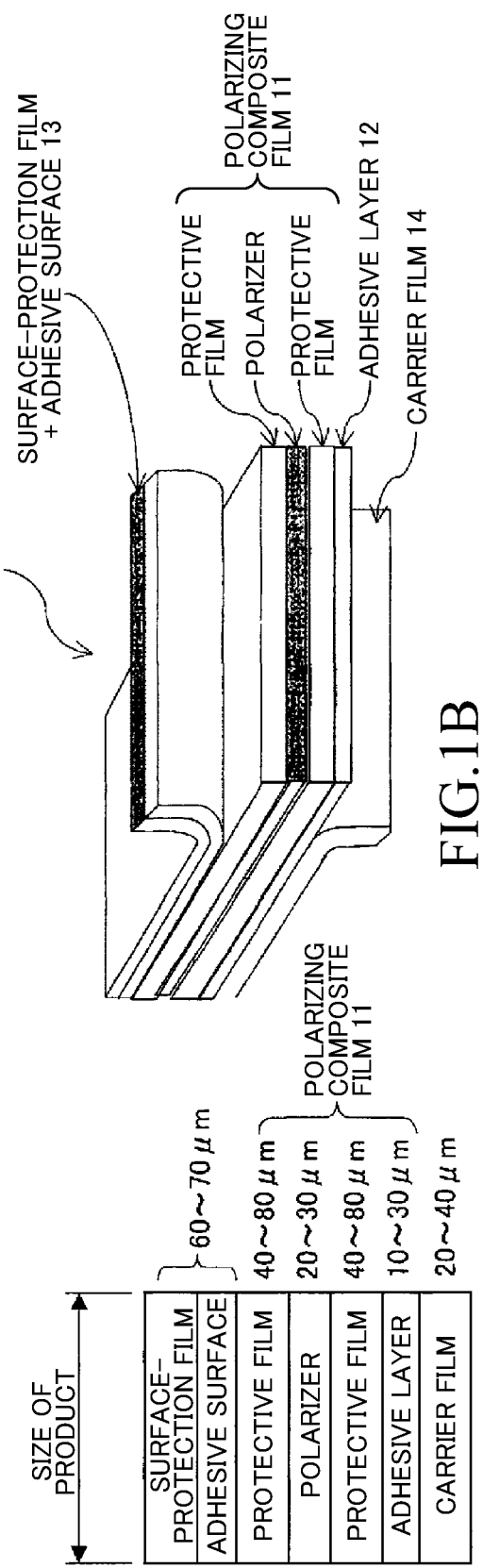
FIG. 1A and FIG. 1B are schematic diagrams showing the structure of an optical film for use in manufacturing of a liquid-crystal display element according to at least one embodiment.

The following numerical characters are used throughout the description to refer to the following features 1: continuous manufacturing system for liquid-crystal display elements
10: optical film laminate
10', 10": roll of a provisional optical film laminate
11: polarizing composite film
11': polarizing sheet
12: adhesive layer
13: surface-protection film 13': provisional surface-protection film
14: carrier film
14', 14": provisional carrier film
20: encoded information
100: optical-film feed apparatus
110: support rack
120: reading unit
130, 170: film feed unit
140, 180: speed adjustment unit
150: slitting unit
160: slitting position checkup unit
190: defective-polarizing-sheet removal unit
200: lamination unit
210: carrier-film take up drive mechanism
220: sheet-edge detection unit
530: straight-ahead-posture detection unit
300: liquid-crystal-panel conveyance apparatus
400: control unit
410: information processing device
420: storage device
500, 700, 800: manufacturing system for a roll of an optical film laminate
510: polarizer manufacturing line
520: protective film manufacturing line
530: lamination line or provisional-optical-film feed line
540: lamination drive mechanism
550: distance measurement device
560: inspection unit
570: carrier-film lamination mechanism
571: support rack
572: releasable-film take up drive mechanism
575: provisional-carrier-film peeling unit
576: provisional-carrier-film take up drive mechanism
580: optical-film take up drive mechanism
590: image-reading device
600: control unit
610: information processing device
620: storage device
630: information recording unit
640: surface-protection film lamination mechanism
645: provisional surface-protection-film peeling unit
646: provisional surface-protection-film take up drive mechanism
710: provisional-optical-film feed unit
720: provisional-carrier-film take up drive mechanism
730: first inspection unit
731: second inspection unit
740: control unit
741: information processing device
742: storage device
750: carrier-film feed unit
760: carrier-film lamination mechanism
770: optical-film take up drive mechanism
780: information recording unit
810: provisional-optical-film feed unit
820: provisional-carrier-film take up drive mechanism
830: provisional-surface-protection-film take up drive mechanism
840: first inspection unit
850: second inspection unit
851: third inspection unit
852: fourth inspection unit
860: control unit
861: information processing device
862: storage device
870: provisional-surface-protection-film feed unit
880: carrier-film feed unit
890: lamination mechanism
891: carrier-film lamination mechanism
892: surface-protection-film lamination mechanism
910: optical-film take up drive mechanism
920: information recording unit

DETAILED DESCRIPTION

In the following detailed description, for purposes of explanation, numerous specific details are set forth in order to provide a thorough understanding of the disclosed embodiments. It will be apparent, however, that the disclosed embodiments may be practiced without these specific details. In other instances, well-known structures and devices are schematically shown in order to simplify the drawing.

Taking a widescreen television having a diagonal screen size of 42 inches as an example, a liquid-crystal panel W therefore comprises a layered liquid-crystal panel which includes a pair of rectangular-shaped substrates each having a size of about 540 to 560 mm in length× about 950 to 970 mm in width× about 0.7 mm (700 nm) in thickness, and a liquid-crystal layer having a thickness of about 5 nm having a transparent electrode, a color filter etc. and sandwiched between the glass substrates, as shown in FIG. 2. Therefore, the thickness of the liquid-crystal panel W itself is about 1.4 mm (1400 nm). The liquid-crystal display element typically has a polarizing sheet 11' commonly referred to as "polarizing plate" adhesively applied to each of a front side (viewing side) and a back side (backlight side) of the liquid-crystal panel W thereof. The polarizing sheet 11' is formed from a polarizing composite film 11 included in a continuous web of a flexible optical film 10 of a laminated structure, as shown in the perspective view at FIG. 1A, to have a rectangular shape with a size of 520 to 540 mm in length×930 to 950 mm in width, as shown in the perspective view FIG. 1B and in FIG. 2.

Although the substrates are usually formed from glass, this disclosure is not limited to glass substrates. Other materials such as plastics or composites made from various glass and plastic materials may be used to form either one or both of the substrates.

The continuous web of optical film 10 for use in forming the polarizing sheet 11' to be laminated to the liquid-crystal panel W typically consists of a flexible film of a laminated structure which comprises the polarizing composite film 11, surface-protection film 13 having an adhesive surface, and a carrier film 14. The polarizing composite film 11 shows a polarizing function, and generally includes a continuous layer of polarizer, two protective films laminated on respective ones of the opposite surfaces of the continuous polarizer layer, and an acrylic adhesive layer 12 formed on one side of the continuous polarizer layer which is to be applied to the liquid-crystal panel W. The carrier film 14 is a film releasably laminated to the adhesive layer 12 to provide a function of protecting the exposed side of the adhesive layer 12 of the polarizing composite film 11. The polarizing composite film 11 is formed through the following process, for example. A continuous polarizer layer having a thickness of 20 to 30 nm is first formed by subjecting a PVA (polyvinyl alcohol)-based film having a thickness of about 50 to 80 nm to a dyeing treatment using iodine and a cross-linking treatment, and subjecting the resultant PVA-based film to an orientation treatment based on stretching in a lengthwise or widthwise direction thereof. As a result, the iodine complex is oriented in the direction parallel to the stretching direction of the PVA-based film to acquire a property of absorbing a polarized light having a plane of oscillation matching with the orientation of the iodine complex to thereby provide a polarizer having absorption axes in the direction parallel to the stretching direction. Thus, in order to produce a polarizer having an excellent optical property in addition to excellent uniformity and accuracy, it is desirable that the stretching direction of the PVA-based film corresponds to the lengthwise or widthwise directions of the film. Therefore, generally, the absorption axis of a polarizer or an optical film including such polarizer is parallel to the lengthwise direction of the continuous web, and the polarizing axis is in the widthwise direction perpendicular to the absorption axis. Then, the protective film is laminated to one or each of the opposite surfaces of the formed continuous polarizer layer through an adhesive. Finally, on one side of the continuous polarizer layer with the protective film laminated, the acrylic adhesive layer 12 to be applied to the liquid-crystal panel W is formed. Generally, a transparent TAC (triacetylcellulose)-based film having a thickness of about 40 to 80 nm is often used as the protective film for protecting the continuous polarizer layer. In the following description, the continuous layer of polarizer may be simply referred to as "polarizer".

According to the definition of terms in "SEMI (Semiconductor Equipment and Materials International) Draft Document" on polarizing films for flat-panel display elements including liquid-crystal display elements (FPD Polarizing Films), the term corresponding to the "polarizing composite film and layer" constituting an optical film for use in a liquid-crystal display element is referred to as "films and layer composing polarizing films". Thus, the polarizing composite film 11 in the perspective view at FIG. 1A is interpreted as corresponding to the "films composing polarizing films". The polarizing sheet 11' in the perspective view at FIG. 1B which is formed in a rectangular shape from the polarizing composite film 11, corresponds to "polarizing films", so that it may be preferable to apply the term "polarizing sheet" to the latter, rather than the commonly called name "polarizing plate". In the following description, a film including a polarizer, a protective film laminated on one or both of opposite surfaces of the polarizer, and an adhesive layer formed on one side of the polarizer to be laminated to a liquid-crystal panel W, will be referred to as "polarizing composite film", and a sheet commonly called by the name "polarizing plate", which is formed in a rectangular shape from the polarizing composite film, will be referred to as "polarizing sheet" or simply "sheet". In addition, when a sheet is formed from a polarizing composite film having a surface-protection film and a carrier film attached thereto, and when this sheet has to be distinguished from "a polarizing sheet", the former is referred to as "an optical film sheet", and a sheet formed from the surface-protection film or the carrier film included in the composite film is respectively referred to as "a surface-protection film sheet" or "a carrier film sheet".

The thickness of the polarizing composite film 11 generally has a thickness of about 110 to 220 nm. The polarizing composite film 11 is generally comprised of a polarizer having a thickness of about 20 to 30 μm, two protection films which a total thickness may be about 80 to 160 nm when the protective films are laminated on respective ones of opposite surfaces of the polarizer, and an adhesive layer 12 which thickness formed on one side of the polarizer to be laminated to a liquid-crystal panel W is about 10 to 30 nm. The polarizing composite films 11 are laminated to respective ones of the front and back sides of the liquid-crystal panel W with the adhesive layer 12 in such a manner that polarizing axes intersect each other at an angle of 90 degrees. Thus, in manufacturing a liquid-crystal display element for a widescreen television having a diagonal screen size of 42 inch, on an assumption that a thickness of a liquid-crystal panel itself is about 1400 nm, and since a thickness of each of the polarizing composite films 11 is in the range of 110 to 220 nm, the liquid-crystal display element itself has an overall thickness of about 1620 to 1840 nm. The thickness of the liquid-crystal display element is still within 2.0 mm or less. In this case, the ratio of the thickness of the liquid-crystal display element to the overall thickness of the liquid-crystal panel W and the sheet 11' is about 10:1.5 to 10:3. If use is made of a polarizing composite film 11 having a protective film laminated to only one surface of the polarizer, and an adhesive layer formed on the other surface of the polarizer, from the view point of reducing the thickness of the liquid-crystal display element, the thickness of the polarizing composite film 11 itself can be reduced to 70 to 140 nm, so that an overall thickness of the resultant liquid-crystal display element is reduced to a range of about 1540 to 1680 nm. The ratio of a thickness of the liquid-crystal element to that of the liquid-crystal panel W and the sheet 11' will be in the range of about 10:1 to 10:2.

A continuous web of an optical film 10 for use in a liquid-crystal display element has a structure as shown in the perspective view at FIG. 1A. The structure of the continuous web of optical film 10 will be briefly described below, in connection with a manufacturing process thereof. A surface-protection film 13 with an adhesive surface having a thickness of about 60 to 70 nm is releasably laminated to the surface of a polarizing composite film 11 devoid of an adhesive layer, and a carrier film 14 is releasably laminated to an adhesive layer 12 provided on the surface of a polarizing composite film 11 which is to be laminated to the liquid-crystal panel W, for providing a function of protecting the adhesive layer 12. Typically, a PET (polyethylene terephthalate)-based film is used for each of the surface-protection film 13 and the carrier film 14. During the manufacturing process of the liquid-crystal display element, the carrier film 14 generally serves as a carrying medium (carrier) for the polarizing composite film 11, as well as the means to protect the adhesive layer 12. A film having such functions will hereinafter be referred to as a "carrier film". Both of the surface-protection film 13 and the carrier film 14 are so-called "manufacturing-process materials" which are to be peeled and removed prior to the final stage of the manufacturing process of the liquid-crystal display elements, and which are to be used for protecting the non-adhesive surface from being soiled or damaged, and also protecting the exposed surface of the adhesive layer, of the polarizing composite film 11, during the manufacturing process of the liquid-crystal display elements.

In the polarizing composite film 11, one of the protective films for protecting the polarizer may be replaced with a phase difference film made of a cycloolefin-based polymer, a TAC-based polymer or the like and having an optical compensation function. It may further be provided as a layer of a transparent substrate, such as a TAC-based substrate, having a polymer material, such as a polyester-based polymer or a polyimide-based polymer applied/arranged thereto and then cured. Further, in the case of a polarizing composite film to be laminated to the backlight side of the liquid-crystal display element, it may be possible to provide an additional function by laminating a brightness enhancement film to the backlight side protective film of the polarizer. In addition, regarding the structure of the polarizing composite film 11, there have been proposed various other variations, such as a technique of laminating a TAC-based film to one of opposite surfaces of the polarizer and laminating a PET film to the other surface of the polarizer.

One of the methods for providing a polarizing sheet 11' including a polarizer and a protective film laminated on one or both of opposite surfaces of the polarizer devoid of an adhesive layer for attaching to a liquid-crystal panel W comprises a step of laminating a carrier film 14 having a transferable adhesive layer formed thereon, to the surface of the polarizing sheet 11' to be laminated to the liquid-crystal panel W. A specific transfer technique is as follows. In a manufacturing process of the carrier film 14, the carrier film is subjected to a releasing treatment at the surface which is to be laminated to the polarizing sheet 11' at the surface of the polarizing sheet 11' which is to be laminated to the liquid-crystal panel and then a solvent containing adhesive is applied to the treated surface and dried to form an adhesive layer on the carrier film 14. Then, the carrier film 14 having the formed adhesive layer is laminated to the polarizing sheet 11', for example, while continuously feeding out the carrier film 14 and feeding out the polarizing sheet 11' in the same manner, so that the adhesive layer formed on the carrier film 14 is transferred to the polarizing sheet 11', and the adhesive layer 12 is formed. Instead of forming the adhesive layer in this manner, the adhesive layer 12 may be formed by directly applying a solvent containing adhesive to the surface of the polarizing sheet 11' to be laminated to the liquid-crystal panel, and drying the same.

Figure 1B:
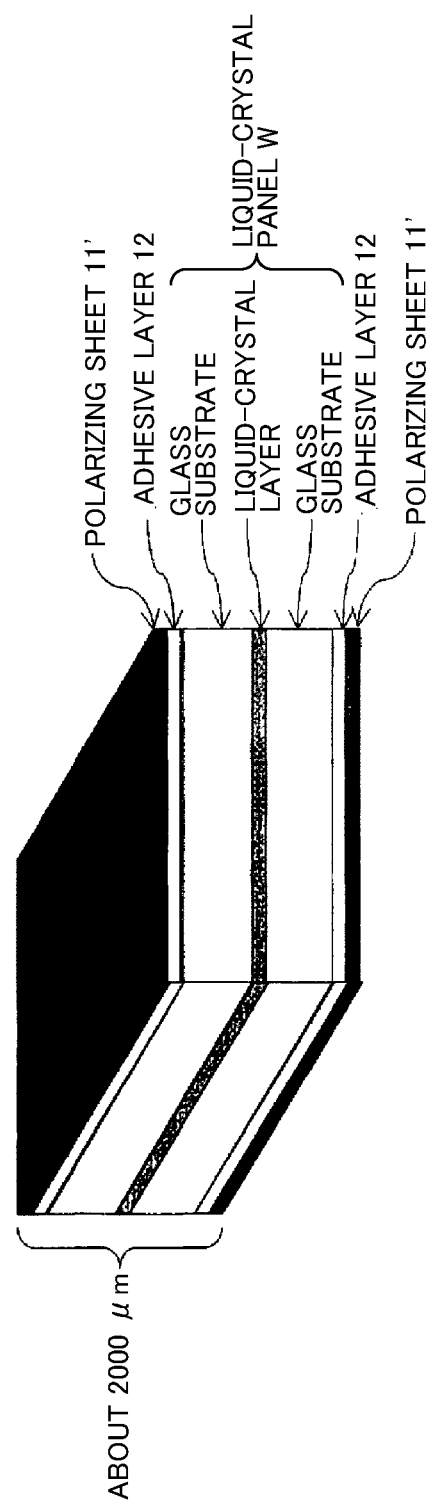
Figure 4:
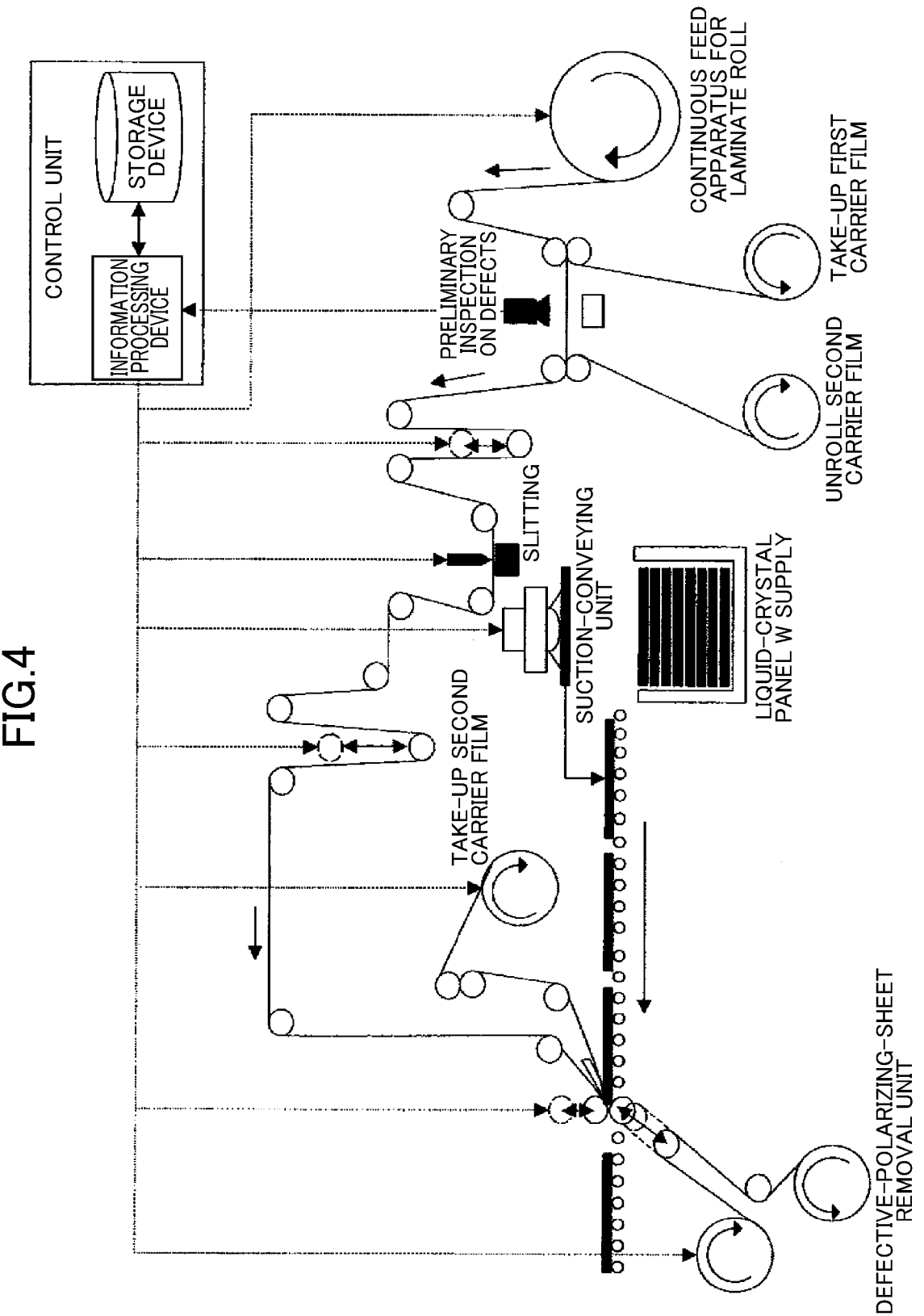
FIG. 4 is a conceptual diagram showing a system for continuously manufacturing liquid-crystal display elements wherein polarizing sheets are laminated on liquid-crystal panels through inspection of defects in the polarizing composite films, without interrupting the feed of the continuous web of optical film being fed.

The surface-protection film 13 typically has an adhesive surface. Unlike the adhesive layer 12 on the polarizing composite film 11, the adhesive surface must be peeled from a polarizing sheet 11' of the polarizing composite film together with a surface-protection film sheet (not shown) when the surface-protection film sheet is peeled and removed from the polarizing sheet 11' during the manufacturing process of the liquid-crystal display elements. The reason is that the surface-protection film sheet which is formed together with the polarizing sheet 11' is adapted for protecting the surface of the polarizing sheet 11' devoid of an adhesive layer 12 from the risk of being soiled or damaged, but not an adhesive surface to be transferred to the surface of the polarizing sheet 11'. The perspective view at FIG. 1B shows the state after the surface-protection film sheet is peeled and removed. It should further be noted that, irrespective of whether the polarizing composite film 11 has a surface-protection film 13 laminated thereon, it may be possible to provide the polarizing composite film 11 at the surface of the protective film on the front side of the polarizing composite film 11 with a hard coat treatment for protecting the outermost surface of the liquid-crystal display element, and/or a surface treatment for obtaining an anti-glare effect or the like, such as an anti-glare treatment.

As described above, the polarization axes of the polarizing composite films laminated to respective ones of front and rear surfaces of the liquid-crystal panel are oriented in substantially parallel with respect to the direction of the sides of the liquid-crystal panel which extend in directions crossed by 90 degrees from each other, so that, in using the VA-type and IPS-type liquid-crystal panels, there is no constraint regarding the orientation of the two polarizing film sheets with respect to the direction of the long or short side of the liquid-crystal display element, in order to obtain an increased viewing angle characteristics. Therefore, with such VA-type and IPS-type liquid-crystal panels, it becomes possible to realize a continuous manufacturing of the liquid-crystal display elements wherein a web of an optical film containing a polarizing composite film is continuously supplied and cut in the direction transverse to the feed direction of the optical film to form individualized polarizing sheets, and such polarizing sheets are sequentially laminated to respective ones of a plurality of liquid-crystal panels. In addition, if it becomes possible to define, while the optical film containing the polarizing composite film is being continuously fed, defective polarizing sheets including one or more defects detected by a preliminary inspection of the polarizing composite film contained in the optical film as well as normal polarizing sheets including no defect, and to advance only the normal polarizing sheets to the lamination station for lamination with respective ones of a plurality of sequentially supplied liquid-crystal panels to make liquid-crystal display elements, without interrupting the feed of the optical film, there will be remarkable improvements in accomplishing enhanced product accuracy and increased manufacturing speed as well as significantly improved production yield in the manufacture of liquid-crystal display elements.

The present disclosure is directed, as described later, to a continuous manufacture of liquid-crystal display elements wherein a continuous web of an optical film is provided, the optical film having a width corresponding to the width of the liquid crystal panel having predefined dimensions and at least comprising a polarizer film having an adhesive layer thereon and a carrier film releasably attached to the adhesive layer, the continuous web of optical film having a plurality of defective-polarizing-sheet slitting positions and normal-polarizing-sheet slitting positions defined thereon in the form of lines extending in the widthwise direction of the continuous web of optical film, based on positions of defects present in the continuous web of optical film and detected through a preliminary inspection of a polarizing composite film, the defective-polarizing-sheet slitting positions being for defining regions containing one or more defects and the normal-polarizing-sheet slitting positions being for defining regions having no defect, the defective-polarizing-sheet slitting positions and the normal-polarizing-sheet slitting positions being recorded on the web as encoded information, wherein individualized polarizing film sheets being formed from the continuous web of optical film to have dimensions corresponding to those of the liquid crystal panels and applied to the liquid crystal panels to form liquid crystal display elements, wherein the continuous web of optical film is continuously fed to a lamination station while measuring a feed distance of the continuous web and calculating the feed-length measurement data based on the feed distance, and reading the encoded information recorded on the continuous web, wherein a plurality of slit-lines are formed in the continuous web by slitting the continuous web from the surface opposite to the carrier film to a depth reaching the surface of the carrier film adjacent to the adhesive layer, along the slitting positions, based on the encoded information and the feed-length measurement data, when the slitting position defined in the continuous web thereon comes to a slitting station, the encoded information being used for determining whether the polarizing sheets being formed between an adjacent pair of the slit-lines sequentially formed in the continuous web is a defective polarizing sheet having defects or a normal polarizing sheet having no defect, wherein the polarizing sheet determined to be the normal polarizing sheet, among the polarizing sheets being formed between an adjacent pair of the slit-lines sequentially formed in the continuous web of optical film is then peeled from the carrier film, and transported to the lamination station, wherein a liquid-crystal panel is transported to the lamination station in synchronization with the transportation of the normal polarizing sheet to the lamination station and the normal polarizing sheet is applied to the liquid-crystal panel. Specifically, the technical target of the present disclosure is to realize an uninterrupted sequential lamination of normal polarizing sheets to liquid crystal panels by sequentially supplying formed normal polarizing sheets without any interruption of feed of the continuous web of optical film by providing means wherein a continuous web of an optical film containing a polarizing composite film is fed to a lamination station for lamination with a liquid-crystal panel, followed by sequentially forming defective polarizing sheets including one or more defects detected through a preliminary inspection of the polarizing composite film contained in the optical film and normal polarizing sheets including no defect respectively, from the continuous web at a slitting station, while the continuous web is being fed, the formed defective polarizing sheet being prevented from being laminated to the liquid-crystal panel.

Specific embodiments are now described with reference to the accompanying drawings.

I. A Continuous Manufacturing System and Method for Liquid-Crystal Display Elements (General Description of a Continuous Manufacturing System for Liquid-Crystal Display Elements)

Figure 5:
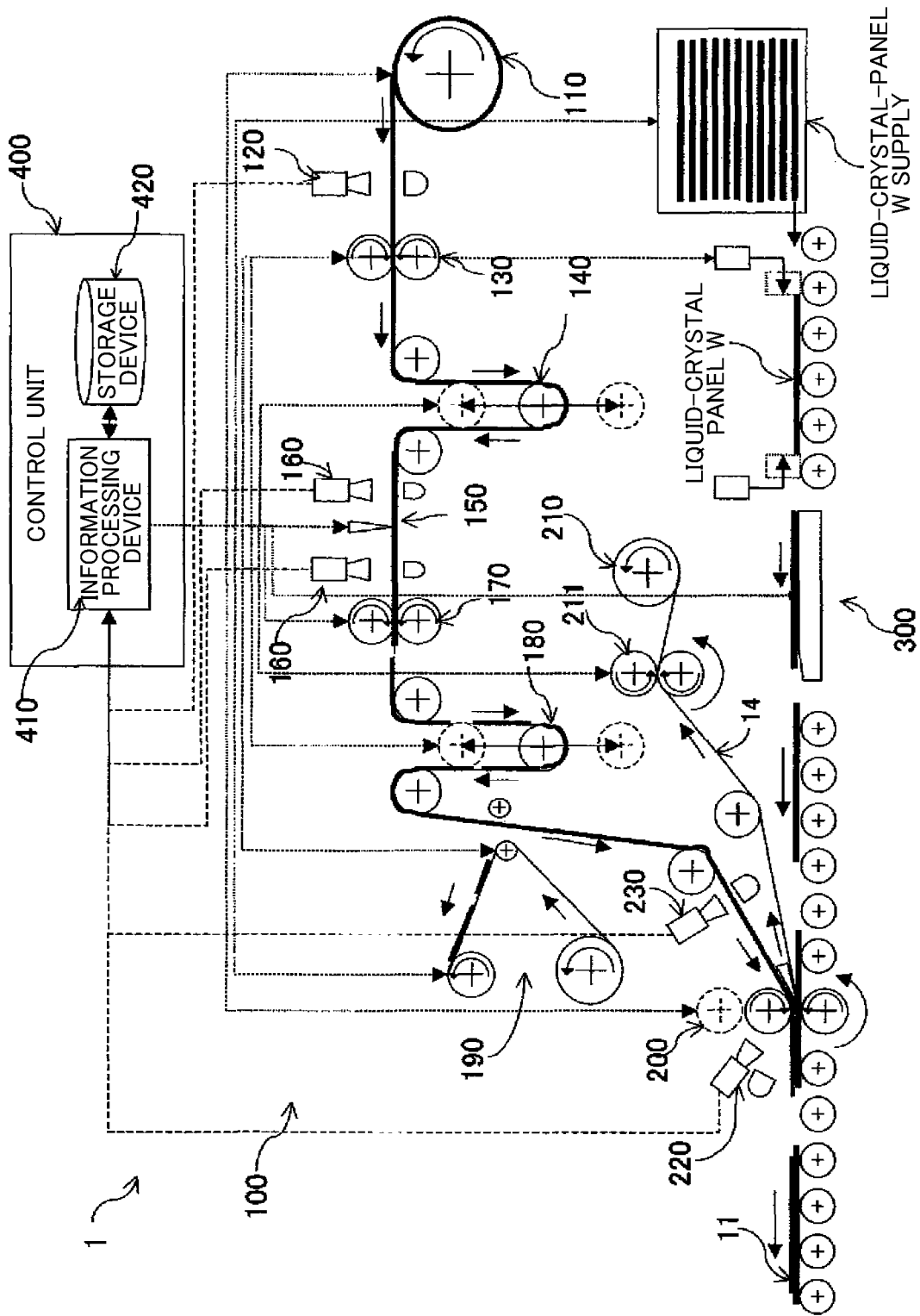
FIG. 5 is a conceptual diagram showing a continuous manufacturing system for liquid-crystal display elements according to one embodiment, wherein the system comprises an optical-film feed apparatus for feeding a web of an optical film from a roll of the optical film laminate, and a liquid-crystal-panel conveyance apparatus for conveying a liquid-crystal panel to be laminated with a normal polarizing sheet cut by forming slit lines in the continuous web of optical film being fed.
Figure 6:
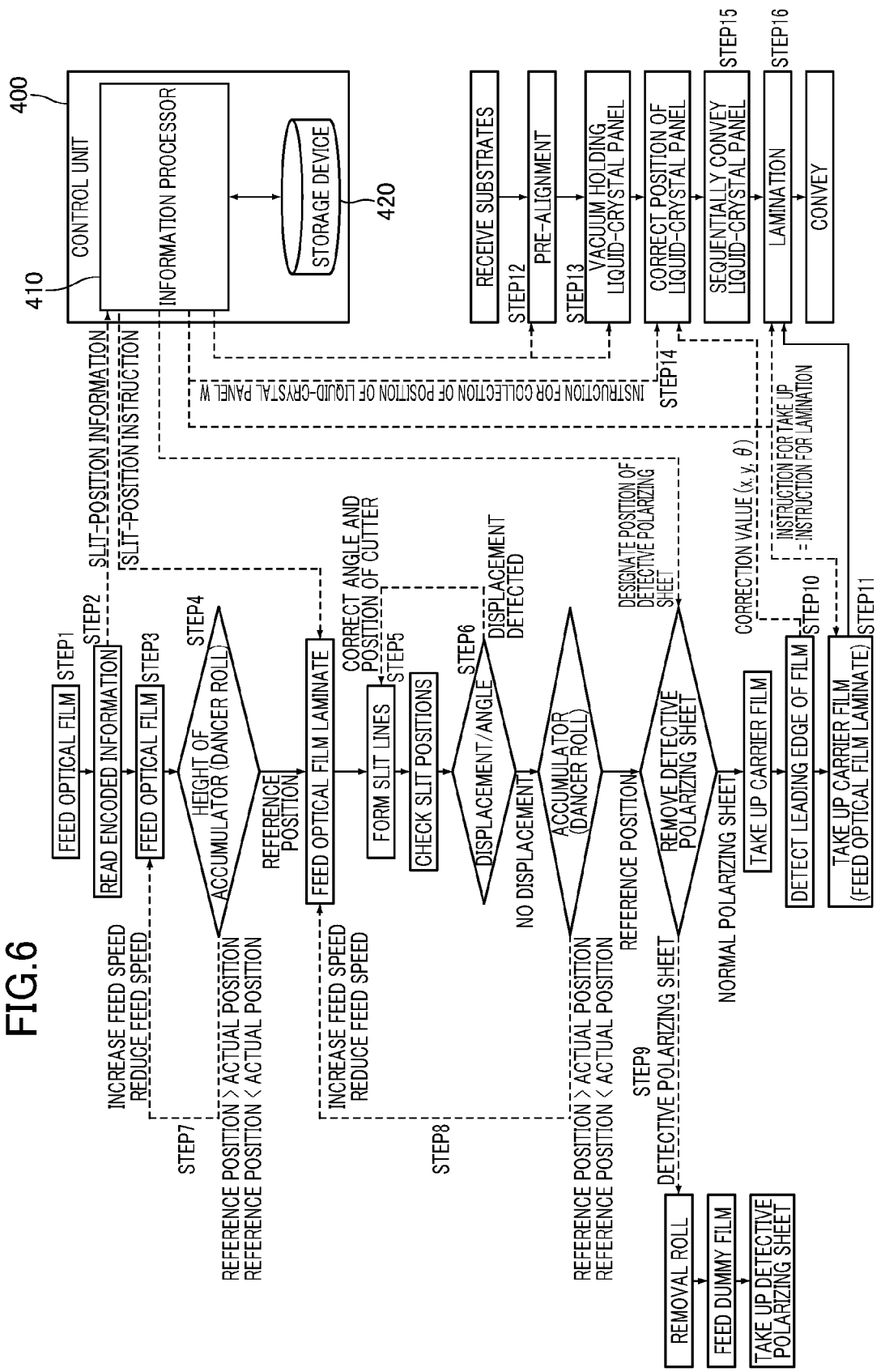
FIG. 6 is a flow chart showing a manufacturing process or steps in continuous manufacturing system for liquid-crystal display elements in FIG. 5.

FIG. 5 is a schematic diagram showing a continuous manufacturing system for liquid-crystal display elements 1, which comprises an optical-film feed apparatus 100 having a roll of an optical film laminate for manufacturing liquid-crystal display elements according to at least one embodiment, and a liquid-crystal-panel conveyance apparatus 300 for conveying liquid-crystal panels to be laminated with normal polarizing sheets formed from a continuous web of optical film fed from the roll. The continuous manufacturing system 1 comprises at least a slitting station A for forming a plurality of polarizing sheets from the continuous web of optical film, a removal station C for removing defective polarizing sheets and a lamination station B for laminating normal polarizing sheets to liquid-crystal panels, and the lamination station B and the removal station C may be positioned redundantly as described later. FIG. 6 is a flowchart showing a manufacturing process or process steps in the continuous manufacturing system for liquid-crystal display elements 1 illustrated in FIG. 5.

The optical-film feed apparatus 100 comprises a support rack 110 for rotatably mounting a roll of optical film laminate 10 according to one embodiment of the present disclosure, a reading unit 120 for reading encoded information, a film feed unit 130 including a feed roller, a speed adjustment unit 140 including a dancer roller for providing a constant speed film feeding, a slitting unit 150 provided at a slitting station A for forming a plurality of slits in the continuous web of optical film in a direction transverse to the feed direction of the continuous web from the surface opposite to the carrier film to a depth reaching the adhesive layer surface of the carrier film to form slit lines, a slit-position check unit 160 provided also at the slitting station A for checking the formed slit lines, a film feed unit 170 including a feed roller, a speed adjustment unit 180 including a dancer roller for providing a constant speed film feeding, a defective-polarizing-sheet removal unit 190 provided at a removal station C for removing a slit defective polarizing sheet from the carrier film, a lamination unit 200 provided at a lamination station B including a pair of lamination rollers for applying a normal polarizing sheet which has been slit and peeled from the carrier film to a liquid-crystal panel, a carrier-film take up mechanism 210 for taking up the carrier film, an sheet-edge detection unit 220 for detecting a leading edge of the normal polarizing sheet provided also at the lamination station B and an straight-ahead-posture detection unit 230 for detecting an advance direction of the normal polarizing sheets having slit lines to be comprised in the continuous web of optical film.

(Provisions of the Roll of the Optical Film Laminate 10)

It is preferable that the roll of the optical film laminate 10 according to this embodiment installed in the optical-film feed apparatus 100 has a width approximately equal to a length of a long or short side of a liquid-crystal panel to which it is applied. It is preferable that a transparent protective film is used for the protective film laminated on one or each of the opposite surfaces of the polarizer as shown in the schematic diagram of FIG. 1A and FIG. 1B. The roll of the optical film laminate 10 comprises a roll of an optical film laminate comprising a continuous web of an optical film comprised of a polarizing composite film 11 including a polarizer having an adhesive layer 12 provided on the surface of the polarizer which has a transparent protective film laminated thereon and which is to be attached to a liquid-crystal panel, a surface-protection film 13 having an adhesive surface which is releasably laminated on the surface of the polarizing composite film 11 opposite to the surface having the adhesive layer 12, and a carrier film 14 releasably laminated on the adhesive layer 12 of the polarizing composite film 11. The carrier film 14 is a releasable film adapted to protect the adhesive layer 12 of the polarizing composite film 11 during the manufacturing process of liquid-crystal display elements and to be removed by being taken up when the polarizing sheet formed in the continuous web of optical film is peeled prior to or during lamination process for attaching the polarizing sheet to the liquid-crystal panel. In this embodiment, the term "carrier film" is used since the film has a function of carrying the normal polarizing sheets in the polarizing composite film 11 to the lamination station B.

The roll of the optical film laminate 10 is formed as follows. Details of the method for manufacturing the roll of the optical film laminate 10 will be described later. During the manufacturing process of the roll of the optical film laminate 10, defects existing in the polarizing composite film 11 of the optical film being continuously fed are first detected using an inspection unit. Then, based on the detected locations or coordinate positions of the defects in the polarizing composite film 11, defective regions and defect-free, normal regions are defined in the polarizing composite film 11 as shown in FIG. 3. Then, information including slit-position information and optional identification information for identifying the defective regions and the normal regions is recorded on the optical film being continuously fed. The slit-position information is indicating the positions at which respective ones of the slit lines are to be formed in the continuous web of optical film, and the slit lines are formed in pairs by slitting unit 150 at the slitting station A based on the defective and normal regions of the polarizing composite film 11, during the manufacturing process of the liquid-crystal display element, in a manner as to slit sequentially the continuous web of optical film being fed in a direction transverse to the feed direction of the continuous web to a depth reaching the adhesive layer surface of the carrier film. The information including the slit-position information and the optional identification information to be recorded on the continuous web of optical film is encoded information created together with or in association with additional information, such as information relating to the manufacturing lot and the length of the web in the roll. Preferably, the encoded information is recorded on the carrier film 14 in the optical film to be continuously fed. It is to be understood that the encoded information may be recorded on the carrier film 14 in any of a variety of modes, such as a mode in which encoded information including all necessary information is recorded on a single storage location, or a mode in which a plurality of encoded information locations each including different information are recorded on a plurality of storage locations at given intervals (e.g., at intervals of 1 m or 100 m). The encoded information may be recorded on the surface-protection film 13, instead of the carrier film 14. In either case, the encoded information is configured to be readable by the reading unit 120 of the continuous manufacturing system 1.

The slitting unit 150 provided at the slitting station A in the continuous manufacturing system 1 having the roll of the optical film laminate 10 mounted thereon is operated, during the manufacturing process of the liquid-crystal display element, by having the feed-length measurement data on an optical-film fed-out distance calculated when the optical film is unrolled from the roll of the optical film laminate 10 related with the slit-position information included in the encoded information and read by the reading unit 120 of the continuous manufacturing system 1. The region of the polarizing composite film defined by respective longitudinally adjacent two slit lines may include a defect-free normal region having a given length determined by the length of a side of a liquid-crystal panel to be laminated with the polarizing composite film, and a defective region having a length generally less than the given length. During the manufacturing process of the liquid-crystal display element, the defective region of the polarizing composite film 11 which is cut along pairs of slit lines by means of the slitting unit 150 is defined as a defective polarizing sheet Xβ which is to be removed from the continuous web of optical film (specifically, the carrier film 14) by the defective-polarizing-sheet removal unit 190 of the continuous manufacturing system 1 at the removal station C. The normal region of the polarizing composite film 11 is cut in the same manner and defined as a normal polarizing sheet Xα which is to be peeled from the continuous web of optical film (specifically, the carrier film 14) and laminated to one of opposite surfaces of a liquid-crystal panel by means of the lamination unit 200 of the continuous manufacturing system 1 at the lamination station B.

Referring to FIG. 3, a specific formation of the slit lines into the polarizing composite film 11 based on the normal region and the defective region of the polarizing composite film is described as follows. The length (Xα) of the normal region previously defined in accordance with the locations or the coordinate positions of defects in the polarizing composite film 11 is determined to a constant value in accordance with the length of one of the sides of the liquid-crystal panel which is to be laminated with the normal polarizing sheet. Similarly, with respect to the defective region which is also previously defined, the upstream side slit line for defining the defective region is defined by the downstream side slit line defining the normal region which is located immediately upstream side of the defective region, as seen in the feed direction of the web. Thus, the length (Xβ) of the defective region is determined by the upstream side slit line and a downstream side slit line which is formed slightly downstream side of the location or coordinate position of a defect. Since the length between the upstream side slit line of the defective region and the location or coordinate position of defects of the polarizing composite film as seen in the feed direction may not be fixed, the length (Xβ) of the defective region varies accordingly. In accordance with one embodiment, the length (Xβ) of the defective region is determined through an information processing, when a processing is made for determining the slit-position information which designates the position at which the slit line is to be formed, so that it is always different from the length (Xα) of the normal region, e.g., to establish the relationship Xβ<Xα, in any case. In accordance with another embodiment, it may be possible that identification information Xγ is produced to identify the defective region from the normal region, when the length (Xβ) of the defective region becomes equal to the length (Xα) of the normal region. In this case, the produced identification information Xγ is incorporated into the encoded information together with and in association with the slit-position information. It may be possible that the continuous manufacturing apparatus 1 is configured such that, during the manufacturing process of liquid-crystal display elements, at the slitting station, the slitting unit 150 functions to form the normal polarizing sheet Xα and the defective polarizing sheet Xβ according to the slit-position information read by the reading unit 120, and the defective-polarizing-sheet removal unit 190 at the removal station functions to readily discriminate and remove only defective polarizing sheets having lengths (Xβ) different from the length (Xα) of the normal polarizing sheet. In the case where the encoded information includes the identification information Xγ for identifying the defective region over the normal region, the defective-polarizing-sheet removal unit 190 functions, based on the identification information, to discriminate and remove only defective polarizing sheets. The specific manufacturing process of the roll of the optical film laminate 10 used in the continuous manufacturing system 1 will be described later.

The roll of the optical film laminate 10 is mounted on the support rack 110 of the continuous manufacturing system 1. Preferably, the support rack 110 is provided with an encoder (not shown) for determining the feed length of the optical film, the feed-length measurement data obtained by the encoder is stored in a storage device 420 of a control unit 400. Alternatively, a measurement device may additionally be provided in the optical-film feed apparatus 100 for calculating the feed length of the continuous web of optical film.

In operation of the entire system, a roll of dummy film is first installed on the support rack 110. A continuous web of dummy film is unrolled from the roll of dummy film under tension by means of first and second film feed units 130, 170 each including feed rollers. The dummy film is advanced until its leading edge reaches a position where, under a normal operation, the carrier film 14 from which the normal polarizing sheet Xα is peeled, is passed through the lamination unit 200 provided at the lamination station B and taken up by the carrier-film take up drive mechanism 210. Then, the trailing end of the dummy film is connected to the leading end of the optical film unrolled from the roll of the optical film laminate 10, and a supply of the optical film is initiated. In order to allow the continuous web of optical film to be maintained at a constant speed under tension even if the feed of the optical film is temporarily stopped at the slitting station A where the slit lines are formed in the polarizing composite film by the slitting unit 150 or at the lamination station B where the normal polarizing sheet is laminated on a liquid-crystal panel, there are provided first and second speed adjustment units 140, 180 each including the aforementioned dancer rollers immediately before these positions.

In the continuous manufacturing system, assuming that a single roll of the optical film laminate includes 1000 meters of length of the web of the laminate for example, and the production capacity of the continuous manufacturing system 1 amounts to the order of 5,000 to 20,000 meters a day, a single such continuous manufacturing system 1 will be operated by being sequentially connected with 5 to 20 rolls of the optical film laminate in a day. It can be said that the continuous manufacturing system for liquid-crystal display elements 1 using the roll of the optical film laminate 10 according to this embodiment to make liquid-crystal display elements, makes it possible to enhance product accuracy and double the manufacturing speed compared to the conventional manufacturing system using individualized sheets, on the condition that a plurality of liquid-crystal panels W can be sequentially fed without any problem. In this case, the number of the rolls of the optical film laminate to be handled will increase significantly, which gives rise to a new technical need for automatic replacement of the roll of the optical film laminate.

(Reading and Information Processing of Encoded Information)

In this embodiment, slit lines are sequentially formed on the continuous web of optical film leaving the carrier film 14 uncut by the slitting unit 150 at the slitting station A, the normal polarizing sheet Xα of the polarizing composite film 11 cut along the adjacent two of slit lines is then peeled from the carrier film 14 immediately before the lamination unit 200 at the lamination station B, and the peeled normal polarizing sheet Xα is laminated to a liquid-crystal panel through the exposed adhesive layer 12 to make a liquid-crystal display element. During this process, the carrier film 14 is taken up by the carrier-film take up drive mechanism 210. Generally, the surface-protection film 13 is made to be a sheet configuration which is held together with a normal polarizing sheet Xα of polarizing composite film 11 which is to be laminated to a liquid-crystal panel, and the sheet of the surface-protection film is peeled and removed after the final step including cleaning/drying is carried out on the liquid-crystal display element to be produced. Both of the carrier film and the surface-protection film are manufacturing-process materials required for carrying out the process, but are removed in the final stage of the manufacturing process and discarded. Thus, it is one of the features of the roll of the optical film laminate 10 in accordance with this embodiment to use such a manufacturing-process material as an information storing medium necessary for the manufacturing process. In the followings, description will solely be made with regard to an example wherein only the carrier film is utilized as a manufacturing-process material used for the information storing medium.

Figure 7:
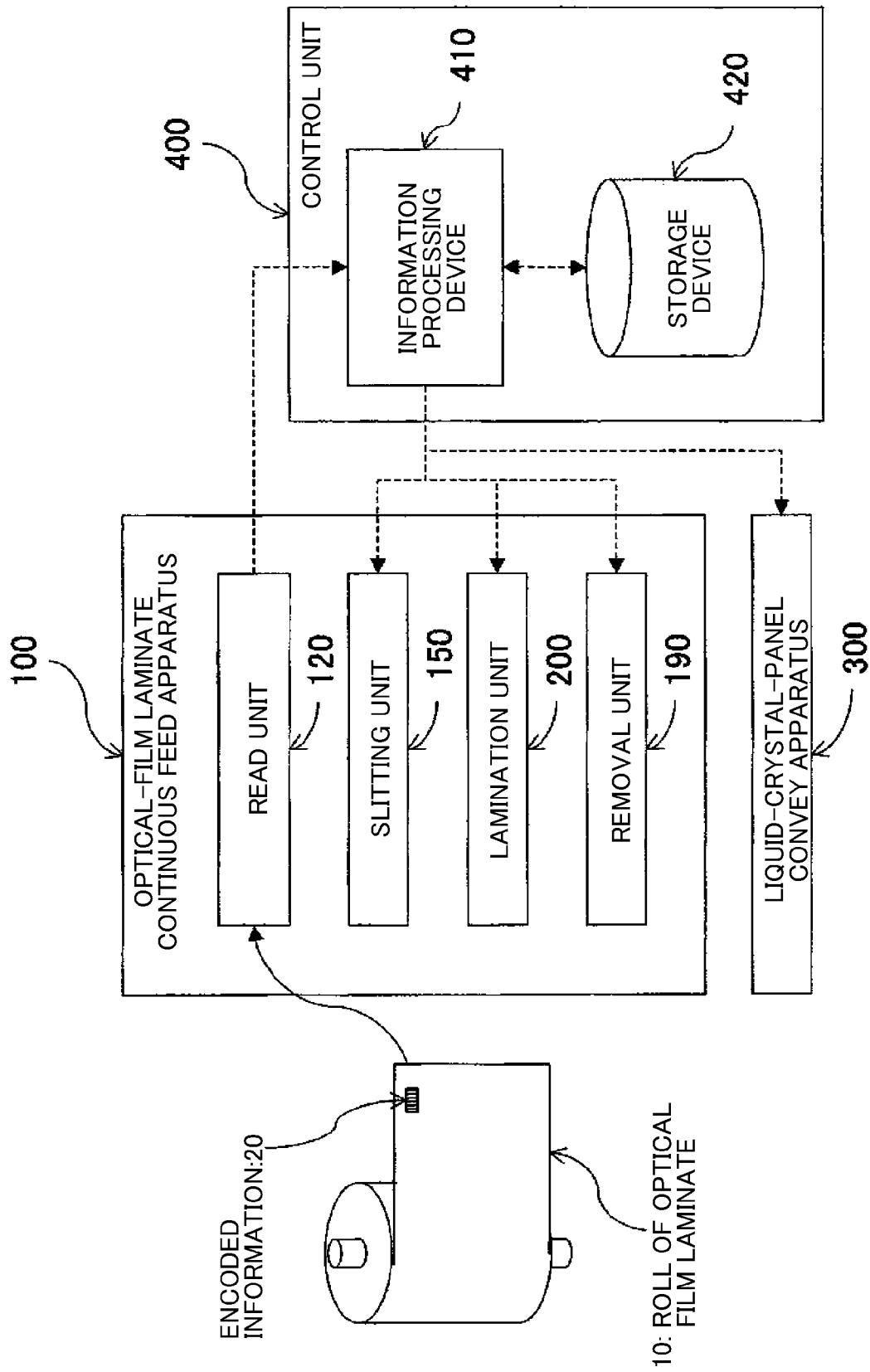
FIG. 7 is a schematic diagram showing the relationship between a control unit for controlling device of the optical-film feed apparatus and the liquid-crystal-panel conveyance apparatus illustrated in FIG. 5, and encoded information read by a reading unit and processed by an information processing device in the continuous manufacturing system for liquid-crystal display elements, according to at least one embodiment.

FIG. 7 is a schematic diagram showing a relation between the encoded information 20 to be read by the reading unit 120 of the continuous manufacturing system 1 and processed by an information processing device 410, and the previously described control unit 400 for controlling each of the units respectively provided in the optical-film feed apparatus 100 (see FIG. 5) and the liquid-crystal-panel conveyance apparatus 300 (see FIG. 5) for sequentially conveying the liquid-crystal panels. The encoded information 20 recorded in the roll of the optical film laminate 10 includes the slit-position information indicating the positions at which respective ones of the slit lines are formed in pairs in the continuous web of optical film, and optionally the identification information for identifying the defective region over the normal region of the polarizing composite film. Defects existing in the polarizing composite film 11 included in the optical film are detected by the inspection unit in the manufacturing process of the continuous web of roll of optical film laminate 10, as described later, and based on defective and normal regions in the polarizing composite film determined from the locations or the coordinate positions of the detected defects, at the slitting station of the continuous manufacturing system 1, the slitting unit 150 forms a plurality of slits in the continuous web of the optical film in a direction transverse to the feed direction of the optical film sequentially fed, from the surface opposite to the carrier film to a depth reaching the adhesive layer surface of the carrier film.

As shown in FIG. 7, the encoded information 20 is preferably recorded on the carrier film contained in the optical film. The recorded encoded information 20 is read by the reading unit including a code reader or a CCD camera, and the encoded information 20 read in this manner is transmitted to the information processing device 410 included in the control unit 400 of the continuous manufacturing system 1. As is clear from the control of each unit and the manufacturing process flow illustrated in FIGS. 5 and 6, and the schematic diagram of FIG. 7, the encoded information 20 read by the reading unit 120 is transmitted to the information processing device 410, and then the information processing device 410 functions to process the received encoded information 20. The control unit 400 is also operable, based on the encoded information 20 processed by the information processing device 410, to systematically control respective units included in the liquid-crystal-panel W conveyance apparatus 300, and the optical-film feed apparatus 100, such as the slitting unit 150 provided at the slitting station A, the defective-polarizing-sheet removal unit 190 provided at the removal station C and the lamination unit 200 provided at the lamination station B, in an inter-related manner.

The outline of the control of the entire system will be described below. Based on the slit-position information included in the processed encoded information, the control unit 400 functions to control the operation of the film feed unit 130 including the feed rollers to feed the optical film and then control the operation of the first speed adjustment unit 140 to temporarily stop the feed of the optical film. Then, the control unit 400 functions to control the operation of the slitting unit 150 at the slitting station A to form a plurality of slit lines in the continuous web of the optical film in a direction transverse to the feed direction of the continuous web of the optical film, from the surface opposite to the carrier film to a depth reaching to the adhesive layer surface of the carrier film.

The continuous web of the optical film having the slit lines formed thereon is transported to the slitting position checkup unit 160 where the slit line positions on the web are confirmed. Then, the defective polarizing sheets Xβ and the normal polarizing sheets Xα formed by the slit lines in the continuous web of the optical film are identified or discriminated from each other based on the difference in length, and only the defective polarizing sheets Xβ are peeled and removed from the carrier film 14 using the defective-polarizing-sheet removal unit 190 at the removal station C inter-related with the film feed unit 170 including feed rollers and the speed adjustment unit 180. In the case where encoded information includes the identification information for identifying the defective region over the normal region, it is possible for the defective-polarizing-sheet removal unit 190 to peel and remove only the defective polarizing sheets Xβ from the carrier film 14 based on the identification information. The continuous web of the optical film from which the defective polarizing sheets Xβ are removed is then transported by the carrier-film take up drive mechanism 210 to the lamination station B, in synchronization with the feed of the liquid-crystal panels being sequentially conveyed. The carrier film 14 is taken up at a position where the leading edge of the normal polarizing sheet Xα defined by the slit lines in the polarizing composite film reaches the leading edge of the conveyed liquid-crystal panel, where the normal polarizing sheet Xα is peeled and the lamination unit 200 including the pair of lamination rollers at the lamination station B starts laminating operation to attach the normal polarizing sheet Xα to a corresponding one of the liquid-crystal panels.

The manufacturing process of liquid-crystal display elements are described with respect to specific operations of the respective units operated by the control unit 400, including the laminating operation at the lamination station B to attach the normal polarizing sheet Xα to a corresponding one of the liquid-crystal panels.

(Removal of Defective Polarizing Sheet)

Figure 8:
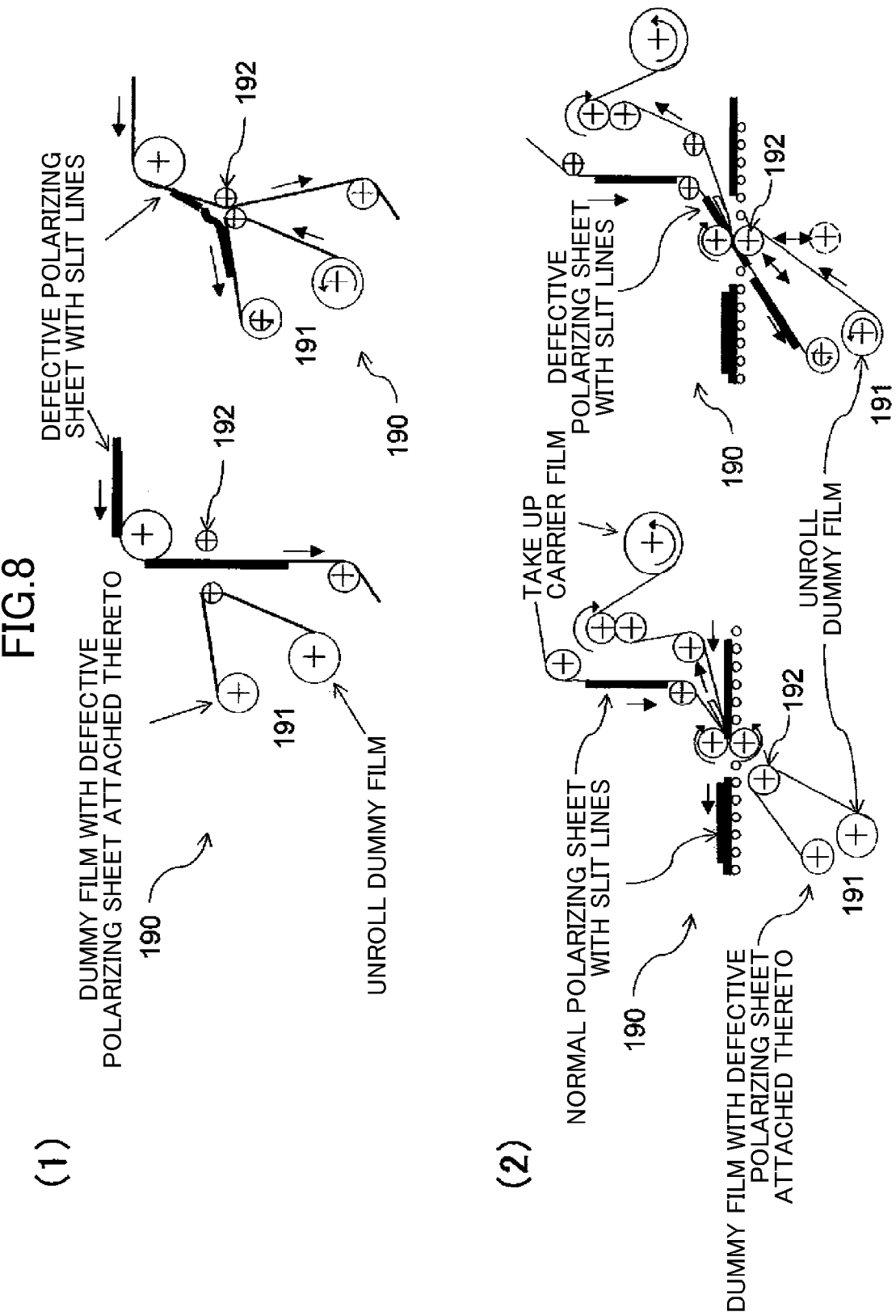
FIG. 8 is a schematic diagram showing a defective-polarizing-sheet removal unit comprising (1) a dummy-film drive mechanism disposed in a feed passage for an optical film or (2) a dummy-film drive mechanism adapted to be moved in and away from a gap between a pair of lamination rollers movable closer to and away from each other in the continuous manufacturing system for liquid-crystal display elements, according to at least one embodiment.

The defective-polarizing-sheet removal unit 190 is operated under the control of the control unit 400 to identify or discriminate only the defective polarizing sheet Xβ having a length different from that of the normal polarizing sheet Xα, or only the defective polarizing sheet Xβ associated with the identification information as a defective polarizing sheet, from the carrier film 14 on which the normal polarizing sheets Xα and the defective polarizing sheets Xβ of the polarizing composite film 11 formed by the slit lines are laminated in a releasable manner in the continuous web of the optical film, and peel and remove only the defective polarizing sheet Xβ from the carrier film 14. FIGS. 8 (1) and 8 (2) show such defective-polarizing-sheet removal units 190 adapted, under control of the control unit 400, to identify or discriminate only the defective polarizing sheets Xβ.

The defective-polarizing-sheet removal unit 190 illustrated in FIG. 8 (1) comprises a dummy-film drive mechanism 191 having a function of attaching to thereon and peeling the defective polarizing sheet from the carrier film 14, and a move mechanism 192 adapted to be activated when the defective polarizing sheet Xβ reaches a position in a feed path where removal of the defective polarizing sheet is to be initiated, wherein the move mechanism 192 is adapted to move the feed path of the optical film so that the feed path of the optical film is moved toward and away from the dummy-film feed path of the dummy-film drive mechanism 191.

The defective-polarizing-sheet removal unit 190 illustrated in FIG. 8 (2) is configured, at the lamination station B, under control of the control unit 400, to be moved in an inter-related manner with the lamination unit 200 including the pair of lamination rollers, and comprises a dummy-film drive mechanism 191 having a function of attaching to thereon and peeling the defective polarizing sheet Xβ from the carrier film 14, and a movable roller 192 defining a dummy-film feed path of the dummy-film drive mechanism 191. The removal unit illustrated in FIG. 8 (2) is different from the removal unit illustrated in FIG. 8 (1) in that, in the removal unit illustrated in FIG. 8 (2), at the lamination station B, the movable roller 192 defining the dummy-film feed path is disposed adjacent to the pair of lamination rollers of the lamination unit 200, and adapted to be moved in an inter-related manner with the lamination rollers of the lamination unit 200. More specifically, when the defective polarizing sheet Xβ reaches the end position (i.e., the removal initiation position) of the feed path of the optical film at the lamination station B, the pair of lamination rollers are moved apart from each other, and the movable roller 192 defining the dummy-film feed path is moved to a nip between the lamination rollers located in spaced-apart relation, and moving the movable roller 192 and one of the lamination roller in an inter-related manner by replacing the movable roller 192 with the other of the lamination rollers. In this instance, since the carrier film 14 is taken up by the carrier-film take up drive mechanism 210, the defective polarizing sheet Xβ is peeled from the carrier film 14, and the peeled defective polarizing sheet Xβ is attached to the dummy-film feed path by means of the movable roller 192 operated in an inter-related manner with another roller of the pair of the lamination roller and removed.

(Checkup of Slit Lines in the Continuous Web of the Optical Film)

In the manufacturing process of the continuous web of roll of the optical film laminate 10, there are two regions previously defined, comprising the defect-free normal region and the defective region having a defect or defects, based on the locations or coordinate positions of defects existing in the inspected polarizing composite film 11, and based on such regions, the continuous web of the optical film unrolled from the roll of the optical film laminate has the slit-position information which is in the form of a coded information 20, the slit-position information indicating the positions at which respective ones of the slit lines are to be formed in the carrier film contained in the optical film being fed during the manufacturing process of liquid-crystal display elements. The slit-position information is read by the reading unit 120 in the continuous manufacturing system 1 during the manufacturing process of liquid-crystal display elements. Then at the slitting station A, the slitting unit 150 functions, based on the read slit-position information, to form the slit lines sequentially in the continuous web of the optical film in the direction transverse to the feed direction. If the sequential slit lines are not accurately formed, it will become meaningless to control the operation of the slitting unit 150 in association with the feed-length measurement data obtained from the optical film fed-out distance measured during transportation of the optical film from the roll of the optical film laminate 10.

Figure 9:
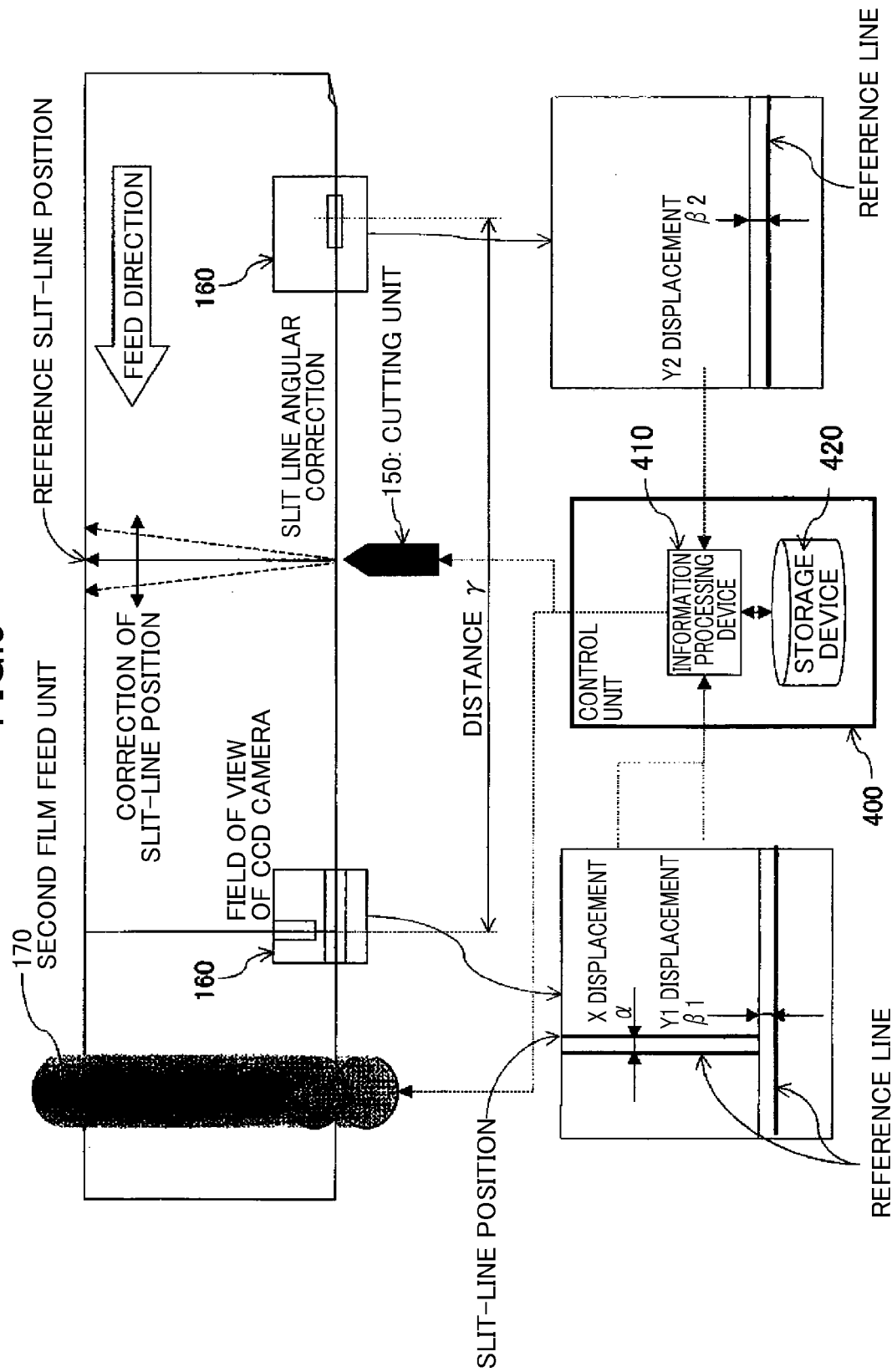
FIG. 9 is a schematic diagram showing the operation of a slitting position checkup unit, together with the inspection method for checking a difference between feed-length measurement data on an optical-film feed length measured based on a slit line formed in the continuous web of optical film being fed, and the position for forming a slit-line read by a reading device in the continuous manufacturing system for liquid-crystal display elements, according to at least one embodiment.

FIG. 9 is a schematic diagram showing the operation of the slitting position checkup unit 160 including the manner of inspection for determining a difference between the position of a slit line actually formed in the continuous web of optical film in the direction transverse to its feed direction, and the slit line formation position at which the slit-line is to be formed as read by the reading unit 120 in connection with the feed-length measurement data of the optical film fed-out distance. Two slitting position checkup units 160 are provided at the upstream and downstream sides as seen in the feed direction of the optical film with respect to the slitting unit 150. The film feed unit 170 including the feed rollers is disposed at the downstream side of the downstream slitting position checkup unit 160, so that the downstream slitting position checkup unit 160 functions to restart the feed of the continuous web of optical film which is temporarily stopped when the slit lines are formed. The speed adjustment unit 140 including the dancer roller is disposed at the upstream side of the upstream slitting position checkup unit 160, so that it is possible to maintain the feed of the continuous web of optical film by the film feed unit 130 including the feed rollers, even if the feed of the continuous web of optical film is temporarily stopped when the slit lines are formed.

Coincidence of the position of the slit line actually formed in the direction transverse to the feed direction of the continuous web of optical film with the position obtained based on the feed-length measurement data about the optical-film feed length can be affirmed by determining the accurate positions in the traveling direction (X direction) and the transverse direction (Y direction) of the optical film. One preferable way is to carry out measurements, at two locations at the opposite sides of the position of the optical film where the slit line is to be formed, for the deviations in X and Y directions on the position of the actually formed slit-line and the edge of the optical film (the side end) with respect to respective reference lines. For example, the slitting position checkup unit 160 may be provided with a CCD camera to take images of the position of the actually formed slit-line and the position of the edge of the optical film, and produce picturized images. The reference lines are previously provided in the image-taking regions. The position of the actually formed slit-line and the position of the edge of the optical film can be determined in terms of differences in contrasts in the taken images. Then, a calculation is made to determine the distance (deviation) between the predetermined reference lines and the positions of the actually formed slit-line and the edge of the optical film, and the location and the angular position of the slitting unit 150 is corrected forwardly or backwardly with respect to the feed direction of the continuous web of optical film, based on the calculated distance (deviation).

More specifically, as shown in FIG. 6, Steps 3, 4 and 7 are performed to feed the continuous web of the optical film under tension, and in Step 5, a slit line is formed in the continuous web of the optical film. Then, a further step is carried out by the two slitting position checkup units 160 to determine whether there is any deviation between the position of the actually formed slit-line of the optical film and the position where the slit-line is to be formed, the latter position being determined based on the slit-position information read by the reading unit 120, and in the case where there is any deviation, Steps 6 and 8 are carried out, for example, in the following manner.

The manner of the inspection for determining the deviation between the position of the actually formed slit-line of the continuous web of optical film and the position where the slit-line is to be formed as read by the reading unit 120 is carried out for example in accordance with the following procedures.

(1) Images of the position (X) of the actually formed slit line of the optical film and two positions (Y1, Y2) of the edge of the optical film are taken by the CCD camera of the slitting position checkup unit 160, and the images are picturized for measurement of the position of the actually formed slit-line (X) of the optical film and the positions of the edges (Y1, Y2) of the optical film by the differences in contrast.

(2) There is a slit line reference position in the form of a line extending in Y direction at a position intermediate between a reference line extending in Y direction at an upstream position as seen in X direction in the imaging area of one of the slitting position checkup units 160 and another reference line extending in Y direction at a downstream position as seen in X direction in the imaging area of the other of the slitting position checkup units 160, and data γ representing the distance between the upstream and downstream reference lines is stored in the storage device 420 via the information processing device 410. Furthermore, there are upstream and downstream reference lines extending in the X direction in respective ones of the image-taking regions of the slitting position checkup units 160.

(3) A correction value α for the position of the slit-line and a correction value δ for the angular position of the slit-line are calculated based on the reference lines and the measured positions of the slit-line (X) and the edge of the optical film. The correction value α for the position of the slit-line in the optical film correspond to the measured deviation α, or the deviation α between the actual slit-line position (X) and the downstream side reference line extending in the Y direction. The correction value δ for the angular position of the slit line can be calculated according to the following formula, based on the deviations in Y direction of the edge of the optical film at two positions, or the deviations (β1, β2) of the edge of the optical film with respect to respective ones of the upstream and downstream reference lines extending in the X direction, and the distance data γ between the two reference lines.

$$\delta = \cos^{-1}\left\{\frac{\gamma}{\sqrt{\gamma^2 + (\beta_1 - \beta_2)^2}}\right\}$$ (Equation 1)

(4) The storage device 420 is used to store correction values (α, δ) for applying an instruction to the slitting unit 150 to perform an angular position correction by a value δ and a positional correction by value α in the X direction based on the measured and calculated data so as to make the slit line conform to the reference slit-line position extending in the Y direction.

(5) The slitting unit 150 receives instruction from the control unit 400 for the next operation of forming a slit line in the optical film to perform a positional correction in the feed direction and an angular position correction in a crosswise direction with respect to the feed direction, based on the stored correction values (α, δ).

(6) Thereafter, the slitting unit 150 forms a next slit line in the continuous web of optical film.

(Removal of Defective Polarizing Sheet Xβ and Lamination of Normal Polarizing Sheet Xα on Liquid-Crystal Panel W)

The first feature concerning the roll of optical film laminate 10 according to this embodiment is that, in advance of laminating the normal polarizing sheet $X_\alpha$ cut from the polarizing composite film 11 contained in the continuous web of optical film being supplied on the liquid-crystal panel W, only the defective polarizing sheets $X_\beta$ cut from the polarizing composite film 11 taken away by the defective-polarizing-sheet removal unit 190, without interrupting the feed of the optical film. The second feature of this embodiment is that only the normal polarizing sheet Xα cut from the polarizing composite film 11 can be fed to the lamination unit 200 for lamination with respective ones of the liquid-crystal panel W at the lamination station B by the carrier-film take up drive mechanism 210, while eliminating a need for interrupting the feed of the optical film. The above features are inconceivable in the case of an individualized sheet or in the manufacture of individualized sheets. It is apparent that the uses of such roll of the optical film laminate 10 in the manufacturing process of the liquid-crystal display element leads to a significant increase in the speed and a significant improvement in accuracy of applying the normal polarizing sheet X, to the liquid-crystal panel W (Transportation of Liquid-Crystal Panel W and Lamination with Normal Polarizing Sheet Xα)

Before specifically describing in detail the lamination unit 200 including the pair of lamination rollers adapted to be vertically moved toward and away from each other for laminating the liquid-crystal panel W with the normal polarizing sheet Xα which has been cut from the polarizing composite film 11, a brief description is made regarding the transportation or liquid-crystal-panel conveyance apparatus 300 for the liquid-crystal panel W which is to be laminated with the normal polarizing sheet of the polarizing composite film 11 formed from the continuous web of the optical film which is also being supplied.

Figure 10:
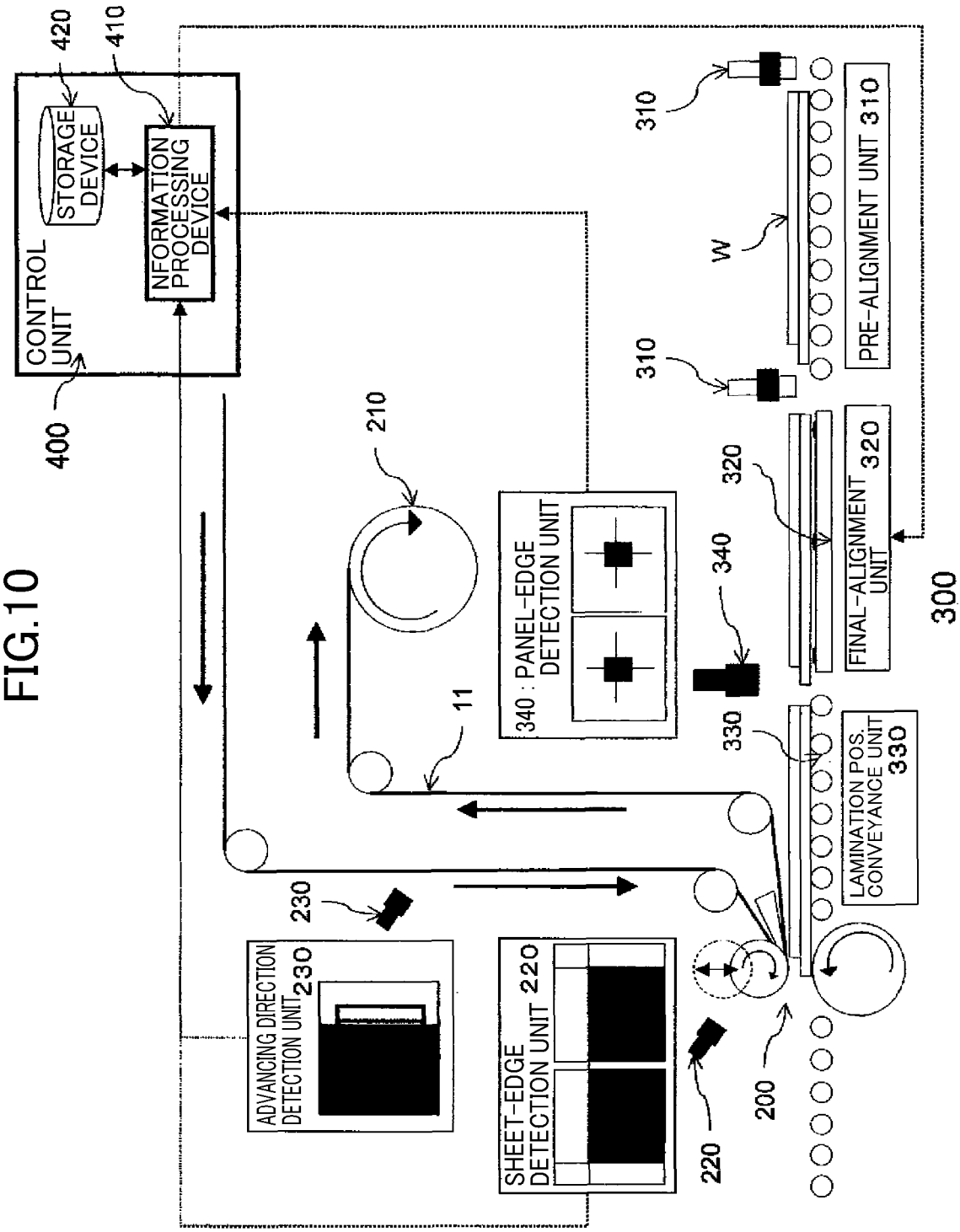
FIG. 10 is a schematic diagram showing the state when encoded information recorded on the continuous web of optical film is read by the reading unit, and a pre-alignment unit, a final-alignment unit, a lamination position-directed conveyance unit and a panel-edge detection unit in the liquid-crystal-panel conveyance apparatus are controlled based on the encoded information to allow a liquid-crystal panel to be conveyed in a controlled posture in the continuous manufacturing system for liquid-crystal display elements, according to at least one embodiment.

Taking a large size television having a diagonal screen dimension of 42 inches as an example, a rectangular-shaped liquid-crystal panel W has a size of about 540 to 560 mm in length and about 950 to 970 mm in width. During the manufacturing process of liquid-crystal display elements, the liquid-crystal panel W is slightly trimmed along its peripheries during a wiring stage including mounting operations of electronic components. Alternatively, the liquid-crystal panel W may be transported or conveyed with peripheries already trimmed. The liquid-crystal panels W are taken out one-by-one from a magazine containing a large number of liquid-crystal panels, by means of a liquid-crystal-panel supply apparatus, and as shown in FIG. 6 and FIG. 10, conveyed through cleaning/polishing stage to the lamination unit 200 at the lamination station B for lamination with respective ones of the normal polarizing sheet, by the liquid-crystal-panel conveyance apparatus 300, by being adjusted to equal intervals and a constant transportation speed, for example. The normal polarizing sheet Xα is formed from the continuous web of optical film to have a size slightly less than that of the liquid-crystal panel W. As shown in FIG. 10, in synchronization with the transportation of the normal polarizing sheet Xα when the normal polarizing sheet Xα is transported to the lamination station B, in a final stage of the liquid-crystal panel W sequentially conveyed to the lamination station B for lamination of the normal polarizing sheet Xα on the liquid-crystal panel W, the liquid-crystal-panel conveyance apparatus 300 includes a liquid-crystal panel orientation controlling unit comprising a pre-alignment unit 310 and a final-alignment unit 320 for controlling the orientation of the liquid-crystal panel W, a conveyance unit 330 to transport the panel to the lamination position, and a panel-edge detection unit 340 for detecting the leading edge of the liquid-crystal panel W.

Figure 11:
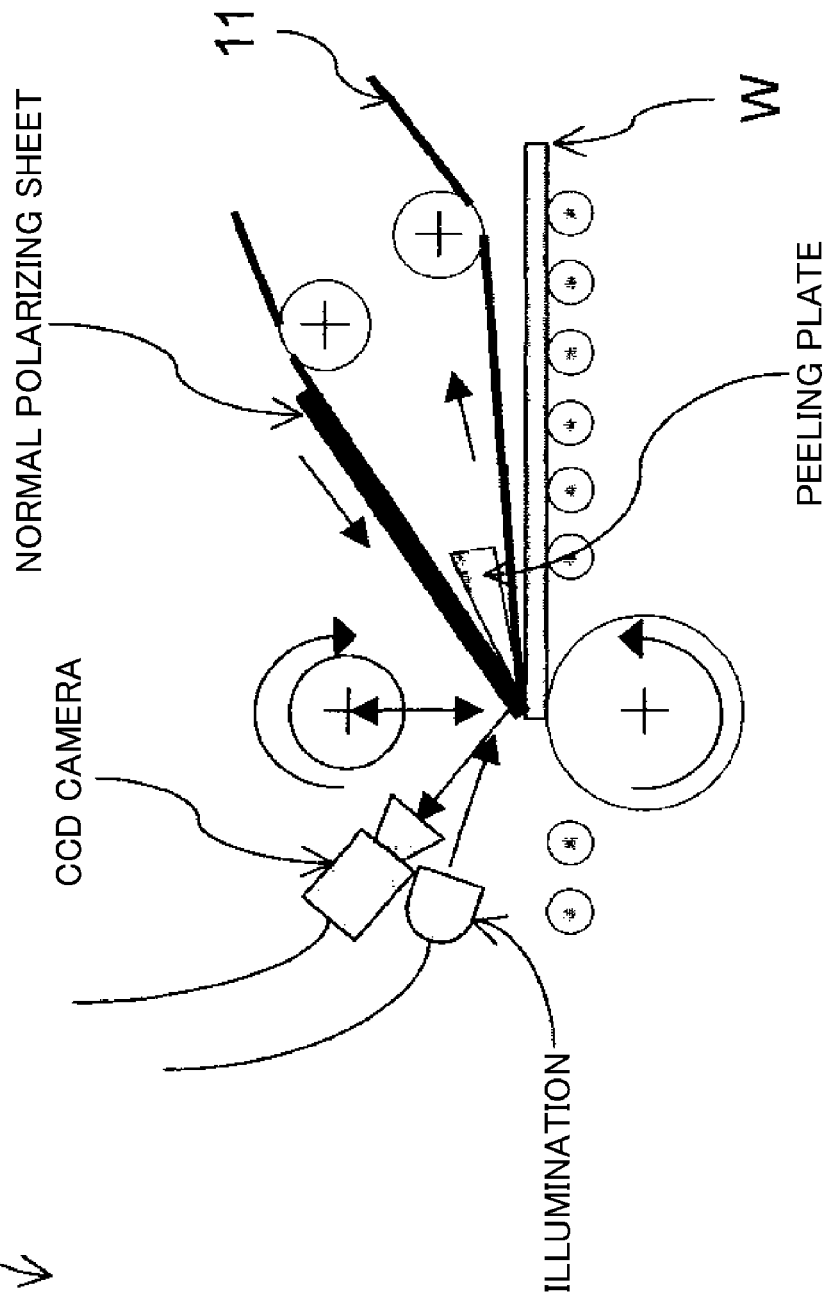
FIG. 11 is a schematic diagram showing a lamination unit comprising a sheet-edge detection unit for detecting a leading edge of a normal polarizing sheet of a polarizing composite film formed from the continuous web of optical film, and straight-ahead-posture detection unit for detecting an alignment with a feed direction of the formed normal polarizing sheet of the polarizing composite film.

FIG. 10 is a schematic diagram showing the transportation of the liquid-crystal panels W in an aligned orientation, by means of the pre-alignment unit 310, the final-alignment unit 320, the conveyance unit 330 for conveying the panels to the lamination position, and the panel-edge detection unit 340 which are provided in the liquid-crystal-panel conveyance apparatus 300, based on the encoded information 20 which is read from the continuous web of optical film by the reading unit 120 during the manufacturing process of liquid-crystal display elements. Further, FIG. 11 is a schematic diagram showing the lamination unit 200 for laminating the polarizing composite film sheet with the liquid-crystal panel W, comprising the sheet-edge detection unit 220 for detecting the leading edge of the normal polarizing sheet Xα formed from the continuous web of the optical film being fed, and the straight-ahead-posture detection unit 230 for detecting the alignment with the feed direction of the normal polarizing sheet Xα, and a peeling plate 211 for peeling the carrier film 14 by being bent at an acute angle from the normal polarizing sheet Xα.

Preferably, the normal polarizing sheet Xα is fed to the lamination unit 200 at the lamination station B at a constant speed by the carrier film 14. As shown in FIG. 10 or 11, at the lamination station B, only the carrier film 14 is peeled by being bent at an acute angle, via the peeling plate 211, by the carrier-film take up drive mechanism 210. By having the carrier film 14 peeled by being bent at an acute angle, the adhesive layer on the normal polarizing sheet Xα may be gradually exposed. This makes it possible to slightly expose the leading edge of the normal polarizing sheet Xα to allow the leading edge of the liquid-crystal panel W to be easily aligned with the leading edge of the normal polarizing sheet Xα.

As shown in FIG. 10, the leading edge of the normal polarizing sheet Xα is moved to the nip defined between the pair of lamination rollers of the lamination unit 200 which are now in the vertically spaced apart relation to each other, and detected by the sheet-edge detection unit 220. Although the normal polarizing sheet Xα is fed in a state laminated on the carrier film 14, it is seldom that the normal polarizing sheet Xα is accurately fed so that the angle θ between the feed direction and the lengthwise direction of the carrier film 14 becomes zero. Therefore, deviations of the normal polarizing sheet Xα in the feed direction and the transverse direction are measured, for example, by taking images of the sheet using the CCD camera of the straight-ahead-posture detection unit 230 and subjecting the taken images to an image processing, whereby the measured deviations are calculated in terms of x, y and θ, and the calculated data is stored in the storage device 420 by the control unit 400.

Then, a plurality of liquid-crystal panels W are sequentially supplied from a transportation unit including a magazine containing a plurality of the liquid-crystal-panels illustrated in FIG. 5 at even intervals and a constant speed, furthermore, the liquid-crystal panels W are supplied one-by-one and subjected to the alignment control by the liquid-crystal-panel conveyance apparatus 300 illustrated in FIG. 10. This alignment control are described with reference to FIG. 10.

The liquid-crystal panels W are sequentially positioned by the pre-alignment unit 310, so that they are aligned in lengthwise and widthwise directions respectively with the transport direction and the direction perpendicular to the transport direction in the conveyance path. The positioned liquid-crystal panel W is conveyed to and placed on the final-alignment unit 320 which includes an alignment table adapted to be turned by a drive mechanism which is controlled by the control unit 400. The leading edge of the liquid-crystal panel W placed on the alignment table is detected by the panel-edge detection unit 340. The position of the detected leading edge of the liquid-crystal panel W is checked for match with the reference lamination position stored in the storage device, specifically, the calculation data in terms of x, y and θ to represent the orientation of the normal polarizing sheet Xα to be laminated to the liquid-crystal panel W. For example, the deviation between the leading edge of the liquid-crystal panel W and the reference lamination position is measured using an alignment mark of the liquid-crystal panel W illustrated in FIG. 2 to calculate the angular displacement θ, and the alignment table 321 having the liquid-crystal panel W placed thereon is turned by the angular displacement θ. Then, the alignment table 321 is connected to the conveyance unit 330 directed for the lamination station B. The liquid-crystal panel W is conveyed to the lamination position while keeping the same orientation, by the conveyance unit 330 directed for the lamination station B, and the leading edge of the liquid-crystal panel W is registered with and laid on the leading edge of the normal polarizing sheet Xα. In the final stage, the normal polarizing sheet Xα and the liquid-crystal panel W which are in aligned relation with each other are held between the pair of lamination rollers and conveyed thereby to obtain a finished liquid-crystal display element.

The normal polarizing sheet Xα is fed to the lamination unit 200 for lamination with the liquid-crystal panel W together with the carrier film 14 within the continuous web of optical film advanced under tension, so that there is least possibility that the periphery of the normal polarizing sheet Xα is bent or sagged. Thus, the normal polarizing sheet Xα is less likely be flexed or bent. This makes it easy to have orientation of the liquid-crystal panel W aligned with the normal polarizing sheet Xα which is fed to the lamination station B, so that the manufacturing speed of the liquid-crystal display element can be increased and the product accuracy can be improved. Such method and system can never be applied to the manufacturing process utilizing individualized sheets wherein, after peeling a separator from each of the individualized sheets to expose the adhesive layer, and feeding under a vacuum suction each of the sheets to a lamination position, adjusting the position of the sheet with respect to the liquid-crystal panel W, the sheet is laminated to the liquid-crystal panel W to complete a liquid-crystal display element. Thus, this embodiment is a continuous manufacturing method and system for liquid-crystal display elements based on the features of providing and using a roll of a continuous web of an optical film 10 having a width corresponding to the width of a liquid-crystal panel having pre-defined dimensions and at least comprising a polarizing composite film 11 having an adhesive layer 12 provided thereon and a carrier film 14 releasably attached to the adhesive layer 12, the continuous web of optical film 10 having a plurality of defective-polarizing-sheet slitting positions and normal-polarizing-sheet slitting positions defined thereon as lines extending in the widthwise direction of the continuous web of optical film, based on positions of one or more defects existing in the continuous web of optical film detected through a preliminary inspection of a polarizing composite film 11, the defective-polarizing-sheet slitting positions defining regions having one or more defects and the normal-polarizing-sheet slitting positions defining regions having no defect, information for the slitting positions relating to the defective-polarizing-sheet slitting positions and normal-polarizing-sheet slitting positions being recorded as encoded information 20.

II. Roll of Optical Film Laminate, Manufacturing Method and System Therefor

Below is a description of the roll of the optical film laminate, a manufacturing method and system therefore according to at least one disclosed embodiment with reference to the drawings.

(Structure of Polarizing Composite Film)

As shown in FIG. 1A and FIG. 1B, the sheet of the optical film to be laminated to the liquid-crystal panel is typically comprised of a flexible optical film including a polarizing composite film formed with an acrylic adhesive layer for lamination with a glass substrate of the liquid-crystal panel W. The polarizing composite film includes a polarizer (continuous polarizer layer) having a thickness of 20 to 30 nm comprising a substrate made of a PVA-based film which has been subjected to a dyeing treatment using iodine and a cross-linking treatment, and thereafter subjected to an orienting treatment by a lengthwise or widthwise stretching, and the polarizer is provided on one or each surface with a transparent protective film which is laminated thereon and comprises a substrate of TAC-based film having a thickness of about 40 to 80 nm for protecting the polarizer. Typically, an acrylic adhesive layer is formed on the surface of the polarizer for lamination with the liquid-crystal panel W (Process Using Conventional Individualized Sheets)

As already described, in an individualized sheet manufacturing process, individualized sheets are prepared by punching or cutting a continuous web of optical film into pieces of rectangular shape, each being laminated with a separator through an adhesive layer. The individualized sheets each formed into a rectangular shape and laminated with the separator are previously stored in a magazine in a liquid-crystal display element manufacturing line. Then, in a process of laminating the individualized sheets with respective ones of a plurality of liquid-crystal panels W, the individualized sheets stored in the magazine are conveyed under suction to a lamination position one-by-one. The separator releasably laminated to the adhesive layer formed on each of the individualized sheets is peeled to expose the adhesive layer, and the individualized sheet is laminated to a corresponding one of the liquid-crystal panels W through the exposed adhesive layer. During this process, since the individualized sheet is flexible, problems are experienced in that the periphery of the rectangular-shaped individualized sheet is bowed or warped. Thus, in a liquid-crystal display element manufacturing process using such individualized sheet, in order to quickly perform alignment and lamination with a liquid-crystal panel with a high degree of accuracy, there is no other choice but to use individualized sheets which may have less problem of bowing or warping. For the purpose, for example, protective films each having a thickness of 40 to 80 nm are laminated to both of the opposite surfaces of a polarizer, but not to one of the surfaces, to impart stiffness to the individualized sheet by increasing thickness.

(Method and System for Manufacturing Roll of Optical Film Laminate)

Figure 12:
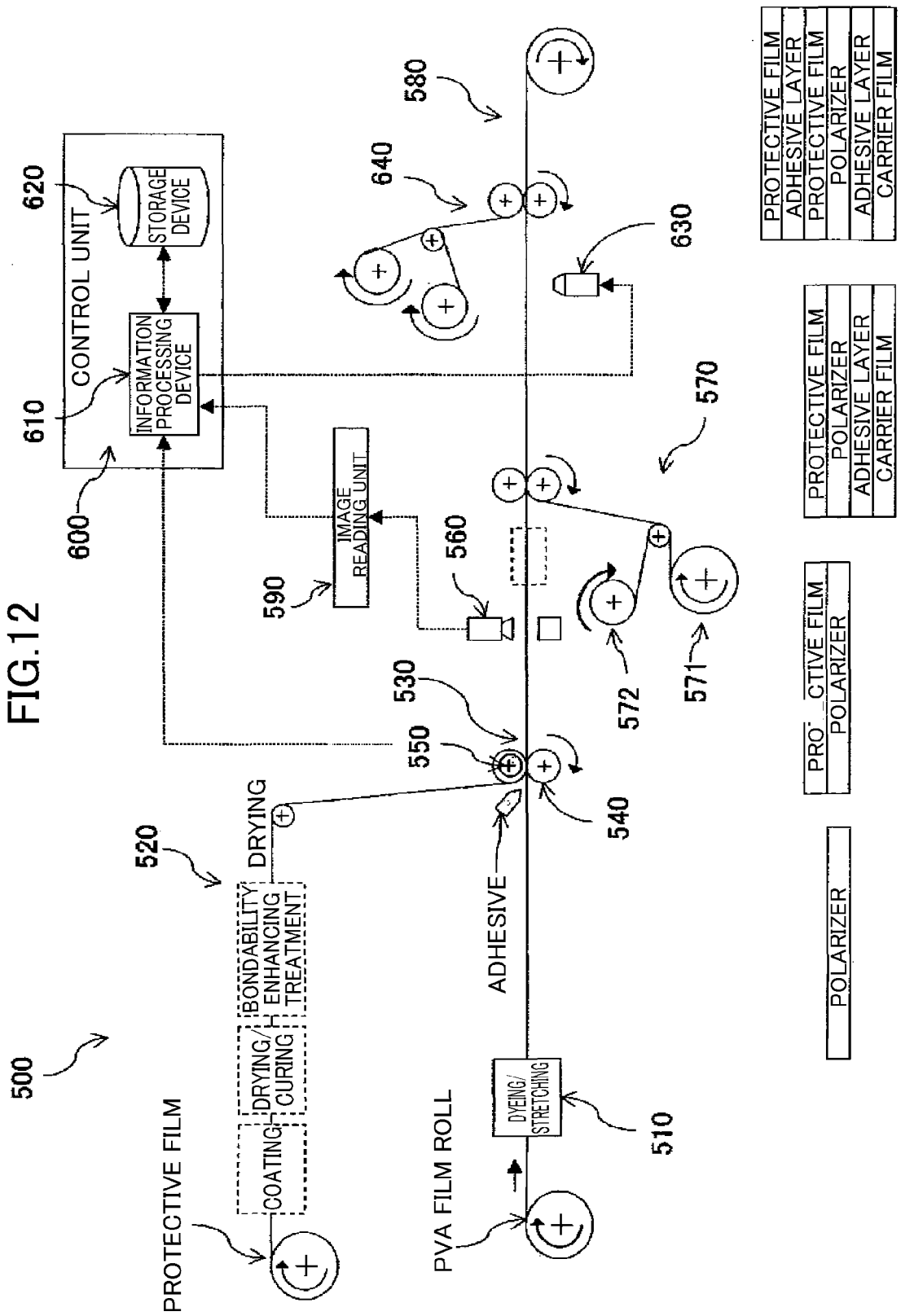
FIG. 12 is a schematic diagram showing a manufacturing method and system for a roll of an optical film laminate according to at least one embodiment.
Figure 13:
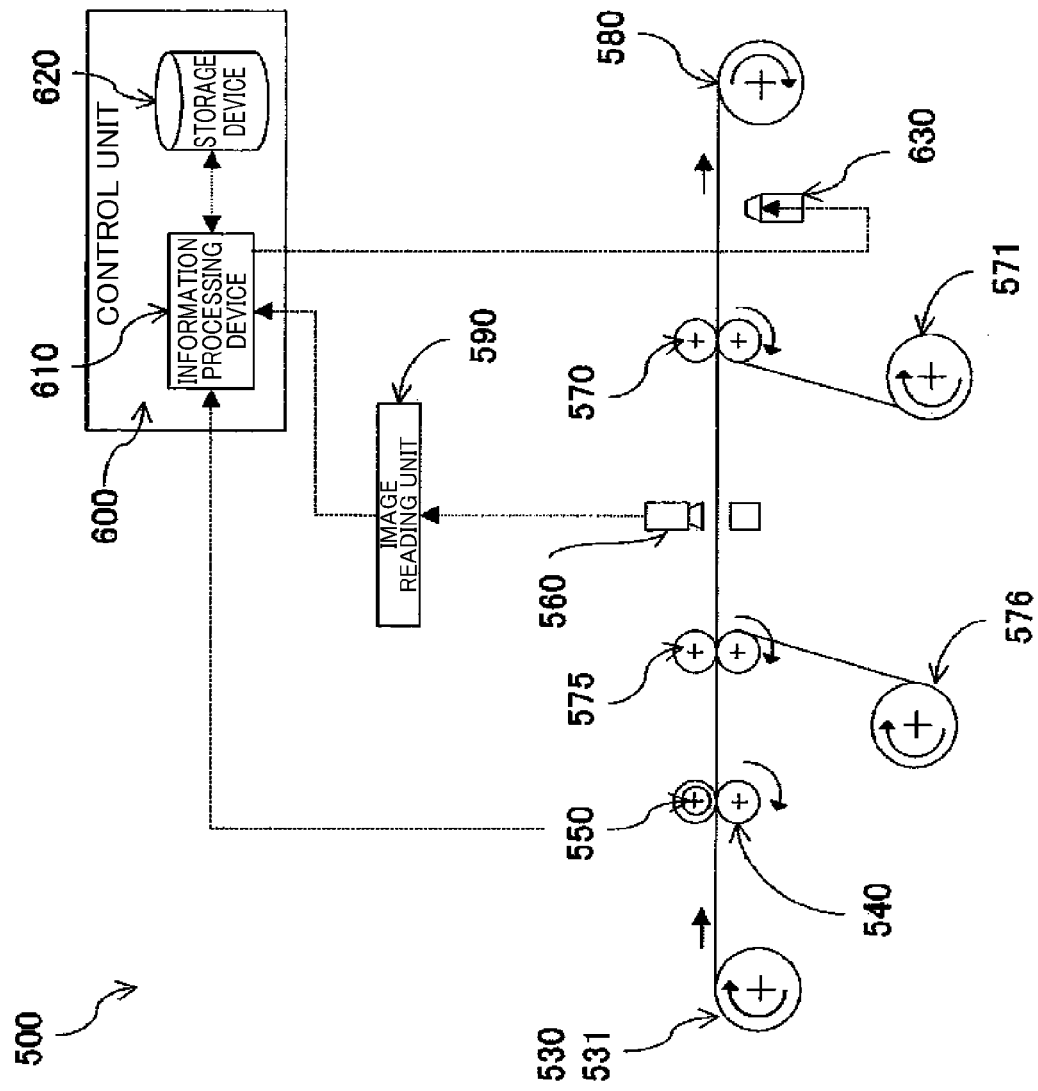
FIG. 13 is a schematic diagram showing a manufacturing method and system for a roll of an optical film laminate according to at least one embodiment.
Figure 14:
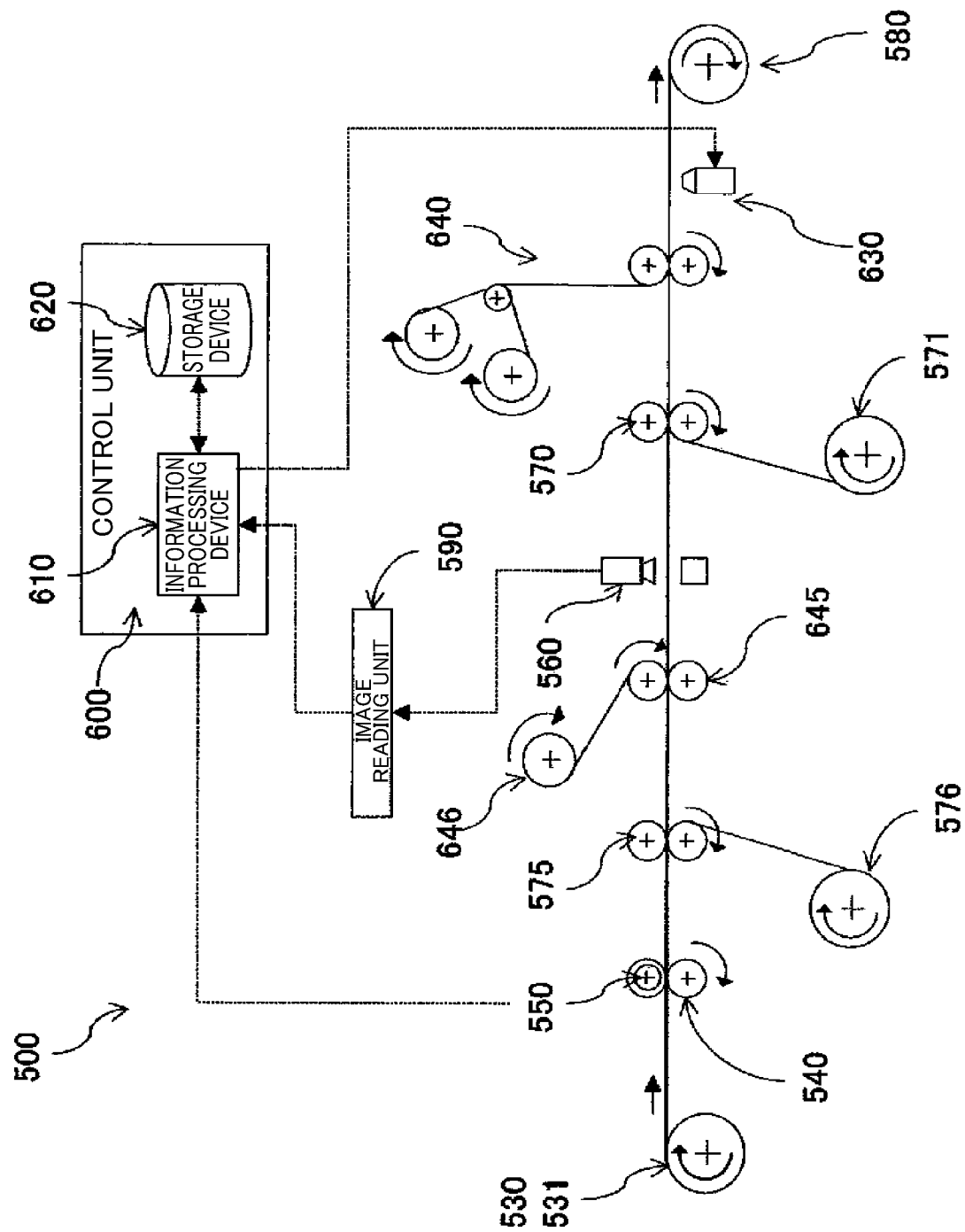
FIG. 14 is a schematic diagram showing a manufacturing method and system for a roll of an optical film laminate according to at least one embodiment.
Figure 15:
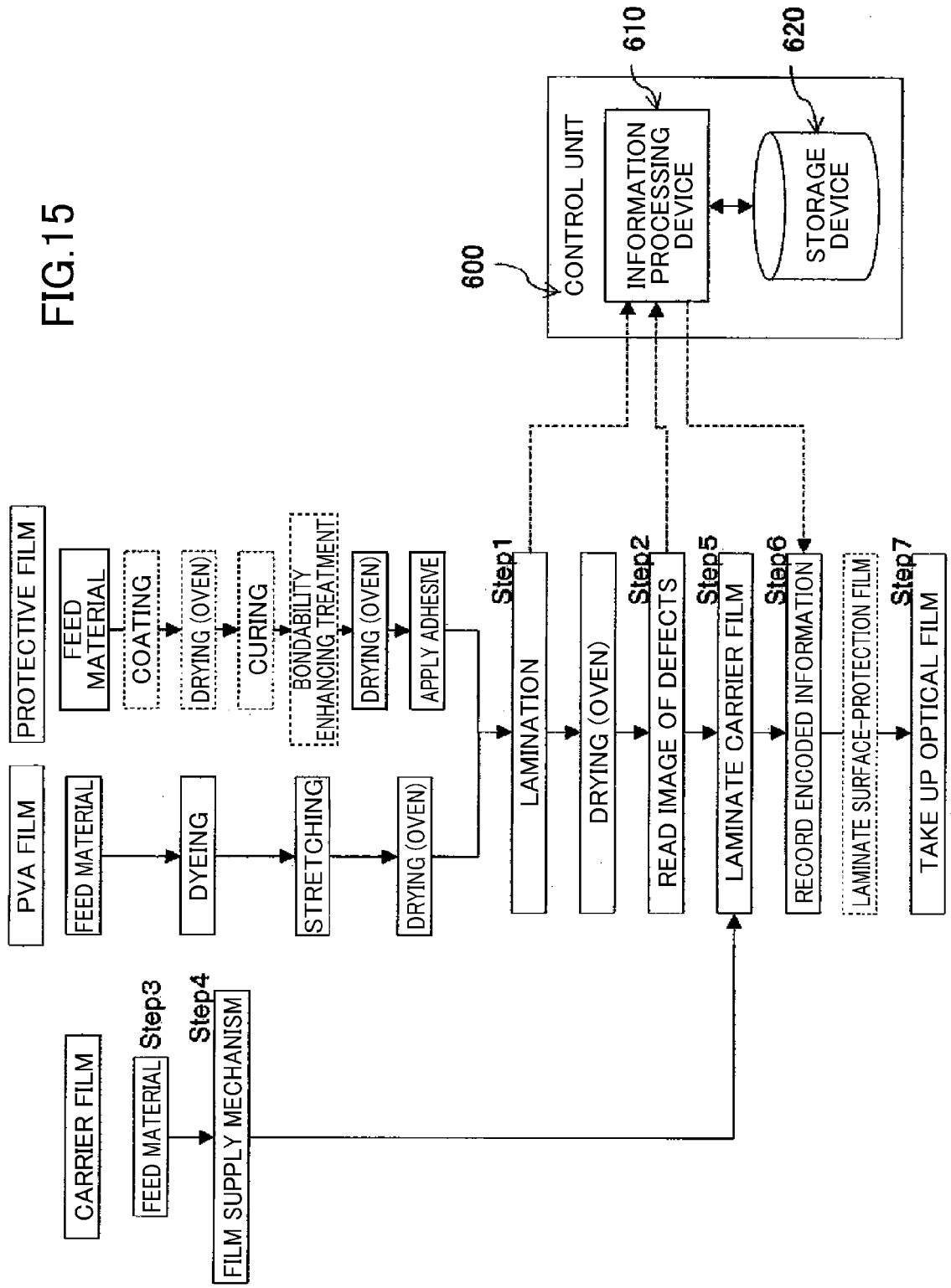
FIG. 15 is a flowchart showing a manufacturing process or process steps in the manufacturing method and system for a roll of an optical film laminate illustrated in FIG. 12.
Figure 16:
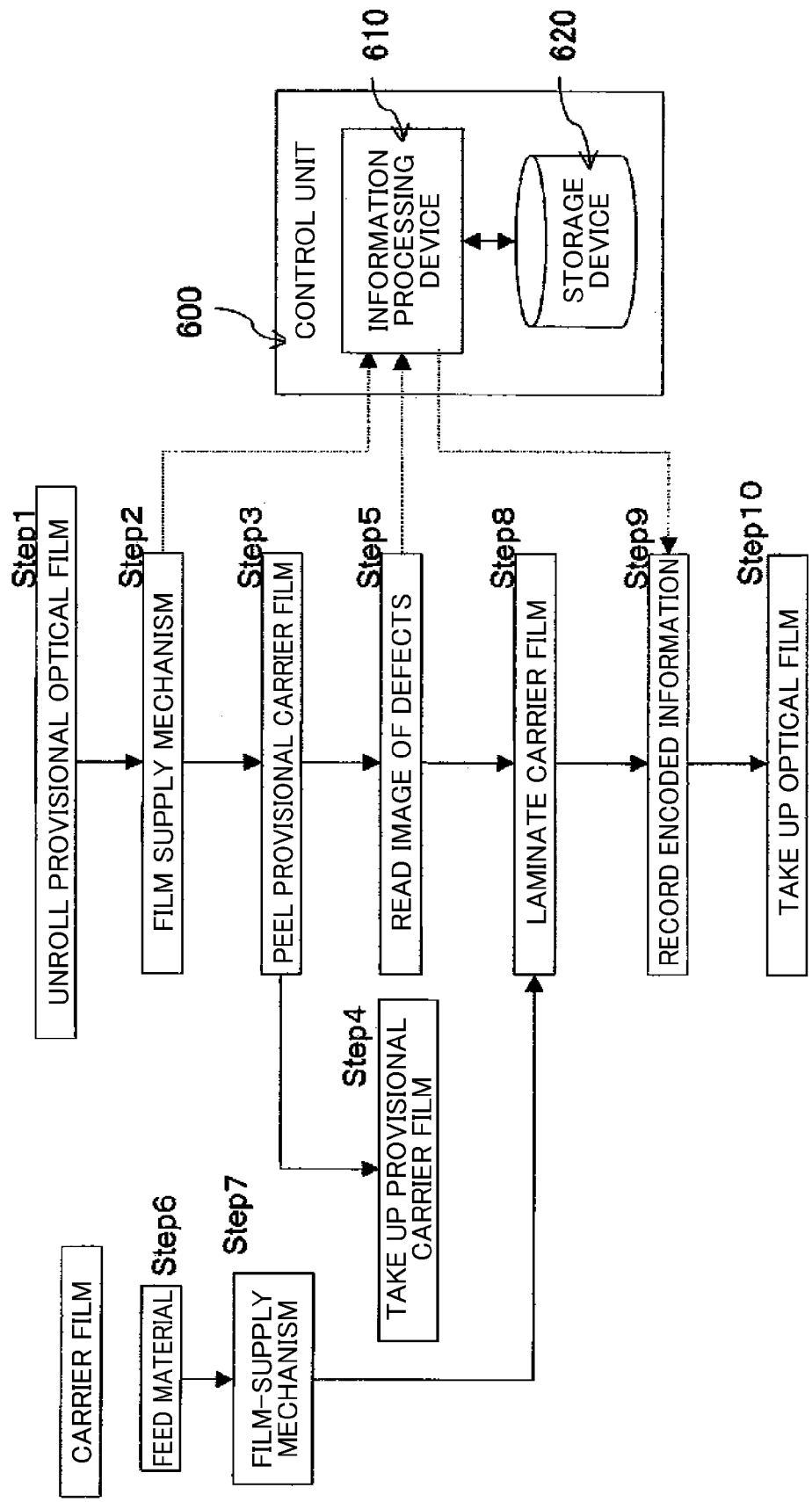
FIG. 16 is a flowchart showing a manufacturing process or process steps in the manufacturing method and system for a roll of an optical film laminate illustrated in FIG. 13.
Figure 17:
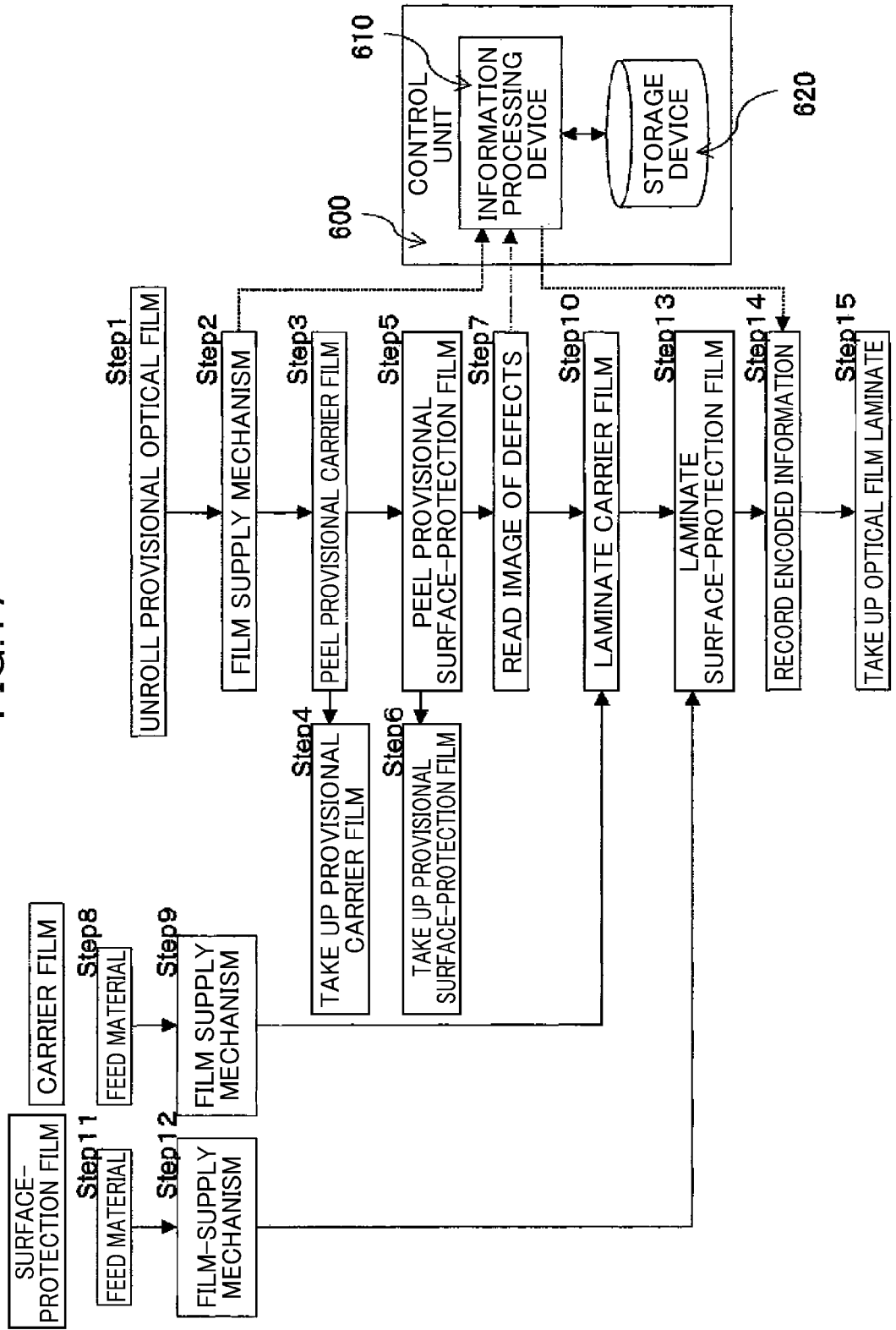
FIG. 17 is a flowchart showing a manufacturing process or process steps in the manufacturing method and system for a roll of an optical film laminate illustrated in FIG. 14.

FIGS. 12 to 14 are schematic diagrams showing methods and systems for manufacturing rolls of the optical film laminate including a polarizing composite film, used for the present disclosure. FIGS. 15 to 17 are flowcharts showing respective manufacturing processes or manufacturing steps in the manufacturing methods and systems according the disclosed embodiments.

In the disclosed embodiments, the polarizing composite film 11 constituting the roll of the optical film laminate 10 may be made of a polarizer including a substrate of a PVA based material having at least one surface laminated with a protective film, preferably of a transparent material, with an adhesive layer 12 provided on the other surface. A carrier film 14 adopted as a manufacturing-process material is releasably attached to the adhesive layer 12. In the conventional manufacturing process of liquid-crystal display elements using individualized sheets, the polarizing composite film used therein has two protective films laminated thereon at the opposite surfaces to impart stiffness to the polarizing sheet. However, in a liquid-crystal display element manufacturing process using the roll of the optical film laminate in accordance with at least one embodiment, the normal polarizing sheet Xα formed from the polarizing composite film 11 in the roll of the optical film laminate 10 is peeled from the carrier sheet 14 at the lamination position, and will gradually be separated from the web. It is to be understood as a matter of course that there is no need of peeling the separator on a piece-by-piece basis as in the manufacturing process using the individualized sheets.

When the normal polarizing sheet Xα is peeled from the carrier film 14, the leading edge of the normal polarizing sheet Xα is registered with the leading edge of a corresponding one of a plurality of liquid-crystal panels W being sequentially conveyed one-by-one toward the lamination position and then, the normal polarizing sheet Xα and the corresponding liquid-crystal panel W are laminated together by being pressed against each other by the pair of lamination rollers of the lamination unit 200 at the lamination station B. In this process, there is no risk that the periphery of the normal polarizing sheet Xα is bowed or warped since the sheet gradually comes out. Thus, differently from the individualized sheet, in the polarizing composite film 11 included the optical film in the disclosed embodiments, the protective film may be laminated to only one of the surfaces of the polarizer, and additionally it is possible to make the thickness of the protective film to be 40 nm or less.

Below is a description of the manufacturing methods and systems of the roll of the optical-film laminate, according to the disclosed embodiments, taking reference to FIGS. 12 and 15, FIGS. 13 and 16, and FIGS. 14 and 17, respectively.

(Method and System for Manufacturing Roll of Optical Film Laminate According to the Embodiment Illustrated in FIG. 12)

FIG. 12 is a schematic diagram showing the manufacturing system 500 for manufacturing the roll of the optical film laminate which comprises a polarizer manufacturing line 510 for producing a continuous polarizer layer (hereinafter referred to as "polarizer" as in the previous description), a protective film manufacturing line 520 for producing a protective film to be laminated on the polarizer, a lamination line or provisional-optical-film feed line 530 for producing a laminate consisting of the polarizer and the protective film (the laminate will hereinafter be referred to as "polarizing sheet 11'" to distinguish it from the polarizing composite film 11 which does not have an adhesive layer), and surface-protection film lamination mechanism 640 and carrier-film lamination mechanism 570 for laminating a carrier film and a surface-protection film, to the polarizing composite film to produce the optical film. FIG. 15 is a flowchart showing the manufacturing process or steps in the system 500.

The lamination line or provisional-optical-film feed line 530 includes an inspection sub-line for inspecting a defect existing in the polarizing sheet 11' by an inspection unit 560, a carrier film feed sub-line for laminating a carrier film 14 having a transferable adhesive layer 12 formed thereon, to one of the opposite surfaces of the polarizing sheet 11', an information recording sub-line for recording encoded information including slit-position information, on a surface of the carrier film 14, a surface-protection film feed sub-line for laminating a surface protection film 13 through an adhesive surface to the surface of the polarizing sheet 11' opposite to the surface on which the carrier film 14 is laminated, and a taking up sub-line for taking up the continuous web of optical film having the encoded information recorded thereon to form a roll of the optical film. The carrier film feed sub-line has mounted thereon a roll of the carrier film 14 having a releasing film attached thereto, and the surface-protection-film feed sub-line has mounted thereon a roll of the surface protection film 13 having a releasing film attached thereto at its adhesive surface. The slit-position information is obtained by processing the information about a normal region (region having no defect) and a defective region (region having a defect or defects) which are previously defined in the polarizing sheet 11' based on the location or coordinate position of the defect therein detected at the inspection sub-line, and used to, in forming a normal polarizing sheet and a defective polarizing sheet comprising an adhesive layer, designate at least positions at which slit lines are to be formed in the continuous web of optical film being fed.

The polarizer manufacturing line 510 has a roll of PVA-based film which constitute the substrate of the polarizer and is mounted thereon in a rotatable manner, and includes a sub-line for subjecting the PVA-based film being unrolled from the roll by means of a lamination drive mechanism 540 or other drive mechanism (not shown), to processes of dyeing, cross-linking, stretching and then drying. The protective film manufacturing line 520 has rotatably mounted thereon a roll of a typically transparent TAC-based film constituting a substrate of the protective film, and includes a sub-line for subjecting the transparent TAC-based film being unrolled from the roll by means of the lamination drive mechanism 540 or other drive mechanism (not shown), to a saponifying treatment followed by drying. Each of the protective film manufacturing line 520 and the polarizing sheet 11' lamination line or provisional-optical-film feed line 530 includes a sub-line for applying an adhesive consisting primarily of a polyvinyl alcohol-based resin to an interface between the polarizer and the protective film, and drying the adhesive to bond them together through an adhesive layer having a thickness of only several μm.

The lamination line or provisional-optical-film feed line 530 for the polarizing sheet 11' comprises the lamination drive mechanism 540 including a pair of lamination rollers. The lamination drive mechanism 540 comprises a length or distance measurement device 550 having an encoder incorporated in one of the lamination rollers for calculating the length fed from the leading edge of the formed polarizing sheet 11'. The lamination rollers are adapted to laminate the protective film to the polarizer by pressing them against each other, to form a polarizing sheet 11', and feed the polarizing sheet 11'.

This manufacturing system 500 includes the inspection unit 560 for detecting defects in the surface and the inside of the polarizing sheet 11'. It is required to provide the polarizing sheet 11' with the adhesive layer 12 only after the defects are detected, to complete the polarizing composite film 11. Therefore, the present manufacturing system 500 further comprises a carrier-film supply mechanism 570 having mounted thereon the roll of the carrier film 14 having the adhesive layer 12. The adhesive layer 12 on the carrier film 14 is formed in advance in the manufacturing process of the carrier film 14, by subjecting one of the opposite surfaces of the carrier film 14 which is to be releasably laminated to one of the opposite surfaces of the polarizing sheet 11' to be laminated to the liquid-crystal panel W to a releasing treatment, and then applying to that surface a solvent containing an adhesive drying the solvent. When the carrier film 14 fed from the carrier-film supply mechanism 570 is laminated on the polarizing sheet 11' in a releasable manner, the adhesive layer 12 previously formed on the carrier film 14 is transferred to the polarizing sheet 11' to provide the adhesive layer 12 on the polarizing composite film 11.

The present manufacturing system 500 further comprises an information recording unit 630 for recording encoded information, for example, on a surface of the carrier film 14. More specifically, the information recording unit 630 is operable to record, on a continuous web of optical film being fed during the liquid-crystal display element manufacturing process using the produced roll of the optical-film laminate, encoded information including the slit-position information indicative of the positions at which slit lines are to be formed in the continuous web of optical film to form normal polarizing sheets and defective polarizing sheets having the adhesive layer. The manufacturing system 500 may further comprise a surface-protection-film lamination mechanism 640 for laminating a surface-protection film 13 through an adhesive surface to the surface of the polarizing sheet 11' opposite to the surface on which the carrier film 14 is laminated. Finally, the manufacturing system 500 comprises an optical-film take up drive mechanism 580 for drivingly taking up the optical film which is constituted by the polarizing sheet 11' with the carrier film 14 having a transferable adhesive layer and the surface-protection film 13 laminated on the opposite surfaces of the polarizing sheet 11'.

In the case where protective films are laminated on the opposite surfaces of the polarizer, the present manufacturing system 500 will include two protective film manufacturing lines 520, 520' (the protective film manufacturing line 520' is omitted in the drawing). Further, the protective film manufacturing line 520 may additionally include a treatment sub-line for, before a protective film is laminated to the polarizer, subjecting the surface of the protective film to a hard coat treatment and/or an anti-dazzling or anti-glare treatment.

The inspection unit 560 comprises an image-reading device 590 including for example a CCD camera. The image-reading device 590 is electrically connected to an information processing device 610 included in a control unit 600, wherein image data read by the image-reading device 590 is processed in association with feed-length measurement data measured by the length or distance measurement device 550 electrically connected to the information processing device 610. The control unit 600 functions to operate the information processing device 610 and a storage device 620 to process the image data from the image-reading device 590 in association with the feed-length measurement data based on the delivered length measured by the length or distance measurement device 550 as a length from the leading edge of the polarizing sheet 11', so as to produce position data representing locations or coordinate positions of a defect or defects in the polarizing sheet 11', the position data being then stored in the storage device 620. The control unit 600 functions, based on the position data on the detected locations or coordinate positions of a defect or defects, to define defective regions and normal regions in the polarizing composite film 11.

The control unit 600 functions, based on the position data on the detected locations or coordinate positions of a defect or defects, to define defective regions and normal regions in the polarizing composite film 11. Further, the control unit 600 functions, based on the defective and normal regions of the polarizing composite film 11, to create slit-position information. The slit-position information is provided for indicating positions at which respective ones of the slit lines are to be formed in the continuous web of optical film, furthermore, the slit lines are formed in pairs by the slitting unit 150 during the manufacturing process of the liquid-crystal display elements, in a manner as to slit the continuous web of optical film being fed in a direction transverse to the feed direction of the continuous web, from the surface opposite to the carrier film to a depth reaching the adhesive layer surface of the carrier film. The produced slit-position information is also stored in the storage device 620. Then, the information processing device 610 functions, based on the stored slit-position information, to create encoded information, together with additional information, such as information on the manufacturing lot and a length in meters of the optical film in the roll, or in association with the additional information. As already mentioned, the encoded information is preferably recorded on the carrier film 14 included in the continuous web of optical film, during the manufacturing process of liquid-crystal display elements using the roll of the optical film laminate. It is to be understood that the manner of recording the encoded information on the carrier film 14 can vary in various ways, such as the one in which encoded information is entirely recorded on a single storage location, and the one in which encoded information is recorded on a plurality of storage areas disposed at given intervals (e.g., at intervals of 1 m or 100 m). Alternatively, the encoded information may be recorded on the surface-protection film 13, if any, instead of the carrier film 14.

It is to be noted that the regions defined by respective pairs of slit lines may include defect-free normal regions having a given length determined by the length of a side of the liquid-crystal panel to be laminated with the polarizing composite film, or defective regions having a length usually less than the given length. During the manufacturing process of the liquid-crystal display element, it is necessary to allow the slitting unit 150 to cut defective regions and normal regions of the polarizing composite film 11 along corresponding ones of the pairs of slit lines based on the slit-position information included in the encoded information, so that the formed defective polarizing sheets Xβ are removed from the carrier film 14 by the defective-polarizing-sheet removal unit 190, and the similarly formed normal polarizing sheets Xα are peeled from the carrier film 14 to be laminated to one surface of the liquid-crystal panels W.

Therefore, the length (Xα) of the normal region is determined based on the position data relating to the location or coordinate position of the defect existing in the polarizing composite film 11 in accordance with the length of a side of the liquid-crystal panel to be laminated with the normal polarizing sheet, so that the length always has a constant value. Regarding the defective region which is defined in the same manner, however, the upstream one of the two slit lines for the normal region located just upstream of the defective region in a feed direction can be used as the downstream one of the two slit lines for the defective region, so that the length (Xβ) of the defective region is determined by the downstream slit line and an upstream one which is located slightly upstream of the location or coordinate position of the defect. Since the length between the downstream slit line and the location or coordinate position of a defect may not be the same, the length (Xβ) of the defective region varies. Preferably, a calculation algorithm for producing the slit-position information indicating the positions for forming the slit lines is configured such that the length (Xβ) of the defective region is different from the length (Xα) of the normal region, for example, to have a relation Xβ<Xα, in any case, as described later. The procedure of creating the encoded information is common in the disclosed embodiments, so that the procedure will be described later in connection with reference to FIG. 18 and FIGS. 19 to 21.

The carrier-film lamination mechanism 570 for laminating the carrier film 14 to the polarizing sheet 11' is be described below. The carrier film 14 is previously formed in the carrier film manufacturing line (not shown) using a PET (polyethylene terephthalate)-based film of about 20 to 40 nm in thickness as a substrate. A transferable adhesive layer having a thickness of about 10 to 30 nm can be formed on one of the opposite surfaces of the carrier film 14 by, after subjecting one of the opposite surfaces of the PET-based film to a releasing treatment, applying a solvent containing an acrylic adhesive to the treated surface, and drying the solvent. By having the carrier film 14 laminated in a releasable manner on the polarizing sheet 11', the adhesive layer is transferred to the polarizing sheet 11' to form the optical film which comprises the polarizing composite film 11 having the adhesive layer 12. During the manufacturing process of liquid-crystal display elements using the roll of the optical film laminate 10 formed in the above described manner, the adhesive layer 12 is peeled together with the normal polarizing sheet from the carrier film 14 when the normal polarizing sheet is peeled from the carrier film 14 and attached to the liquid-crystal panel W. The carrier film 14 previously produced in the carrier film manufacturing line is wound into a roll by a length corresponding to the wound length of the polarizing composite film 11.

In a process of producing a roll of a provisional optical film laminate in accordance with the embodiments illustrated in FIGS. 13 & 14, a transferable adhesive layer may be formed on the provisional optical film in the same manner. In the embodiments illustrated in FIGS. 13 & 14, when a provisional carrier film and/or a provisional surface-protection film are peeled, the adhesive layer formed on the provisional carrier film is transferred to the polarizing composite film 11, so that the adhesive layer 12 may be formed on one of the opposite surfaces of the polarizing composite film 11, in the same manner, as described later.

The roll of the carrier film 14 is mounted for rotation on a support rack 571, and the carrier film 14 unrolled from the roll is releasably laminated on the polarizing sheet 11' by the carrier-film lamination mechanism 570. A releasable-film take up drive mechanism 572 is provided to function, when the carrier film 14 is releasably laminated on the polarizing sheet 11', to take up a releasable film provided for protecting the adhesive layer formed on the carrier film 14 and to expose the adhesive layer.

Referring to the flowchart of FIG. 15, in Step 1, the lamination drive mechanism 540 functions to laminate the protective film to one surface of the polarizer to thereby produce the polarizing film 110 which is then fed while being produced. In Step 2, defects existing in the polarizing sheet 11' thus produced and being fed are detected by the inspection unit 560. In Step 3, the roll of the carrier film 14 is rotatably mounted on the support rack 571. In Step 4, the releasable-film take up drive mechanism 572 and the optical-film take up drive mechanism 580 functions to unroll the carrier film 14 formed with the transferable adhesive layer from the roll with the adhesive layer in exposed state. In Step 5, the carrier film 14 is releasably laminated on the polarizing sheet 11' through the adhesive layer by the carrier-film lamination mechanism 570, to form the polarizing composite film 11 having the adhesive layer 12.

The information processing device 610 functions to define defective and normal regions in the polarizing composite film 11 based on the locations or coordinate positions of the defects detected in Step 2, and then, based on the defined defective and normal regions, creates slit-position information for forming defective polarizing sheets Xβ and normal polarizing sheets Xα in the polarizing composite film 11. In Step 6, the created slit-position information is recorded on a surface of the carrier film 14 laminated on the polarizing composite film 11, by the information recording unit 630. Finally, in Step 7, an optical film formed through the above Steps is taken up by the optical-film take up drive mechanism 580, to form a roll of the optical film laminate.

Although the descriptions have been made herein with respect to a process wherein the step of forming the adhesive layer 12 on the polarizing composite film 11, simultaneously with the step of releasably laminating the carrier film 14 on the adhesive layer 12, it is to be understood that the adhesive layer 12 may be previously formed on the polarizing composite film 11. Further, in advance of Step 7, the adhesive surface of the surface-protection film 13 may be additionally laminated on the surface of the polarizing composite film 11 opposite to the surface on which the carrier film 14 is laminated by means of the surface-protection-film lamination mechanism 640, irrespective of whether the protective film is subjected to the hard coating treatment or the anti-dazzling or anti-glare treatment, before the protective film is laminated to the polarizer. In this case, the resulting optical film has a structure having the carrier film 14 and the surface-protection film 13 laminated on respective ones of the opposite surfaces of the polarizing composite film 11.

(Method and System for Manufacturing a Roll of Optical Film Laminate According to the Embodiment Illustrated in FIG. 13)

FIG. 13 is a schematic diagram showing the manufacturing system of the roll of the optical film laminate, wherein a roll of a provisional optical film laminate 10' is mounted on a support rack, the roll comprising a polarizing composite film 11 including a polarizer laminated with a protective film, and a provisional carrier film 14' releasably laminated on the polarizing composite film 11 through an adhesive layer, and wherein a continuous web of the provisional optical film is continuously unrolled and the provisional carrier film 14' is peeled from the continuous web of the provisional optical film to be subjected to an inspection for detecting defects existing in the polarizing composite film 11 with the adhesive layer 12 in an exposed state, a carrier film 14 being thereafter laminated in a releasable manner on the adhesive layer 12 of the polarizing composite film 11, the slit-position information being recorded on a surface of the carrier film 14 in the same manner as in the embodiment illustrated in FIG. 12, to produce a roll of the optical film laminate 10. FIG. 16 is a flowchart showing the manufacturing process or steps in the system.

In the process of producing the roll of a provisional optical film laminate 10', a transferable adhesive layer is first formed on the provisional carrier film 14'. Thus, when the provisional carrier film 14' is peeled from the continuous web of the provisional optical film being continuously drawn from the roll, the adhesive layer 12 formed on the provisional carrier film is transferred to the polarizing composite film so as to be incorporated into the polarizing composite film 11. In place of the provisional carrier film 14' formed with the transferable adhesive layer, an adhesive layer 12 may be first formed on the polarizing composite film, and then a provisional carrier film 14" formed as a simple film subjected to a releasing treatment may be laminated to the adhesive layer 12. Further, a surface of the protective film to be laminated to the polarizer may be subjected to a hard coating treatment or an anti-dazzling or anti-glare treatment.

The manufacturing system 500 for a roll of the optical film laminate 10 according to the embodiment illustrated in FIG. 13 comprises the following elements in common with the manufacturing system according to the embodiment illustrated in FIG. 12; the inspection unit 560 including the image-reading device 590 for detecting a defect or defects existing in the polarizing composite film 11 including an adhesive layer 12; the carrier-film lamination mechanism 570 including the support rack 571 having the roll of the carrier film 14 mounted thereon for rotation; the optical-film take up drive mechanism 580 for driving and taking up the produced optical film into a roll; the control unit 600 including the information processing device 610 for performing an information processing and the storage device 620 for storing therein processed information; and the information recording unit 630 for recording produced encoded information on the optical film (final optical film). The manufacturing system 500 further comprises a lamination line or provisional-optical-film feed line 530 including a support rack 531 having a roll of the provisional optical film laminate 10' mounted thereon for rotation, and a lamination drive mechanism 540 including a pair of feeding drive rollers for continuously feeding the provisional optical film. The lamination drive mechanism 540 includes a length or distance measurement device 550 having an encoder incorporated in one of the feeding drive rollers to calculate a length fed from the leading edge of the provisional optical film. Additionally, the manufacturing system 500 comprises a provisional-carrier-film peeling unit 575 including a provisional-carrier-film take up drive mechanism 576.

Referring to the manufacturing process illustrated in FIG. 16, in Step 1, the roll of the provisional optical film laminate 10' is mounted in the support rack 531. The provisional optical film comprises a polarizing composite film 11 including a polarizer having a protective film laminated to one or each of opposite surfaces of the polarizer, and a provisional carrier film 14' formed with a transferable adhesive layer and laminated to the polarizing composite film 11. In Step 2, a continuous web of the provisional optical film is fed to the lamination line or provisional-optical-film feed line 530 by the lamination drive mechanism 540. In Steps 3 and 4, the provisional carrier film 14' is peeled and detached by the provisional-carrier-film take up drive mechanism 576 of the provisional-carrier-film peeling unit 575, and then, in Step 5, a defect or defects existing in the polarizing composite film 11 with the adhesive layer 12 in an exposed state is detected by the inspection unit 560.

The inspection unit 560 comprises an image-reading device 590 including for example a CCD camera. The image-reading device 590 is electrically connected to the information processing device 610 included in the control unit 610, whereby in the image data read by the image-reading device 590 is processed in association with measurement data measured by the distance measurement device 550 electrically connected to the information processing device 610. The control unit 600 functions to operate the information processing device 610 and the storage device 620 to process the image data from the image-reading device 590 in association with the feed-length measurement data on the fed-out distance measured in terms of the length from the leading edge of the provisional optical film by the distance measurement device 550, so as to create position data representing the locations or coordinate positions of defects in the polarizing composite film 11 having the adhesive layer 12 in exposed state, and then store the position data in the storage device 620. The control unit 600 is operable at first, based on the position data on the detected defect locations or coordinate positions, to define defective regions and normal regions in the polarizing composite film 11. Further, the control unit 600 functions, based on the defective and normal regions defined in the polarizing composite film 11, to create slit-position information. The slit-position information is information indicating the positions at which respective ones of the slit lines are to be formed in the continuous web of optical film (final optical film), and the slit lines are formed in pairs by the slitting unit 150 during the manufacturing process of liquid-crystal display elements, in a manner as to slit the continuous web of optical film being fed in a direction transverse to the feed direction of the continuous web, from the surface opposite to the carrier film to a depth reaching the adhesive layer surface of the carrier film. The slit-position information thus created is also stored in the storage device 620. Then, the information processing device 610 functions, based on the stored slit-position information, to create encoded information, together with additional information, such as the manufacturing lot and the length in meters of the web in the roll of the optical film, or in association with the additional information. The manner of creating the encoded information is common in the disclosed embodiments so that it will be described later in connection with FIG. 18 and FIGS. 19 to 21.

In Steps 6 and 7, the carrier film 14 subjected to only a releasing treatment is taken out by the carrier-film lamination mechanism 570 which also serves as a film-feeding drive mechanism. In Step 8, the taken out carrier film 14 is laminated to the exposed adhesive layer 12. The information processing device 610 defines defective regions and normal regions in the polarizing composite film 11, based on the locations or coordinate positions of the defects detected in Step 5, and then, based on the defined defective and normal regions, creates slit-position information for forming defective polarizing sheets Xβ and normal polarizing sheets Xα in the polarizing composite film 11. In Step 9, the created slit-position information is recorded on a surface of the carrier film 14 laminated on the polarizing composite film 11, by the information recording unit 630. Finally in Step 10, the optical film formed through the above Steps is wound by the optical-film take up drive mechanism 580 into a roll of the optical film laminate. The embodiment illustrated in FIG. 13 is different from the embodiment illustrated in FIG. 12 in that the roll of the provisional optical film laminate 10' is first produced and prepared. Further, the embodiment in FIG. 13 is different from the embodiment in FIG. 12 in that when the provisional carrier film 14' having the transferable adhesive layer 12 provided thereon is peeled, the polarizing composite film 11 is formed, on the surface exposed by peeling, with the transferred adhesive layer 12, and the inspection of defects existing in the polarizing composite film 11 is conducted on the polarizing composite film having such exposed adhesive layer 12.

Although not illustrated in FIG. 13 or 16, it may be possible, particularly in the process of manufacturing roll of the provisional optical film laminate, in advance of Step 10, to laminate a surface-protection film 13 having an adhesive surface on the surface of the polarizing composite film 11 opposite to the surface on which the carrier film 14 is laminated by means of a separately provided surface-protection-film lamination mechanism 640, before the protective film is laminated to the polarizer, irrespective of whether the protective film is subjected to a hard coat treatment or an anti-dazzling or anti-glare treatment on one surface. In this case, the resulting optical film has a structure having the carrier film 14 and the surface-protection film 13 laminated to respective ones of the opposite surfaces of the polarizing composite film 11.

(Method and System for Manufacturing Roll of Optical Film Laminate According to the Embodiment Illustrated in FIG. 14)

FIG. 14 is a schematic diagram showing the optical-film manufacturing system for a roll of an optical film laminate 10, wherein a roll of a provisional optical film laminate 10" is mounted on a support rack, the provisional optical film laminate comprising a polarizing composite film 11 including a polarizer and a protective film laminated thereon, and a provisional carrier film 14' releasably laminated on the polarizing composite film 11 through an adhesive layer; and a provisional surface-protection film 13' laminated on the surface of the polarizing composite film 11 opposite to the surface on which the provisional carrier film 14' is laminated, and wherein the provisional carrier film 14' and the provisional surface-protection film 13' are continuously peeled from the continuous web of the provisional optical film being continuously unrolled from the roll to have the adhesive layer exposed and the optical film having the exposed adhesive layer is subjected to an inspection for the existence of defects in the polarizing composite film 11, a carrier film 14 being then releasably laminated on the adhesive layer 12 of the polarizing composite film 11, and a surface-protection film 13 being releasably laminated through the adhesive surface on the surface of the polarizing composite film opposite to the surface on which the carrier film 14 is not laminated, in a sequential manner; slit-position information being thereafter recorded on a surface of the carrier film 14 in the same manner as in the embodiments in FIGS. 13 & 14. FIG. 17 is a flowchart showing the manufacturing process or steps in the system.

It is to be repeated that, in the process of producing the roll of the provisional optical film laminate 10", a transferable adhesive layer is first provided on the provisional carrier film 14'. Thus, when the provisional carrier film 14' is peeled from the continuous web of the provisional optical film being continuously fed out from the roll, the adhesive layer 12 formed on the provisional carrier film is transferred to the polarizing composite film 11 so as to be incorporated into the polarizing composite film 11. In place of the provisional carrier film 14' formed with the transferable adhesive layer, an adhesive layer 12 may first be provided on the polarizing composite film, and then a provisional carrier film 14" may be laminated on the adhesive layer 12 after being subjected to a releasing treatment. Further, as the protective film to be attached to the polarizer, it may be possible to use a film which is subjected to a hard coat treatment or an anti-dazzling or anti-glare treatment at the surface to which the surface-protection film is attached. The provisional surface-protective film 13' and the surface-protective film 13 are formed with non-transferable adhesive surfaces at the sides which are to be laminated on the polarizing composite film 11. Typically, the surface-protection film 13 is formed as a sheet integral with the normal polarizing sheet to be laminated to a liquid-crystal panel, thus the surface-protection film sheet 13 having the adhesive surface is used as means to protect the surface of an associated liquid-crystal display element during the liquid-crystal display element manufacturing process, and, after completion of the manufacturing process, it is peeled and removed together with the adhesive surface.

The manufacturing system 500 for a roll of the optical film laminate 10 according to the embodiment illustrated in FIG. 14 comprises a lamination line or provisional-optical-film feed line 530 including a support rack 531 having a roll of the provisional optical film laminate 10" rotatably mounted thereon as in the embodiment illustrated in FIG. 13, and the feed line 530 includes a lamination drive mechanism 540 including a pair of feeding drive rollers for continuously feeding the provisional optical film. The lamination drive mechanism 540 comprises a length or distance measurement device 550 having an encoder incorporated in one of the feeding drive rollers to calculate the fed-out distance in terms of a length from the leading edge of the provisional optical film. The manufacturing system 500 further comprises a provisional-carrier-film peeling unit 575 including a provisional-carrier-film take up drive mechanism 576. The manufacturing system 500 also comprises the following elements as in the system according to the embodiment illustrated in FIG. 12; an inspection unit 560 including an image-reading device 590 for inspecting existence of defects in the polarizing composite film 11; a carrier-film lamination mechanism 570 comprising a support rack 571 having a roll of the carrier film 14 rotatably mounted thereon; an optical-film take up drive mechanism 580 for drivingly winding the produced optical film into a roll; a control unit 600 including an information processing device 610 for performing information processing and a storage device 620 for storing therein processed information; and the information recording unit 630 for recording encoded information on the optical film. Additionally, the manufacturing system 500 comprises a provisional surface-protection-film peeling unit 645 including a provisional surface-protection-film take up drive mechanism 646 for taking up and peeling the provisional surface-protection film 13', and a surface-protection film lamination mechanism 640 for attaching the final surface-protection film 13 to the polarizing composite film at the surface opposite to the surface on which the final carrier film 14 is laminated, the surface-protection film lamination mechanism 640 also serving as a film-feeding drive mechanism.

Referring to the respective ones of the manufacturing steps illustrated in FIG. 17, in Step 1, the roll of the provisional optical film laminate 10" is mounted on the support rack 531. The provisional optical film comprises a polarizing composite film 11 including a polarizer having a protective film laminated to one or each of the opposite surfaces of the polarizer, and a provisional carrier film 14' formed with a transferable adhesive layer and laminated on the polarizing composite film 11. In Step 2, a continuous web of the provisional optical film is fed by the lamination drive mechanism 540. In Steps 3 and 4, the provisional carrier film 14' is peeled and detached by the provisional-carrier-film take up drive mechanism 576 of the provisional-carrier-film peeling unit 575. Next, in Steps 5 and 6, the provisional surface-protection film 13' which is laminated through an adhesive surface on the polarizing composite film at the surface on which the provisional carrier film 14' is laminated, is peeled and detached by the provisional surface-protection-film take up drive mechanism 646 of the provisional surface-protection-film peeling unit 645. In Step 7, an inspection is conducted by the inspection unit 560 on the polarizing composite film 11 having the adhesive layer in an exposed state, for existence of defects therein.

The inspection unit 560 comprises an image-reading device 590 including for example a CCD camera. The image-reading device 590 is electrically connected to the information processing device 610 included in the control unit 610, wherein image data read by the image-reading device 590 is processed in association with feed-length measurement data measured by the length or distance measurement device 550 electrically connected to the information processing device 610. The control unit 600 is operable to cause the information processing device 610 and the storage device 620 to process the image data from the image-reading device 590 in association with the feed-length measurement data relating to the fed-out distance measured in terms of a length from the leading edge of the provisional optical film by the length or distance measurement device 550, so as to create position data representing locations or coordinate positions of defects in the polarizing composite film 11 which has the adhesive layer 12 in the exposed state, and then store the position data in the storage device 620. Then, the control unit 600 functions, based on the position data relating to the detected locations or coordinate positions of defects, to define defective regions and normal regions in the polarizing composite film 11. Further, the control unit 600 functions, based on the defective and normal regions of the polarizing composite film 11 thus defined, to create slit-position information. The slit-position information is the one which indicates the positions at which respective ones of the slit lines are to be formed in the continuous web of optical film, and the slit lines are formed in pairs by the slitting unit 150 during the manufacturing process of liquid-crystal display elements, in a manner as to slit the continuous web of optical film being fed in a direction transverse to the feed direction of the continuous web, from the surface opposite to the carrier film to a depth reaching the adhesive layer surface of the carrier film. The created slit-position information is also stored in the storage device 620. Then, the information processing device 610 functions, based on the stored slit-position information, to create encoded information, together with additional information, such as the manufacturing lot and the length in meters of the optical film in the roll, or in association with the additional information. The manner of creating the encoded information is identical with those in the disclosed embodiments, so that it will be described later in connection with FIG. 18 and FIGS. 19 to 21.

In Steps 8 and 9, the carrier-film lamination mechanism 570 which also serves as a film-feeding drive mechanism feeds the carrier film 14 which has been subjected only to a releasing treatment. In Step 10, the delivered carrier film 14 is laminated on the exposed adhesive layer 12 in a releasable manner. Further, in Steps 11 and 12, the surface-protection film 13 having the adhesive surface is fed out by the surface-protection film lamination mechanism 640 which also serves as the film-feeding drive mechanism. In Step 13, the adhesive surface of the fed final surface-protection film 13 is laminated through the adhesive surface on the surface of the polarizing composite film opposite to the surface on which the carrier film 14 will not be laminated. This is the Step 13.

Then, the information processing device 610 functions to define defective regions and normal regions in the polarizing composite film 11, based on locations or coordinate positions of the defects detected in Step 7, and then, based on the defined defective and normal regions, creates slit-position information for forming defective polarizing sheets Xβ and normal polarizing sheets Xα in the polarizing composite film 11. In Step 14, the created slit-position information is recorded on a surface of the carrier film 14 laminated on the polarizing composite film 11, by the information recording unit 630. Finally, in Step 15, the optical film formed through the above Steps is wound by the optical-film take up drive mechanism 580, to form a roll of the optical film laminate.

The embodiment in FIG. 14 is different from the embodiment in FIG. 13, in that the roll of the provisional optical film laminate 10" is first prepared with a structure wherein not only the provisional carrier film 14' but also the provisional surface protection film 13' are laminated on the polarizing composite film 11. Therefore, in the embodiment in FIG. 14, the inspection of defects is carried out with respect to the polarizing composite film including the adhesive layer 12 exposed by sequentially peeling the provisional carrier film 14' and the provisional surface-protection film 13'.

In the embodiment illustrated in FIG. 12, the optical-film take up drive mechanism 580 is configured to operate in an inter-related manner with the operation of at least the lamination drive mechanism 540, the inspection unit 560 and the carrier-film lamination mechanism 570, to take up the optical film having the encoded information 20 recorded on a surface of the carrier film 14. In the embodiments illustrated in FIGS. 13 & 14, the optical-film take up drive mechanism 580 is configured to operate in an inter-related manner with at least the lamination drive mechanism 540, the take up drive mechanism (576, 646), the carrier-film lamination mechanism 570 and the surface-protection film lamination mechanism 640, to take up the optical film having the encoded information 20 recorded on a surface of the carrier film 14. The manufacturing systems 500 may be provided with a speed adjustment mechanism (not shown) including a feed roller in order to adjust the take up speed of the optical film, when needed. Further, the encoded information may be recorded on the surface-protection film 13, instead of the carrier film 14.

(Creation of Encoded Information)

An embodiment of creating the encoded information 20 including information relating to the positions of the defects in the above embodiments is shown in the tables and schematic diagrams of FIGS. 22 to 25. It is to be understood that the encoded information 20 may be recorded in a variety of ways including, for example a mode in which encoded information is entirely recorded on a single storage medium, and a mode in which encoded information is recorded on a plurality of storage media disposed at given intervals (e.g., at intervals of 1 m or 100 m). The selection of the recording modes or the content of position information to be stored as the encoded information may be determined depending on the function required for the liquid-crystal display element manufacturing method and system.

Thus, it should be noted that the embodiments illustrated in the schematic diagram and the flowcharts of FIG. 18 and FIGS. 19 to 21 are shown only by way of examples.

The encoded information 20 comprises encoded information recorded on the continuous web unrolled from the roll of the optical film laminate 10 and is comprised of information for identifying the previously defined defective and normal regions in the polarizing composite film 11 including an adhesive layer 12, and slit-position information for forming defective polarizing sheets and normal polarizing sheets corresponding to the defective and normal regions, together with or in association with additional information, such as the manufacturing lot and the length in meters of the web in the roll. The encoded information 20 may be any type of code, as long as it is readable by the reading unit 120 of the liquid-crystal display element continuous manufacturing system 1 during the liquid-crystal display element manufacturing process.

Figure 18:
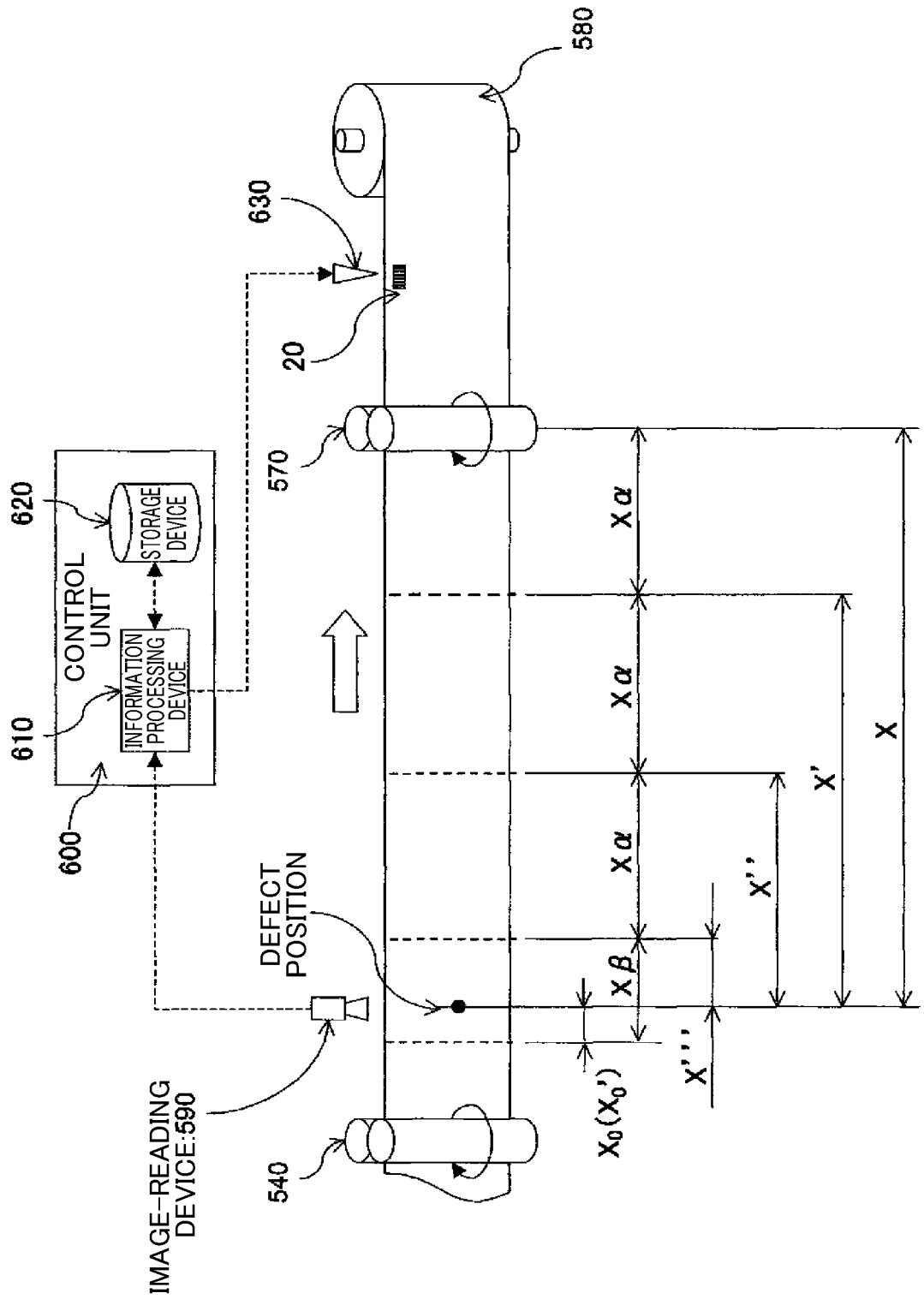
FIG. 18 is a schematic diagram showing a technique of calculating a position for forming a slit line in a continuous web of an optical film being fed to segment a region of a polarizing composite film into a defective region and a normal region, in the continuous manufacturing system for liquid-crystal display element, according to at least one embodiment.

FIG. 18 is a schematic diagram showing the manner of calculating the positions at which respective ones of the slit lines are to be formed for delimiting the defective and normal regions in the continuous web of optical film which is being transported.

Figure 19:
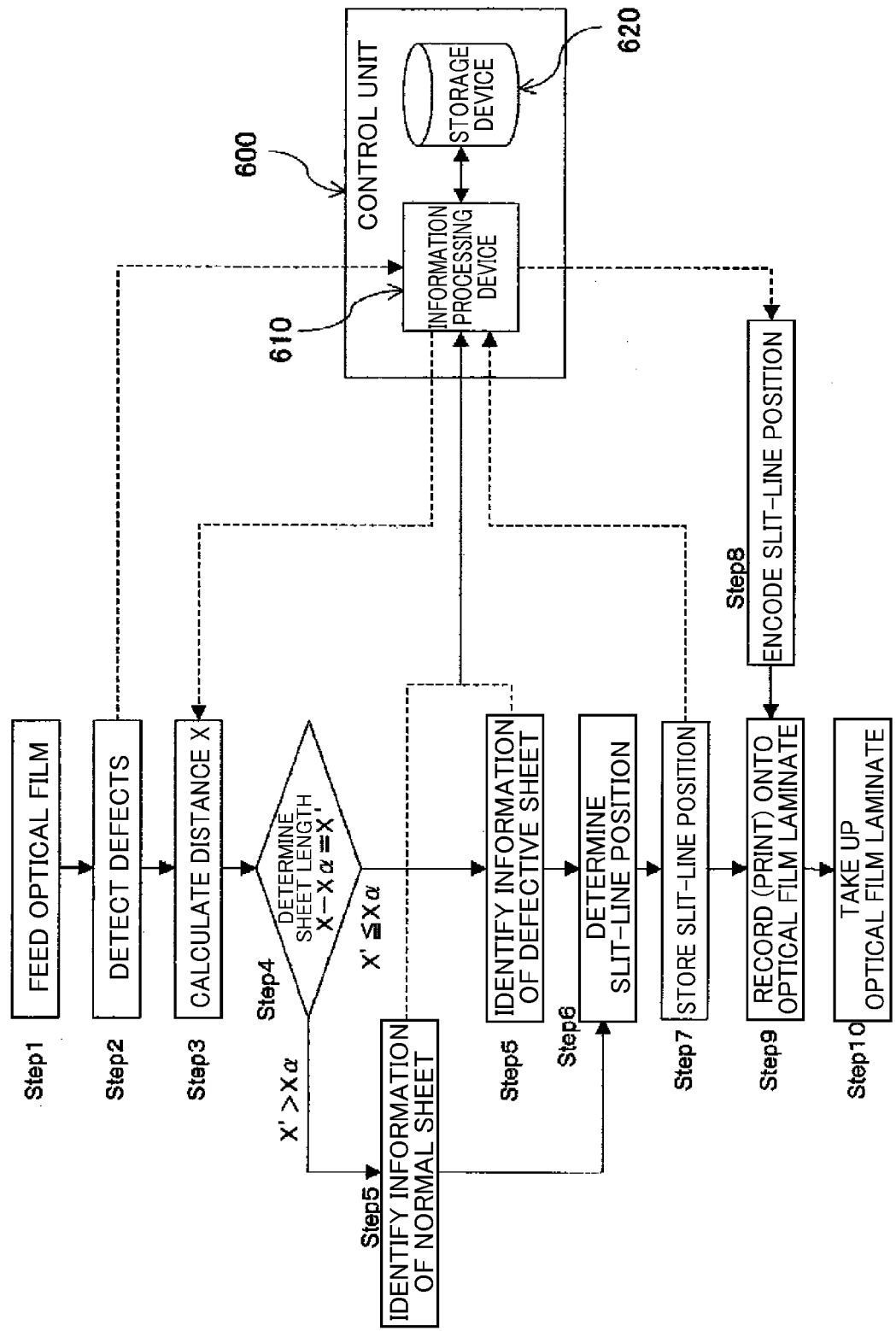
FIG. 19 is a flowchart showing a technique of calculating a position for forming a slit line in a continuous web of an optical film being fed.
Figure 20:
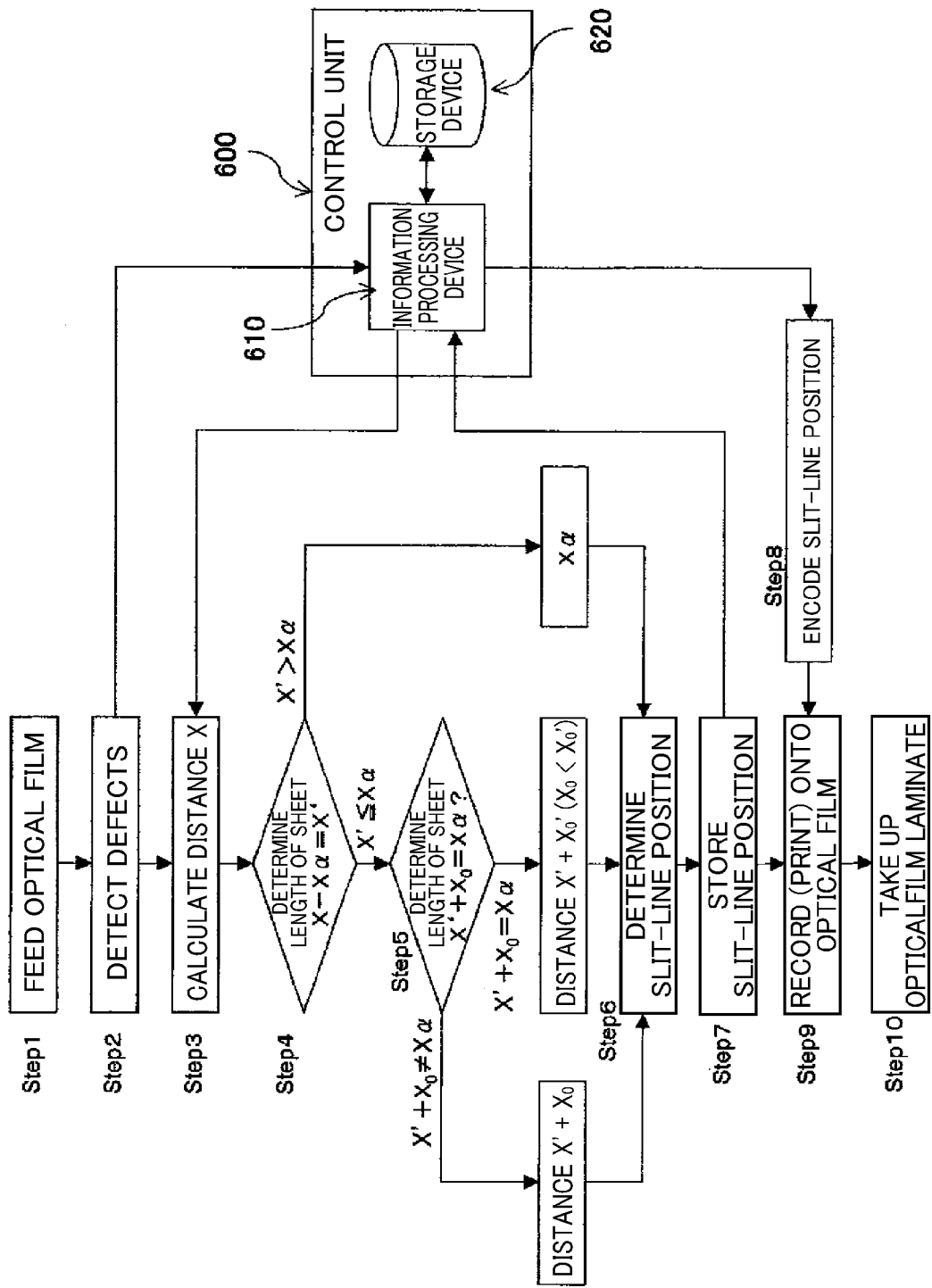
FIG. 20 is a flowchart showing another technique of calculating a position for forming a slit line in a continuous web of an optical film being fed.

The control unit 600 functions to operate the information processing device 610 and the storage device 620 to process image data from the image-reading device 590 in association with feed-length measurement data relating to the length fed from the leading edge of the polarizing composite film 11 by the length or distance measurement device 550, so as to create position data representing the locations or coordinate positions of defects existing in the polarizing composite film, and then store the position data in the storage device 620. Then, the control unit 600 functions to define defective regions and normal regions in the polarizing composite film 11, based on the position data relating to the detected locations or coordinate positions of defects. Further, the control unit 600 functions to create slit-position information, based on the defective and normal regions of the polarizing composite film 11. The slit-position information is the one which indicates the positions at which respective ones of the slit lines are to be formed in the continuous web of optical film, and the slit lines are formed in pairs by the slitting unit 150 during the manufacturing process of liquid-crystal display element, in a manner as to slit the continuous web of optical film being fed in a direction transverse to the feed direction of the continuous web, from the surface opposite to the carrier film to a depth reaching the adhesive layer surface of the carrier film. The created slit-position information is also stored in the storage device 620. Then, the information processing device 610 operates to create encoded information based on the stored slit-position information, together with additional information, such as the manufacturing lot and the length in meters of the web in the roll of the optical film laminate, or in association with additional information. FIGS. 19 to 21 are flowcharts showing three different processes for calculating the positions at which the respective ones of the slit lines are to be formed in the continuous web of optical film being fed.

The calculation processes will be described below based on the schematic diagram and the flowcharts of FIGS. 19 to 21. The schematic diagram of FIG. 18 shows the polarizing sheet 11' consisting of a polarizer having a protective film laminated thereon, or the polarizing composite film 11 having an adhesive layer (both of the polarizing sheet 11' and the polarizing composite film 11 will hereinafter be referred to collectively as "polarizing composite film 11") being continuously fed in right direction by the feed roller of the carrier-film lamination mechanism 570. However, in view of the fact that the optical film is formed by the carrier-film lamination mechanism 570 by laminating the carrier film 14 formed with a transferable adhesive layer thereon is releasably laminated on the polarizing sheet 11' consisting of the polarizer having the protective film laminated thereon, the polarizing composite film being continuously supplied by the feed roller will herein be referred to generically as the "optical film". The flowcharts of FIGS. 19 to 21 show a specific steps up to the time when the encoded information 20 created by the control unit 600 is recorded on the optical film, preferably, on the surface of the carrier film 14, and the optical film having the encoded information recorded thereon is taken up by the optical-film take up drive mechanism 580.

In either case, in Step 1, the control unit 600 operates to instruct the lamination drive mechanism 540 and the optical-film take up drive mechanism 580 to feed the optical film. In Step 2, the control unit 600 instructs the inspection unit 560 including the image-reading device 590 to detect the locations or coordinate positions of defects existing in the optical film, and store the detected locations or coordinate positions of the defects together with the type and size of the detected defects. In Steps 3 and 4, the control unit 600 functions to determine the relationship between the length of a sheet of the optical film and the length (Xα) corresponding to that of a normal region. The method of determining the relationship is as follows.

In Step 3, the control unit 600 functions to operate the information processing device 610 to calculate the distance X between a reference position of the optical film being fed and the location of the defect, and store the calculated distance X in the storage device 620. As shown in FIG. 18, the distance X is a distance for example between the position of the carrier-film lamination mechanism 570 (the reference position of the optical film) and the position of the inspection unit 560 (or the image-reading device 590) (the defect position).

In Step 4, the control unit 600 further functions to operate the information processing device 610 to subtract the length (Xα) corresponding to that of the normal region from the distance X to obtain a distance (X−Xα)=X', and then store the distance X' in the storage device 620. The length (Xα) corresponding to that of the normal region of the optical film is determined by a system manager based on the size of the liquid-crystal panel and pre-stored in the storage device 620. Then, the control unit 600 functions to operate the information processing device 610 to determine whether the calculated distance X' is greater or less than the length (Xα) corresponding to that of the normal region of the optical film.

Specifically, if the relation X' (or X'') in FIG. 18>Xα is established, it is understood that the normal region (Xα) of the optical film can be ensured, so that the control unit 600 instructs the lamination drive mechanism 540 and the optical-film take up drive mechanism 580 to have the optical film delivered under tension by the length (Xα) of the normal region. The value of the length (Xα) in this instance is the slit-position information for forming a normal polarizing sheet Xα corresponding to the normal region in the optical film.

To the contrary, if the relation is X'≦Xα, i.e., X''' in FIG. 18≦Xα, it is understood that the normal region (Xα) of the optical film cannot be ensured. In this instance, the region of the optical film having the length (Xβ) provides the defective polarizing sheet (Xβ), so that the control unit 600 functions to operate the information processing device 610 to calculate the length (X'+X0)=Xβ corresponding to the defective region (Xβ) by adding a constant value X0 to X' (X''' in FIG. 18), and to instruct the lamination drive mechanism 540 and the optical-film take up drive mechanism 580 to feed the optical film under tension by the length (Xβ) of the defective region. The value (Xβ) in this instance is the slit-position information for forming a defective polarizing sheet Xβ corresponding to the defective region of the optical film.

Specifically, the control unit 600 operates to calculate the following (a) and (b) to create slit-position information indicative of the positions at which respective ones of the slit lines are to be formed in a continuous web of optical film to be fed during the manufacturing process of liquid-crystal display elements to form normal polarizing sheets Xα and defective polarizing sheets Xβ of a polarizing composite film, and then store the slit-position information in the storage device 620:

(a) a distance (Xα) to the position for forming a next slit line, if X'>Xα; and (b) a distance (X'+X0=Xβ) to the position for forming a next slit line, if X'≦Xα.

By the way, if the length (X'+X0=Xβ) corresponding to that of the defective region becomes equal to the length (Xα) corresponding to that of the normal region, i.e., if (X'+X0)=(Xα), the control unit 600 cannot identify or discriminate the normal region (Xα) over the defective region (Xβ). This means that the region to be recognized as the defective region (Xβ) may not be recognized as the defective region (Xβ), so that, for example, the normal region (Xα) and the defective region (Xβ) cannot be discriminated from each other based on feed-length measurement data on the feed length of the optical film, and the encoded information created based on the feed-length measurement data (X'+X0) inevitably becomes imperfect. It is assumed that such a situation occurs when the location or coordinate position of a defect in the optical film is infinitely close to the position for forming a next slit line in the optical film, or when a series of defects are distributed over a length (Xα) corresponding to that of the normal region.

In Step 5, if (X'+X0) becomes equal to (Xα), the control unit 600 functions to operate the information processing device 610 to perform a calculation based on at least one of the following methods to create information for identifying or discriminating the normal region (Xα) over the defective region (Xβ).

In Step 5 illustrated in FIG. 19, even if, as the result of calculation conducted by the information processing device 610, the distance (X'+X0) to the position for forming a next slit line becomes equal to the length (Xα) corresponding to that of the normal region, the region in said distance is not essentially the normal region (Xα). In order to make it possible to recognize such difference, for example, as defect-including information Xγ illustrated in FIG. 23, a numerical suffix "0" may be associated with the slit-position information indicating the position for forming a slit-line corresponding to the normal region, and a numerical suffix "1" with the slit-position information indicating the position for forming a-slit-line corresponding to the defective region. In Step 5 illustrated in FIG. 20, if, as a result of calculation of the information processing device 610, the distance (X'+X0) to the position where a next-slit-line is to be formed becomes equal to the length (Xα) corresponding to that of the normal region, an information processing is conducted so that the distance to the position where a next-slit-line is to be formed satisfies the relation (X'+X0'), wherein X0'>X0, and store the distance (X'+X0') in the storage device 620. As shown in FIG. 24, this information processing makes it possible by calculating the distance (X'+X0') different from Xα, to allow the region having the length (X'+X0') to be identified or discriminated over the normal region (Xα). Further, in Step 5 illustrated in FIG. 21, if, as the result of calculation conducted by the information processing device 610, the distance (X'+X0) to the position where a next-slit-line is to be formed becomes equal to the length (Xα) corresponding to that of the normal region, an information processing is carried out to allow the distance to the position where the next-slit-line is to be formed to become [(X'+X0)/m], wherein m=2 or more, preferably 2 or 3, and store the distance [(X'+X0)/m] in the storage device 620. As in the case of FIG. 20, this information processing illustrated in FIG. 25 is also configured to calculate the [(X'+X0)/m] different from Xα to allow the region having the length [(X'+X0)/m] to be identified or discriminated over the normal region (Xα).

Summarizing the above, in the process for creating information for identifying or discriminating the defective and normal regions, either of the following methods may be adopted:

(1) A method of creating defect-including information Xγ as information for identifying or discriminating a region having a length (X'+X0) calculated by the information processing device 610 over the normal region (Xα);

(2) A method of creating a distance to the position where a next-slit-line is to be formed which is calculated by the information processing device 610, as a distance (X'+X0') (wherein X0'>X0) which is different from Xα; and (3) A method of creating a distance to the position where a next-slit-line is to be formed which is calculated by the information processing device 610, as a distance [(X'+X0)/m] (wherein m=2 or more) which is different from Xα.

Particularly, in cases where the method (2) or (3) is employed, (X'+X0)=(Xα) is changed to (X'+X0')≠Xα or [(X'+X0)/m] Xα through the information processing illustrated in FIG. 20 or 21, thus the position where a next-slit-line is to be formed can be used as information indicating the defective region identified or discriminated over the normal region.

Next, in either case, in Step 6, the control unit 600 functions to operate the information processing device 610 to determine the length between the reference position and the position where a next-slit-line is to be formed, based on the calculation result in Steps 4 and 5. In the methods (2) or (3), in Step 7, the control unit 600 operates to cause the information processing device 610 to store the length to the position where a next-slit-line is to be formed as determined in Step 6, in the storage device 620. However, in the case of the method (1), the control unit 600 functions to operate the information processing device 610 to store the length to the position of forming a next-slit-line in association with the defect-including information Xγ, in the storage device 620.

In either case, in Step 8, the control unit 600 functions to operate the information processing device 610 to convert, based on the position for forming a next-slit-line stored in Step 7, into encoded information, the slit-position information indicating the position where a slit-line is to be formed with respect to the leading edge of the optical film being fed, together with or in association with additional information, such as the manufacturing lot and the length in meters of the optical-film in the roll. In the method (1), it is to be understood that the defect-including information Xγ is simultaneously converted to the encoded information.

In Step 9, the control unit 600 functions to operate the information recording unit 630 to record the encoded information converted in Step 8 by the information processing device 610, on the optical film, preferably on the surface of the carrier film. In the method (1), it should be understood that the encoded defect-including information Xγ is also recorded together with the encoded information. Finally, in Step 10, the control unit 600 functions to operate the lamination drive mechanism 540 and the optical-film take up drive mechanism 580 to wind the finished optical film. The roll of the optical film laminate is thus completed. Then, examples of the encoded information are shown in FIGS. 22 to 25.

(Details of the Manufacturing System for a Roll of Optical Film Laminate Specifically showing Defect Inspection Process)

Figure 26:
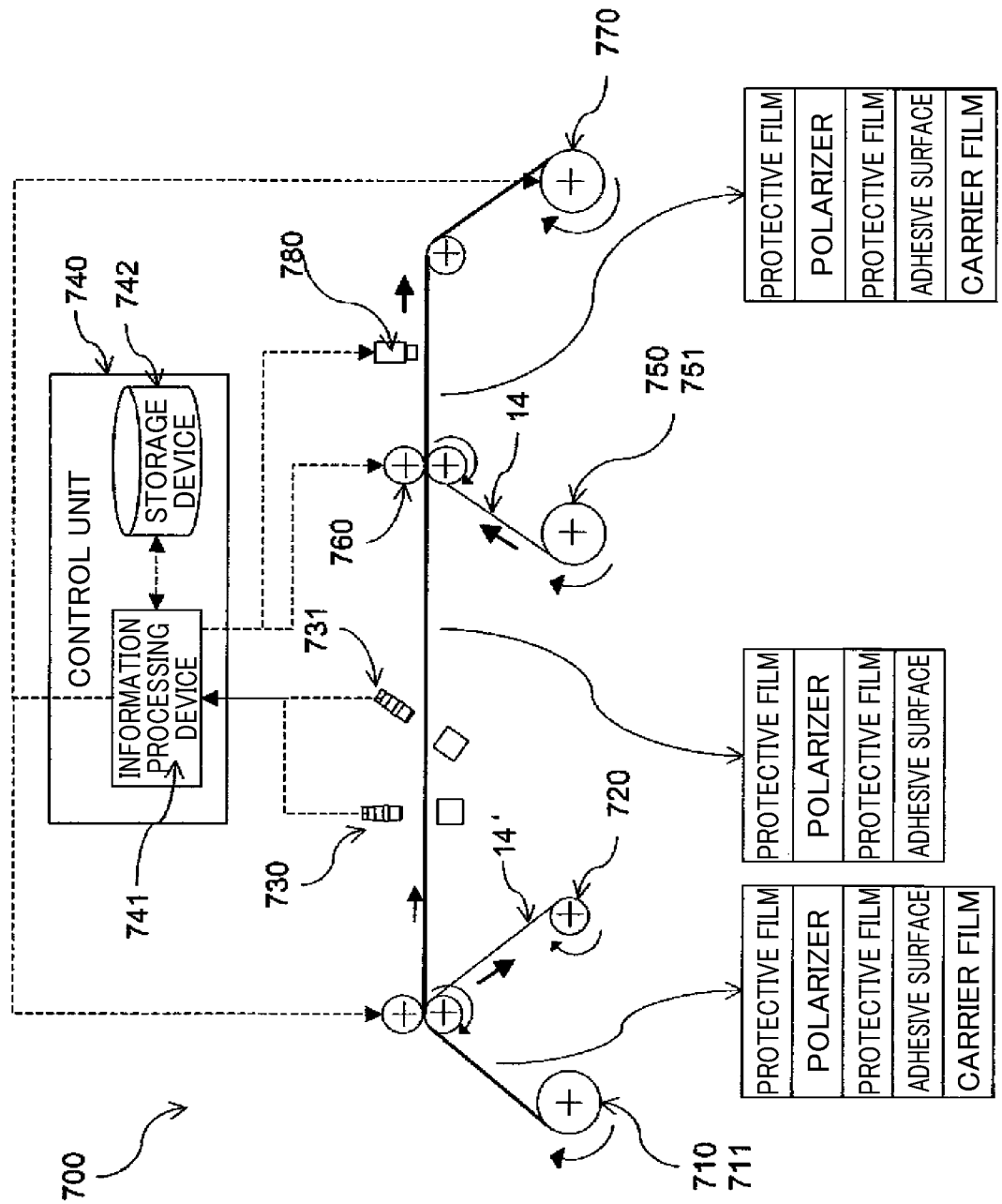
FIG. 26 is a schematic diagram showing a manufacturing system for a roll of an optical film laminate having two inspection units, according to the embodiment illustrated in FIG. 13.
Figure 27:
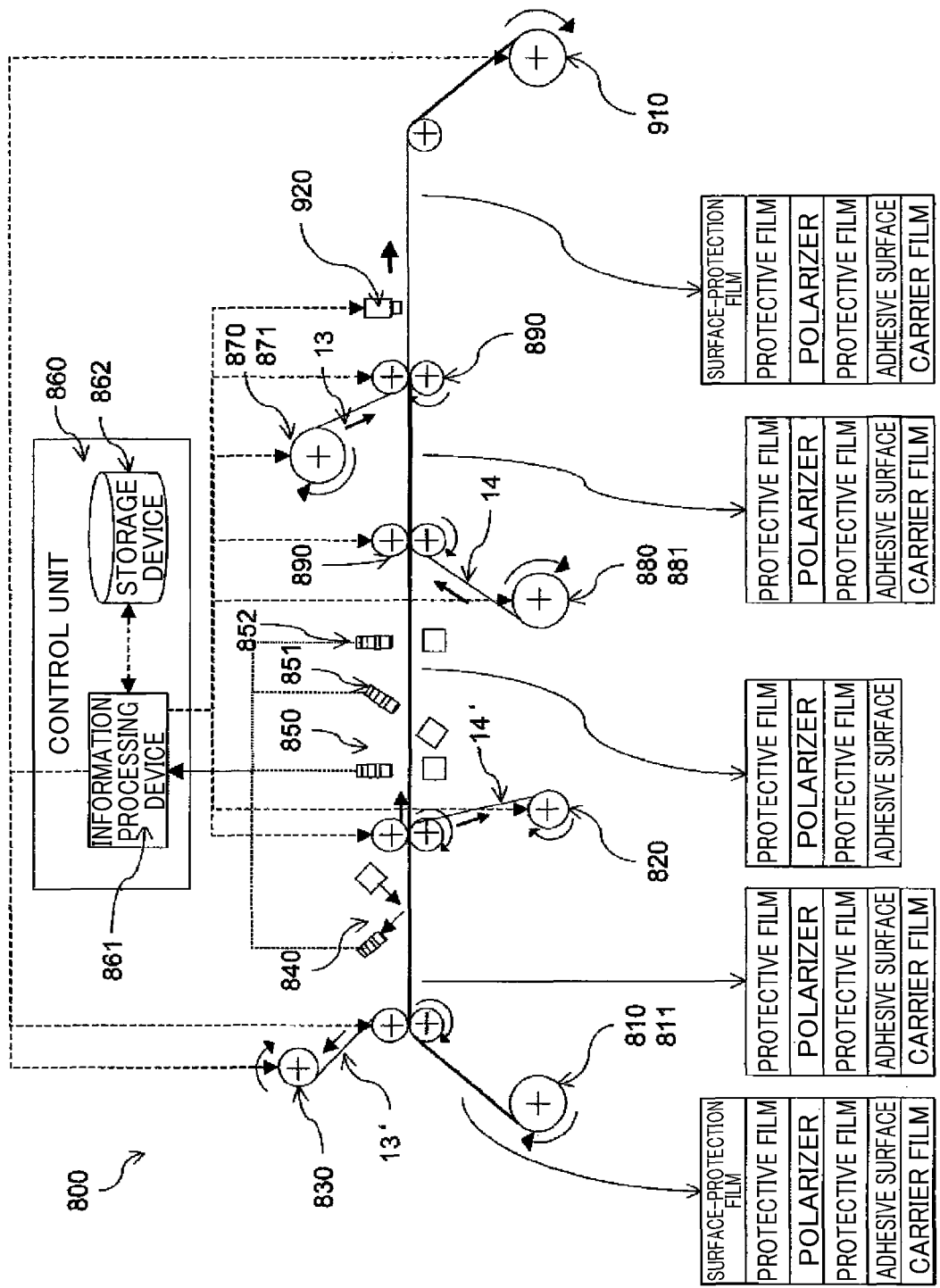
FIG. 27 is a schematic diagram showing a manufacturing system for a roll of an optical film laminate having four inspection units, according to the embodiment illustrated in FIG. 14.

With reference to FIGS. 26 and 27, the manufacturing system for a roll of the optical film laminate will be more specifically described in connection with a specific method of inspecting defects existing in the polarizing composite film 11. FIG. 26 is a schematic diagram showing a manufacturing system of a roll of the optical film laminate 700 having two inspection units, which is based on the manufacturing system according to the embodiment illustrated in FIG. 13.

In the manufacturing process of the roll of provisional optical film 10', a polarizing sheet 11' is formed with a structure comprising a polarizer having a protective film laminated on at least one of the opposite surfaces of the polarizer, and an adhesive layer 12 is formed on the other surface of the polarizing sheet 11' to form a polarizing composite film 11. Then, a provisional carrier film 14' is releasably laminated on the adhesive layer 12 of the polarizing composite film 11, and the resulting provisional optical film is wound into a roll to form the roll of the provisional optical film laminate 10'. The roll of the provisional optical film laminate 10' is rotatably mounted on a support rack 711 of a provisional-optical-film feed unit 710. In addition to the provisional-optical-film feed unit 710, the manufacturing system 700 comprises a provisional-carrier-film take up drive mechanism 720, a first inspection unit 730, a second inspection unit 731, a control unit 740, a carrier-film feed unit 750, a carrier-film lamination mechanism 760, an optical-film take up drive mechanism 770, and an information recording unit 780.

The provisional optical film is continuously delivered from the roll of the provisional optical film laminate 10' by the provisional-optical-film feed unit 710. The provisional-carrier-film take up drive mechanism 720 is disposed along the feed direction of the provisional optical film, and adapted to take up the provisional carrier film 14' by peeling and detaching it from the provisional optical film. Each of the first and second inspection units 730, 731 is adapted to detect one or more defects in the surface and the interior of the polarizing composite film 11 with the adhesive layer 12 exposed as a result of the peeling the provisional carrier film 14'. The first inspection unit 730 is comprised of a transmission inspection device illustrated in FIG. 28. The transmission inspection method is designed such that a visible light emitted from a light source is projected perpendicularly to the polarizing composite film 11, the light which has passed through the polarizing composite film 11 being received by an optical detection unit to detect one or more defects existing in the polarizing composite film 11 in the form of a shade. The second inspection unit 731 is comprised of a cross-Nicol transmission inspection device illustrated in FIG. 28. The cross-Nicol transmission inspection method is designed such that a visible light from a light source is introduced perpendicularly or obliquely into the polarizing film 11 associated with a polarization filter which is disposed immediately before an optical detection unit in such a manner that the absorption axis of the polarization filter is oriented at a right angle with respect to the absorption axis of the polarizing composite film 11, the light which has passed through the polarizing composite film 11 being received by the optical detection unit to detect one or more defects existing in the polarizing composite film 11 as a bright spot.

The control unit 740 functions to define defective regions and normal regions in the polarizing composite film 11, based on locations or coordinate positions of one or more defects detected by the first inspection unit 730 and the second inspection unit. Then, the control unit 740 functions to operate an information processing device 741 to create slit-position information for forming defective polarizing sheets Xβ and normal polarizing sheets Xα in the polarizer film, based on the defined defective and normal regions, and convert the slit-position information into encoded information 20. The information recording unit 780 is adapted to record the encoded information on a surface of the carrier film 14 newly laminated on the polarizing composite film 11.

The carrier-film feed unit 750 disposed downstream of the second inspection unit 731 is adapted to continuously unroll the carrier film 14 from a roll of the carrier film 14 rotatably mounted in the support rack 751, along the feed direction of the polarizer film 11. The carrier-film lamination mechanism 760 is provided with a pair of rollers, and adapted to releasably laminate the carrier film 14 on the exposed adhesive layer 12 after completion of the inspection by the inspection units. It may be repeated that, the encoded information is recorded on the surface of the carrier film 14 newly laminated on the adhesive layer, by the information recording unit 780. The created optical film is wound by the optical-film take up drive mechanism 770, and formed into a roll of the optical film laminate 10. The control unit 740 functions to control respective operations of the units, the mechanisms and the devices in an inter-related manner.

FIG. 27 is a schematic diagram showing a manufacturing system of the roll of the optical film laminate 800 having four inspection units, which is based on the manufacturing system according to the embodiment in FIG. 14.

In the manufacturing process of the provisional optical film 10", a polarizing sheet 11' is produced as comprising a polarizer having a protective film laminated on at least one of the opposite surfaces of the polarizer, and an adhesive layer 12 is formed on the other surface of the polarizing sheet 11' to form a polarizing composite film 11. Then, a provisional carrier film 14' is releasably laminated on the adhesive layer 12 of the polarizing composite film 11, and a provisional surface-protection film 13' is releasably laminated on the surface of the polarizing composite film 11 opposite to the surface on which the provisional surface-protection film 14' is laminated, the resulting provisional optical film is wound into a roll of the provisional optical film laminate 10" The roll of provisional optical film laminate 10" is rotatably mounted in a support rack 811 of a provisional-optical-film feed unit 810.

In addition to the provisional-optical-film feed unit 810, the system 800 comprises a provisional-carrier-film take up drive mechanism 820, a provisional-surface-protection-film take up drive mechanism 830, a first inspection unit 840, a second inspection unit 850, a third inspection unit 851, a fourth inspection unit 852, a control unit 860, a provisional-surface-protection-film feed unit 870, a carrier-film feed unit 880, two sets of lamination mechanisms 890 (a carrier-film lamination mechanism 891, a surface-protection-film lamination mechanism 892), an optical-film take up drive mechanism 910, and an information recording unit 920.

The provisional optical film 10' is continuously unrolled from the roll of the provisional optical film laminate 10" by the provisional-optical-film feed unit 810. The provisional-surface-protection-film take up drive mechanism 830 is disposed along the feed direction of the provisional optical film, and adapted to take up the provisional surface-protection film 13' by peeling and detaching it from the provisional optical film. The provisional-carrier-film take up drive mechanism 820 is disposed downstream of the provisional-surface-protection-film take up drive mechanism 830 and along the feed direction of the provisional optical film, and adapted to take up the provisional carrier film 14' by peeling and detaching it from the provisional optical film.

As shown in FIG. 27, the inspection units are disposed at respective four positions in the system 800. The first inspection unit 840 is located between the provisional-surface-protection-film take up drive mechanism 830 and the provisional-carrier-film take up drive mechanism 820, and adapted to inspect the provisional optical film in a state where only the provisional surface-protection film 13' is peeled and the provisional carrier film 14' is still on the web. Specifically, the inspection is made to detect one or more defects in the surface of the polarizing composite film 11, based on the reflected light from the protective film of the exposed polarizing composite film 11. The second inspection unit 850, the third inspection unit 851 and the fourth inspection unit 852 are located between the provisional-carrier-film take up drive mechanism 820 and the carrier-film feed unit 880, so that they inspect one or more defects on the surface and the interior of the polarizing composite film by having light transmit through the polarizing composite film 11 having the adhesive layer 12 in exposed state as a result of the peeling the provisional carrier film 13' by the provisional-carrier-film take up drive mechanism 820.

More specifically, each of the second to fourth inspection units is configured as follows. The second inspection unit 850 is designed for the transmission inspection illustrated in FIG. 28. The transmission inspection method is designed such that a visible light from a light source is projected perpendicularly to the polarizing composite film 11, the light which has passed through the polarizing composite film 11 being received by an optical detection unit to detect one or more defects existing in the polarizing composite film 11 in the form of a shade. The third inspection unit 851 is designed for the oblique transmission inspection illustrated in FIG. 28. The oblique transmission inspection method is designed such that a visible light emitted from an oblique-transmission light source is projected to the polarizing composite film 11 in an oblique angle, the light which has passed through the polarizing composite film being received by an optical detection unit to detect one or more defects existing in the optical film as a shade. The fourth inspection unit 852 is comprised of a cross-Nicol transmission inspection device illustrated in FIG. 28. The cross-Nicol transmission inspection method is designed such that a visible light from a light source is introduced perpendicularly or obliquely into the polarizing film 11 associated with a polarization filter which is disposed immediately before an optical detection unit in such a manner that the absorption axis of the polarization filter is oriented at a right angle with respect to the absorption axis of the polarizing composite film 11, the light which has passed through the polarizing composite film 11 being received by the optical detection unit to detect one or more defects existing in the polarizing composite film 11 as a bright spot.

The control unit 860 functions to define in the polarizing composite film 11 defective regions and normal regions, based on locations or coordinate positions of one or more defects detected by the first inspection unit 840, the second inspection unit 850, the third inspection unit 851 and the fourth inspection unit 852. Then, the control unit 860 functions to operate an information processing device 861 to create slit-position information for forming defective polarizing sheets Xβ and normal polarizing sheets Xα in the polarizer composite film, based on the defined defective and normal regions, and convert the slit-position information into encoded information 20. The information recording unit 920 is adapted to record the encoded information on a surface of the carrier film 14 newly laminated to the polarizing composite film 11.

The carrier-film feed unit 880 disposed downstream of the fourth inspection unit 852 is adapted to continuously unroll the carrier film 14 from the roll of the carrier film laminate 14 rotatably mounted in a support rack 881, along the feed direction of the polarizer film 11. The surface-protection-film feed unit 870 disposed downstream of the carrier-film feed unit 880 is adapted to continuously unroll the surface-protection film 13 from a roll of the surface-protection film 13 rotatably mounted in a support rack 871, along the feed direction of the polarizer film 11. The lamination mechanisms 890, or the carrier-film lamination mechanism 891 and the surface-protection-film lamination mechanism 892 each having a pair of rollers function to releasably laminate the carrier film 14 and the surface-protection film 13 respectively on the exposed adhesive layer 12 and the surface of the polarizing composite film which does not have an adhesive layer, after completion of the inspection by the inspection units disposed at the four positions. It may be repeated that, the encoded information is recorded on the surface of the carrier film 14 newly laminated on the adhesive layer, by the information recording unit 920. The created optical film is wound by the optical-film take up drive mechanism 910, and formed into a roll of the optical film laminate 10. The control unit 860 is operable to control respective operations of the units, the mechanisms and devices in an inter-related manner.

Although the present disclosure has been described in connection with disclosed embodiments thereof, it will be appreciated that various changes and modifications will be made by those skilled in the art without departing from the spirit and scope of the invention, defined in the following claims, and legal equivalents of the following claims may be substituted for elements thereof. Accordingly, the present disclosure is not limited to the specific embodiments disclosed as the best mode for carrying out the disclosure, but intended to cover all embodiments included within the scope thereof.

What is claimed is:

1. A continuous manufacturing method for liquid-crystal display elements comprising steps of;
    providing a continuous web of optical film comprising a polarizer film having an adhesive layer thereon a carrier film and information encoded thereon, the encoded information indicating positions for slitting the continuous web of optical film based on positions of defects present in the continuous web of optical film and identification information for identifying the continuous web of optical film;
    continuously feeding the continuous web of optical film to a lamination station;
    measuring a feed distance of the continuous web;
    calculating a feed-length measurement data based on the feed distance;
    reading the encoded information recorded on the continuous web;
    forming a plurality of slit-lines in the continuous web by slitting the continuous web from a surface opposite to the carrier film to a depth reaching the surface of the carrier film adjacent to the adhesive layer, along slitting positions, based on the encoded information and the feed-length measurement data, when the slitting position defined in the continuous web thereon comes to a slitting station;
    using the encoded information for determining whether a polarizing sheet being formed between an adjacent pair of the slit-lines sequentially formed in the continuous web is a defective polarizing sheet having one or more defects or a normal polarizing sheet having no defect;
    peeling the polarizing sheet determined to be the normal polarizing sheet, among the polarizing sheets formed between an adjacent pair of the slit-lines sequentially formed in the continuous web of optical film, from the carrier film;
    transporting the peeled polarizing sheets to the lamination station; sequentially transporting the liquid-crystal display elements to the lamination station in synchronization with the transportation of the normal polarizing sheets to the lamination station; and
    applying the polarizing sheets to respective ones of the liquid-crystal display elements in a sequential manner.

2. The method in accordance with claim 1, further comprising a step of preventing the polarizing sheets determined to be defective polarizing sheets among the polarizing sheets being formed between respective pairs of the slit-lines sequentially formed in the continuous web of optical film, from being applied to the liquid-crystal display element.

3. The method in accordance with claim 1, wherein the step of applying the normal polarizing sheet to the liquid-crystal display element at the lamination station includes steps of;
    providing a pair of lamination rollers at the lamination station for movement toward and away from each other;
    detecting the position of the normal polarizing sheet transported in synchronization with the movement of the liquid-crystal display element to the lamination station;
    adjusting the lamination position of the normal polarizing sheet and the liquid-crystal display element at the lamination station;
    adjusting alignment between a leading edge of the transported normal polarizing sheet and the leading edge of the liquid-crystal display element conveyed in synchronization with the transportation of the normal polarizing sheet toward a nip between the pair of lamination rollers located in spaced-apart relation; and
    moving the lamination rollers toward each other; and laminating the normal polarizing sheet to the liquid-crystal panel by the lamination rollers.

4. The method in accordance with claim 3, further comprising a slitting position verifying step for verifying if the position of a slit-line actually formed in the continuous web of optical film coincides with the position at which the slit-line is to be formed.

5. The method in accordance with claim 4, wherein the slitting position verifying step is characterized in that the position at which the slit-line is to be formed in the continuous web of optical film is adjusted based on a deviation in the feed direction between the position of the slit-line actually formed in the continuous web and the slitting position at which the slit-line is to be formed.

6. The method in accordance with claim 2, wherein the step of preventing the polarizing sheet determined to be the defective polarizing sheet from being applied to a liquid-crystal panel further includes steps of;
    providing a dummy-film feed path to which the defective polarizing sheet is to be attached; providing a movable roller for directing said continuous web toward said dummy-film feed path; and
    when the defective polarizing sheet formed in the continuous web of optical film arrives at a removal station, moving the continuous web by means of the movable roller to have the defective polarizing sheet aligned with the dummy-film feed path to thereby peel and attach the defective polarizing sheet to the dummy-film feed path.

7. The method in accordance with claim 2, wherein the step of preventing the polarizing sheets determined to be the defective polarizing sheet formed in the continuous web of optical film from being applied to the liquid-crystal panel further includes steps of;
    providing a dummy-film feed path for feeding a dummy film to which the defective polarizing sheet is to be attached; providing a movable roller constituting a part of the a dummy-film feed path; and
    when the defective polarizing sheet formed in the continuous web of optical film arrives at a nip between lamination rollers which are provided in the lamination station and which are in a separated position, moving the movable roller to replace one of the lamination rollers with the movable roller so that the movable roller is cooperated with the other of the lamination rollers; peeling the defective polarizing sheet from the continuous web and attaching the defective polarizing sheet to the dummy film feed path.

8. The method in accordance with claim 1, further comprising steps of;

storing a plurality of liquid-crystal panels in a liquid-crystal panel magazine; sequentially taking out the liquid-crystal panels from the liquid-crystal magazine; and controlling the orientation of each of the liquid-crystal panels supplied to the lamination station when the normal polarizing sheet formed on the continuous web of optical film is transported to the lamination station in synchronization with the normal polarizing sheet.

9. The method in accordance with claim 8, wherein the step of controlling an orientation of the liquid-crystal panel further includes steps of;

detecting the position of a leading edge of the normal polarizing sheet extending in a direction transverse to a feed direction of the continuous web of optical film and the position of the leading edge of the liquid-crystal panel extending in a direction transverse to the feed direction of the liquid-crystal panel; and controlling the orientation of the liquid-crystal panel based on information relating to the position of the leading edge of the normal polarizing sheet and information relating to the leading edge of the liquid-crystal panel.

10. A continuous manufacturing system for liquid-crystal display elements adapted to use a continuous web of optical film comprising a polarizer film having an adhesive layer thereon a carrier film and information encoded thereon, the encoded information indicating positions for slitting the continuous web of optical film based on positions of defects present in the continuous web of optical film, the system comprising;

a feeding unit for continuously feeding the continuous web of optical film to a lamination station;

a measuring device for measuring a feed distance of the continuous web and calculating a feed-length measurement data based on the feed distance;

a reading unit for reading the encoded information recorded on the continuous web; a slitting unit for forming a plurality of slit-lines in the continuous web by slitting the continuous web from a surface opposite to the carrier film to a depth reaching a surface of the carrier film adjacent to the adhesive layer, along the slitting positions, based on the encoded information and the feed-length measurement data, when the slitting position defined in the continuous web thereon comes to a slitting station;

a control unit for determining whether the polarizing sheets being formed between an adjacent pair of the slit-lines sequentially formed in the continuous web is a defective polarizing sheet having one or more defects or a normal polarizing sheet having no defect;

a peeling unit for peeling the polarizing sheet determined to be the normal polarizing sheet, among the polarizing sheets formed between an adjacent pair of the slit-lines sequentially formed in the continuous web of optical film, from the carrier film and transporting the peeled polarizing sheets to the lamination station; and a lamination unit for sequentially transporting liquid-crystal display elements to the lamination station in synchronization with the transportation of the normal polarizing sheets to the lamination station and applying the polarizing sheets to respective ones of the liquid-crystal display element in a sequential manner.

11. The system in accordance with claim 10, further comprising a defective-polarizing-sheet removal unit for preventing the polarizing sheets determined to be defective polarizing sheets among the polarizing sheets being formed between respective pairs of the slit-lines sequentially formed in the continuous web of optical film, from being applied to the liquid-crystal display element.

12. The system in accordance with claim 11, wherein the lamination unit for applying the normal polarizing sheet to a liquid-crystal display element further includes;

a pair of lamination rollers provided at the lamination station for movement toward and away from each other, and an adjustment unit for detecting the position of the normal polarizing sheet transported in synchronization with a conveyance of the liquid-crystal display element to the lamination station and for adjusting the position of the normal polarizing sheet with respect to the liquid-crystal display element at the lamination station;

the adjustment unit being adapted to perform operations of; adjusting alignment between a leading edge of the transported normal polarizing sheet and a leading edge of the liquid-crystal display element conveyed in synchronization with the transportation of the normal polarizing sheet toward a nip defined between the pair of lamination rollers located in spaced-apart relation;

thereafter closing the lamination rollers; and laminating the normal polarizing sheet to the liquid-crystal display element by the lamination rollers.

13. The system in accordance with claim 10, further comprising a slitting position verifying unit for verifying if the position of a slit-line actually formed in the continuous web of optical film in the direction transverse to the feed direction coincides with the slitting position at which the slit-line is to be formed.

14. The system in accordance with claim 13, wherein the slitting position verifying unit is adapted to adjust the position at which the slit-line is to be formed in the continuous web of optical film by controlling the slitting unit based on a deviation in the feed direction between the position of the slit-line actually formed in the continuous web, and the slitting position at which the slit-line is to be formed in the direction transverse to the feed direction of the continuous web of optical film.

15. The system in accordance with claim 11, wherein the defective-polarizing-sheet removal unit comprises a dummy-film drive mechanism having a dummy-film feed path to which the defective polarizing sheets formed in the continuous web of optical film are to be attached and a shifting mechanism for shifting the continuous web of optical film toward the dummy-film feed path, the shifting mechanism being moved when the defective polarizing sheet arrives at the removal station to have the continuous web shifted into contact with the dummy-film feed path so as to peel the defective polarizing sheet from the continuous web and attach the defective polarizing sheet to the dummy-film feed path.

16. The system in accordance with claim 11, wherein the defective-polarizing-sheet removal unit comprises a dummy-film drive mechanism having a dummy film feed path for attaching the defective polarizing sheet thereto and a movable roller constituting a part of a dummy-film feed path, said movable roller being moved, when the defective polarizing sheet arrives at a nip of the lamination rollers provided in said lamination station and spaced apart from each other, to replace one of the lamination rollers with the movable roller so that the movable roller is cooperated with the other of the lamination rollers, to peel the defective polarizing sheet from the continuous web, and attach the defective polarizing sheet to the dummy-film feed path.

17. The system in accordance with claim 10, further comprising a liquid-crystal display element transportation unit comprising; a storing magazine for storing a plurality of liquid-crystal display elements; a take-out unit for sequentially taking out the liquid-crystal display elements from the storing magazine; and a liquid-crystal orientation controlling unit for controlling the orientation of a liquid-crystal display element conveyed to the lamination station in synchronization with the normal polarizing sheet formed in the continuous web of optical film at the time of being transported sequentially to the lamination station.

18. The system in accordance with claim 17 wherein the liquid-crystal orientation controlling unit further comprising;

a sheet leading edge detecting unit for detecting position of the leading edge of the normal polarizing sheet, the leading edge extending in a direction transverse to the feed direction of the continuous web of optical film;

a liquid-crystal display element leading edge detecting unit for detecting position of the leading edge of the liquid-crystal display element, the leading edge extending in a direction transverse to the feed direction of the liquid-crystal display element; and an orientation controlling unit for controlling orientation of the liquid-crystal display element, in accordance with information relating to the position of the leading edge of the normal polarizing sheets and the leading edge of the liquid-crystal display element provided by the sheet leading edge detecting unit and the liquid-crystal display element leading edge detecting unit.

* * * * *